(12) United States Patent
Wardell et al.

(10) Patent No.: US 12,217,084 B2
(45) Date of Patent: *Feb. 4, 2025

(54) EMOTION PROCESSING SYSTEMS AND METHODS

(71) Applicant: TNHC INVESTMENTS LLC, Atlanta, GA (US)

(72) Inventors: Charles Wardell, Atlanta, GA (US); David Johnson, Atlanta, GA (US)

(73) Assignee: TNHC INVESTMENTS LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/461,122

(22) Filed: Sep. 5, 2023

(65) Prior Publication Data
US 2023/0409382 A1 Dec. 21, 2023

Related U.S. Application Data

(63) Continuation of application No. 17/184,325, filed on Feb. 24, 2021, now Pat. No. 11,775,338, which is a
(Continued)

(51) Int. Cl.
*G06F 9/48* (2006.01)
*G06F 9/50* (2006.01)
(Continued)

(52) U.S. Cl.
CPC .......... *G06F 9/4843* (2013.01); *G06F 9/5027* (2013.01); *G06F 9/5072* (2013.01);
(Continued)

(58) Field of Classification Search
CPC .... G06F 9/4806; G06F 9/4843; G06F 9/5027; G06F 9/5072; G06F 2209/5017; G06F 40/30
See application file for complete search history.

(56) References Cited

U.S. PATENT DOCUMENTS 6,192,388 B1 2/2001 Cajolet
6,668,275 B1 12/2003 Alsup et al.
(Continued)

OTHER PUBLICATIONS

Ferguson M., "Architecting a Big Data Platform for Analytics," Intelligent Business Strategies (IBM), Oct. 2012, 36 Pages, [Retrieved on Mar. 21, 2017] Retrieved from URL: http://www.ndm.net/.
(Continued)

*Primary Examiner* — Geoffrey R St Leger
(74) *Attorney, Agent, or Firm* — Morris, Manning & Martin, LLP; Daniel E. Sineway, Esq.; Micah B. Hensley, Esq.

(57) ABSTRACT

A system for conducting parallelization of tasks is disclosed. The system includes an interface for receiving messages comprising a representation of logic describing two tasks to be executed in parallel, the message further comprising a content payload for use in the tasks. The system further includes a processor comprising devices running on independent machines, each device comprising a processing manager unit and at least two processing units. The processing manager is configured to parse the received messages and to distribute the at least two tasks to the at least two processing units for independent and parallel processing relative to the content payload.

26 Claims, 31 Drawing Sheets

Related U.S. Application Data continuation of application No. 16/293,801, filed on Mar. 6, 2019, now abandoned, which is a continuation of application No. 15/640,163, filed on Jun. 30, 2017, now Pat. No. 10,268,507, which is a continuation of application No. 14/550,798, filed on Nov. 21, 2014, now Pat. No. 9,727,371.

(60) Provisional application No. 61/994,117, filed on May 15, 2014, provisional application No. 61/968,334, filed on Mar. 20, 2014, provisional application No. 61/925,178, filed on Jan. 8, 2014, provisional application No. 61/908,031, filed on Nov. 22, 2013.

(51) Int. Cl.
   *G06F 16/951* (2019.01)
   *G06F 16/9535* (2019.01)
   *G06F 16/9538* (2019.01)
   *G06F 40/30* (2020.01)
   *G06Q 10/06* (2023.01)
   *G06Q 30/0203* (2023.01)
   *G06Q 30/0282* (2023.01)
   *G06Q 30/0601* (2023.01)
   *G06Q 50/00* (2024.01)

(52) U.S. Cl.
   CPC ........ *G06F 16/951* (2019.01); *G06F 16/9538* (2019.01); *G06F 40/30* (2020.01); *G06F 9/4806* (2013.01); *G06F 16/9535* (2019.01); *G06F 2209/5017* (2013.01); *G06Q 10/06* (2013.01); *G06Q 30/0203* (2013.01); *G06Q 30/0282* (2013.01); *G06Q 30/0631* (2013.01); *G06Q 50/01* (2013.01)

(56) References Cited

U.S. PATENT DOCUMENTS

| | | |
|---|---|---|
| 7,174,381 B2 | 2/2007 | Gulko et al. |
| 7,430,552 B2 | 9/2008 | Cameron et al. |
| 7,606,700 B2 | 10/2009 | Ramsey et al. |
| 7,809,568 B2 | 10/2010 | Acero et al. |
| 7,917,522 B1 | 3/2011 | Raffill et al. |
| 8,230,426 B2 | 7/2012 | Powers et al. |
| 8,555,289 B2 | 10/2013 | Son et al. |
| 9,460,083 B2 | 10/2016 | Fink et al. |
| 9,646,078 B2 | 5/2017 | Galitsky et al. |
| 9,672,555 B1 | 6/2017 | Dillard et al. |
| 9,965,462 B2 | 5/2018 | Werth et al. |
| 10,430,420 B2 | 10/2019 | Galvin, Jr. et al. |
| 2003/0120700 A1 | 6/2003 | Boudnik et al. |
| 2004/0003022 A1 | 1/2004 | Garrison et al. |
| 2007/0106509 A1 | 5/2007 | Acero et al. |
| 2007/0124733 A1 | 5/2007 | Bril et al. |
| 2008/0163218 A1 | 7/2008 | Ostermeier et al. |
| 2008/0235698 A1 | 9/2008 | Bansal et al. |
| 2009/0158299 A1 | 6/2009 | Carter |
| 2009/0254916 A1 | 10/2009 | Bose et al. |
| 2009/0282019 A1 | 11/2009 | Galitsky et al. |
| 2010/0250516 A1 | 9/2010 | Maykov et al. |
| 2011/0320542 A1 | 12/2011 | Bendel et al. |
| 2012/0297395 A1 | 11/2012 | Marchand et al. |
| 2013/0103667 A1 | 4/2013 | Minh |
| 2013/0218803 A1 | 8/2013 | Whittle et al. |
| 2013/0346067 A1* | 12/2013 | Bhatt ............... G06F 40/30 704/9 |
| 2014/0019982 A1 | 1/2014 | John et al. |
| 2014/0188459 A1 | 7/2014 | Fink et al. |
| 2014/0278365 A1 | 9/2014 | Zhang et al. |
| 2014/0317078 A1 | 10/2014 | Gallagher et al. |
| 2015/0032675 A1 | 1/2015 | Huehn et al. |
| 2015/0051946 A1 | 2/2015 | Galvin, Jr. et al. |
| 2015/0135183 A1 | 5/2015 | Kipp |
| 2015/0149153 A1 | 5/2015 | Werth et al. |
| 2015/0256475 A1 | 9/2015 | Suman et al. |
| 2016/0011907 A1 | 1/2016 | Moyer et al. |
| 2016/0042371 A1 | 2/2016 | Klemm |
| 2016/0042428 A1 | 2/2016 | Gou et al. |
| 2016/0098292 A1 | 4/2016 | Boutin et al. |
| 2016/0125083 A1 | 5/2016 | Dou et al. |

OTHER PUBLICATIONS

Notice of Allowance for U.S. Appl. No. 15/640,163, mailed Dec. 5, 2018, 8 Pages.

Vural A G., et al., "Sentiment-Focused Web Crawling," 21st ACM International Conference on Information and Knowledge Management, Oct. 29-Nov. 2, 2012, pp. 2020-2024, [Retrieved on Mar. 21, 2017] Retrieved from URL: http:/dl.acm.org/.

* cited by examiner

```
package com.decooda.plugin.plugins import com.decooda.plugin.DPMPlugin
import com.decooda.plugin.DPMContext
import com.decooda.plugin.Plugin import org.jsoup.Jsoup
import org.jsoup.safety.Whitelist class HTMLCleanerPlugin extends DPMPlugin { def name(): String = { "HTML_CLEANER" } def performAction(context:DPMContext, source: String, target: String):DPMContext = {
        val payload = context.getPayload()
        context.addorReplaceElement(target, Jsoup.clean(payload.data, Whitelist.simpleText()))

return context
    } def result(): String = { "success"}
}
```

FIG. 4

```
<DPM-MESSAGE>
    <CLIENT-ID>BigClient<CLIENT-ID>
    <PROJECT-ID>8291<PROJECT-ID>
    <TIMESTAMP>970-21-21T00:03:33Z</TIMESTAMP>
    <GUID>123456789</GUID>
    <RESULT-QUEUE>123456789.xyz</RESULT-QUEUE>
    <PROCESS>
        <SEQ-STEP ID=1>HTML_CLEANER, DOCUMENT_VALIDATE </STEP>
        <PAR-STEP ID=2>
            LINK_CRAWLER, ENTITY_EXTRACTOR, RELATIONSHIP_DISCOVERY, DEMOGRAPHIC_APPEND,
            CORPUS_IDENTIFIER
        </STEP>
    </PROCESS>
    <PAYLOAD>
        <DOCUMENT-ID>1289834</DOCUMENT-ID>
        <DOCUMENT-METADATA></DOCUMENT-METADATA>
            <DATA>
                [Social Media Post]
            </DATA>
    </PAYLOAD>
</DPM-MESSAGE>
```

My Data  My Modules  My Codebooks  Routing Rules  Inbox  Real-Time  Setup  Emo-Wiki                                    Logout

Mission Control and Command Center
Please select your brand: Brand A ▼  | Manage Brands |

Brand Health

- Summary
- Sentiment
- Attribute
- Word Clouds
- Brand Health
- Brand Compare
- Roll Up
- Slice & Dice Lookback From: 11/19/2010
Lookback To: 11/19/2013
Gender: 3 selected ▼
Sentiment: 8 selected ▼
Primary Emotion: 8 selected ▼
Media Type: 5 selected ▼
Detect Attribute: Select options ▼
Sample: 100 ▼
Is Personal: All ▼
Confidence: High ▼
Filter by Keyword: Contains ▼

Save

Weekly Trends by Media Type

| Media | Current Week Count | Previous Week Count | % Change | Trend |
|---|---|---|---|---|
| Social Media A | | 92 | -100.0% | ↘ |
| Social Media B | | 83 | -100.0% | ↘ |

Monthly Trends by Media Type

| Media | Current Month Count | Previous Month Count | % Change | Trend |
|---|---|---|---|---|
| Social Media A | 244 | 172 | 41.9% | ↖ |
| Social Media B | 309 | 562 | -45.0% | ↘ |

Quarterly Trends by Media Type

| Media | Current Quarter Count | Previous Quarter Count | % Change | Trend |
|---|---|---|---|---|
| Social Media A | 579 | 122 | 374.6% | ↖ |
| Social Media B | 3904 | 432 | 803.7% | ↖ |
| Social Media C | | 2 | -100.0% | ↘ |

Period 1
Start Date: ▦     End Date: ▦

Period 2
Start Date: ▦     End Date: ▦

Submit

FIG. 8D

My Data  My Modules  My Codebooks  Routing Rules  Inbox  Real-Time  Setup  Emo-Wiki                                    Logout

Mission Control and Command Center

Please select your brand: Brand A ▼  Manage Brands

Summary
Sentiment
Attribute
Word Clouds
Brand Health
Brand Compare
Roll Up
Slice & Dice

Slice & Dice

Reset Analysis Grid

[Formula] [Layout] [Sort] [Filter] [Group] [Aggregate] [Chart] [Crosstab] [Paging]

Export: [Spreadsheet] [CSV] [PDF]

Page [1] of 10

| Publish Date | Content Link | Content | Media Type | Word Count | Is Organic? | Sentiment | Primary Emotion | Secondary Emotion | Source | Sample % | Author ID | Author Link | Author | Author Username |
|---|---|---|---|---|---|---|---|---|---|---|---|---|---|---|
| 06/07/2013 | Link | content | blog | 581 | True | negative | anger | sadness | | 94 | 391253381 | | | |
| 06/07/2013 | Link | content | blog | 581 | True | negative | anger | sadness | | 20 | 408355437 | | | |
| 06/07/2013 | Link | content | blog | 581 | True | negative | anger | sadness | | 67 | 387750943 | | | |
| 07/13/2013 | Link | content | Social Media A | 9 | False | negative | anger | sadness | | 23 | 183217061 | Link | John Doe | |
| 09/17/2013 | Link | content | Social Media A | 16 | True | negative | anger | sadness | | 67 | 565083994 | Link | John Doe | |
| 08/16/2013 | Link | content | Social Media A | 7 | False | negative | anger | unclassified | | 3 | 557242238 | Link | Jane Doe | |
| 09/14/2013 | Link | content | Social Media A | 10 | True | negative | anger | sadness | | 81 | 242268026 | Link | John Doe | |
| 07/04/2013 | Link | content | Social Media A | 5 | True | negative | anger | unclassified | | 14 | 43401865 | Link | John Doe | |
| 09/10/2013 | Link | content | Social Media A | 70 | True | negative | anger | happiness | | 9 | 66630576 | Link | Jane Doe | |
| 07/12/2013 | Link | content | Social Media A | 12 | False | negative | anger | frustration | | 79 | 675502849 | Link | John Doe | |
| 09/26/2013 | Link | content | Social Media A | 56 | True | negative | anger | frustration | | 54 | 148776001 | Link | John Doe | |

Lookback From: 11/19/2010
Lookback To: 11/19/2013
Gender: 3 selected ▼
Sentiment: 8 selected ▼
Primary Emotion: 8 selected ▼
Media Type: 5 selected ▼
Detect Attribute: Select options ▼
Sample: 100 ▼
Is Personal: All ▼
Confidence: High ▼
Filter by Keyword: Contains ▼

[Save]

My Data  My Modules  My Codebooks  Routing Rules  Inbox  Real-Time  Setup  Emo-Wiki                                     Logout

Mission Control and Command Center                    Please select your brand: [Brand A ▼] [Manage Brands]

Summary
Sentiment
Attribute
Word Clouds
Brand Health
Brand Compare
Roll Up
Slice & Dice
Lookback From [11/19/2010] 🗓
Lookback To [11/19/2013] 🗓
Gender: [3 selected ▼]
Sentiment: [8 selected ▼]
Primary Emotion: [8 selected ▼]
Media Type: [5 selected ▼]
Detect Attribute [Select options ▼]
Sample: [100 ▼]
Is Personal [All ▼]
Confidence [High ▼]
Filter by Keyword: [Contains ▼]
[Save]

Information

You are about to upload your data to be analyzed by the emotion detection engine. Please make sure your file is in CSV format delimited by one of the following (comma, space, or tab). Before you upload your data, make sure that your file includes a DATE field so that the emotion metrics are displayed over time and a TEXT field that you would like analyzed.

There are two fields that are optional (author_ID/panelist_ID OR your unique identifier). If these fields are uploaded, they will be maintained in our system as pass-through data so you can correlate the emotion scores back to your source data.

* Add topics separated by comma(,) in Topics Field.

(Upload CSV file here) > (Select Fields) > (Success)

Delimiter *  [Comma ⇅]

Select File  [Choose File]  No file chosen

[Upload]

FIG. 8J

My Data  My Modules  My Codebooks  Routing Rules  Inbox  Real-Time  Setup  Emo-Wiki                    Logout

Mission Control and Command Center          Please select your brand: [Brand A ▼]  [Manage Brands]

- Summary
- Sentiment
- Attribute
- Word Clouds
- Brand Health
- Brand Compare
- Roll Up
- Slice & Dice Lookback From  [11/19/2010] 🗓
Lookback To    [11/19/2013] 🗓

Gender: [3 selected ▼]
Sentiment: [8 selected ▼]
Primary Emotion: [8 selected ▼]
Media Type: [5 selected ▼]
Detect Attribute [Select options ▼]
Sample: [100 ▼]
Is Personal [All ▼]
Confidence [High ▼]
Filter by Keyword: [Contains ▼]

[Save]

Information

You are about to upload your data to be analyzed by the emotion detection engine. Please make sure your file is in CSV format delimited by one of the following (comma, space, or tab). Before you upload your data, make sure that your file includes a DATE field so that the emotion metrics are displayed over time and a TEXT field that you would like analyzed.

There are two fields that are optional (author_ID/panelist_ID OR your unique identifier). If these fields are uploaded, they will be maintained in our system as pass-through data so you can correlate the emotion scores back to your source data.

* Add topics separated by comma(,) in Topics Field.

[Upload CSV file here]  >  [Select Fields]  >  (Error)

Study/Brand Name: [_____]

Topics: [Add a topic.]

Custom Attributes: [Select options ⇄]

Custom Identifier Column: [-Choose a custom identifier column- ▼]

Author Column: [-Choose an author column- ▼]

Content Column *: [-Choose a content column- ▼]

Date Column *: [-Choose a date column- ▼]

[Score]   [Cancel]

My Data  My Modules  My Codebooks  Routing Rules  Inbox  Real-Time  Setup  Emo-Wiki                     Logout

Mission Control and Command Center
Please select your brand: Brand A ▼  [Manage Brands]

- Summary
- Sentiment
- Attribute
- Word Clouds
- Brand Health
- Brand Compare
- Roll Up
- Slice & Dice Lookback From: 11/19/2010
Lookback To: 11/19/2013
Gender: 3 selected ▼
Sentiment: 8 selected ▼
Primary Emotion: 8 selected ▼
Media Type: 5 selected ▼
Detect Attribute: Select options ▼
Sample: 100 ▼
Is Personal: All ▼
Confidence: High ▼
Filter by Keyword: Contains ▼

[Save]

My Code Books

Name
- Shopping Experience  ✎ ✕
- Product Satisfaction  ✎ ✕

[Add Code Book]

Shopping Exp ▸ Categories

Category Name      Keywords
- Check Out Counter    line or register or ...  ✎ ✕  [Examples]
- Aisle                                          ✎ ✕  [Examples]

[Add Category]

My Data  My Modules  My Codebooks  Routing Rules  Inbox  Real-Time  Setup  Emo-Wiki       Logout

Mission Control and Command Center
Please select your brand: Brand A ▼  Manage Brands

Monitoring and Alerting

Summary
Sentiment

| Name | Description | Brand | Do This | Enabled | Actions |
|---|---|---|---|---|---|
| Add Rule | rule | | Route to Inbox | | ✎ ✖ |
| Rule | new rule | My Data | Route to Inbox | | ✎ ✖ |

Attribute
Word Clouds
Brand Health
Brand Compare
Roll Up
Slice & Dice

Add Rule

Rule

| Column Name | Operation | Value | Delete? |
|---|---|---|---|
| negemo_frustration ▼ | = ◆ | 2 | |
| posemo_happiness ▼ | = ◆ | 9 | |
| primary_emotion ▼ | = ◆ | | ☐ |
| primary_emotion ▼ | = ◆ | | ☐ |
| primary_emotion ▼ | = ◆ | | |
| primary_emotion ▼ | = ◆ | | |

Update Rule Details

Lookback From  11/19/2010 🗓
Lookback To    11/19/2013 🗓
Gender:
  3 selected ▼
Sentiment:
  8 selected ▼
Primary Emotion:
  8 selected ▼
Media Type:
  5 selected ▼
Detect Attribute
  Select options ▼
Sample:
  100 ▼
Is Personal
  All ▼
Confidence
  High ▼
Filter by Keyword:
  Contains ▼

Save

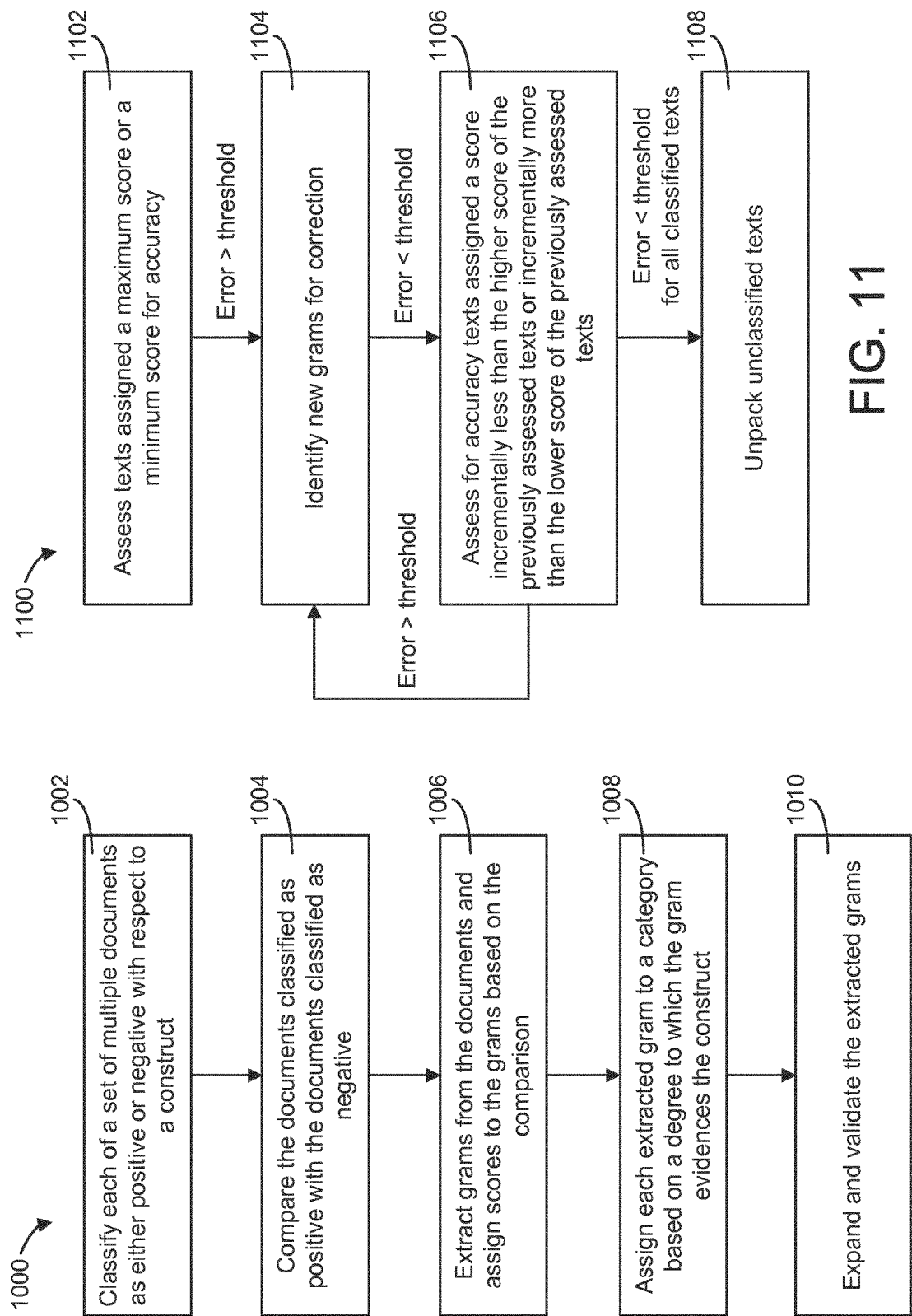

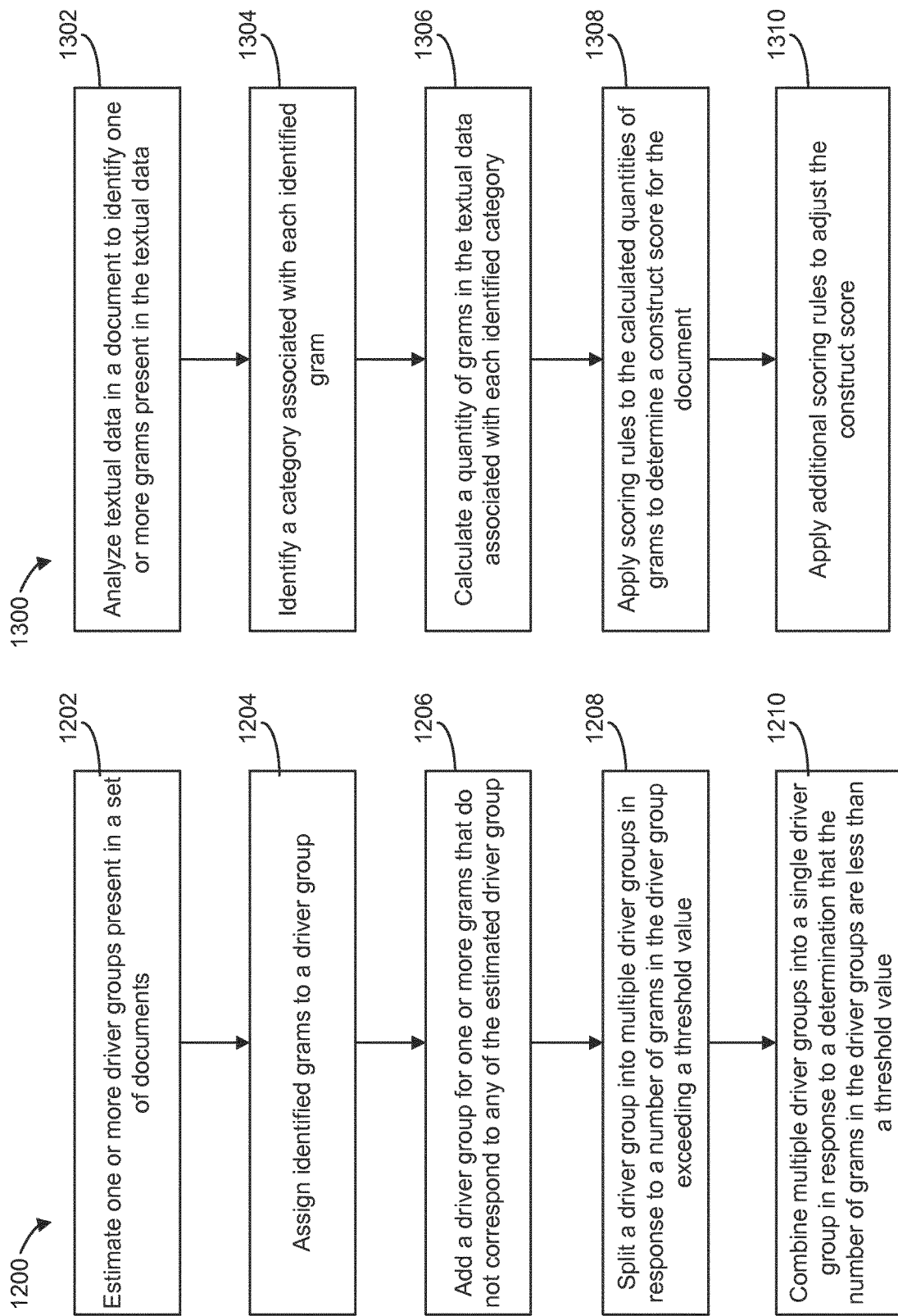

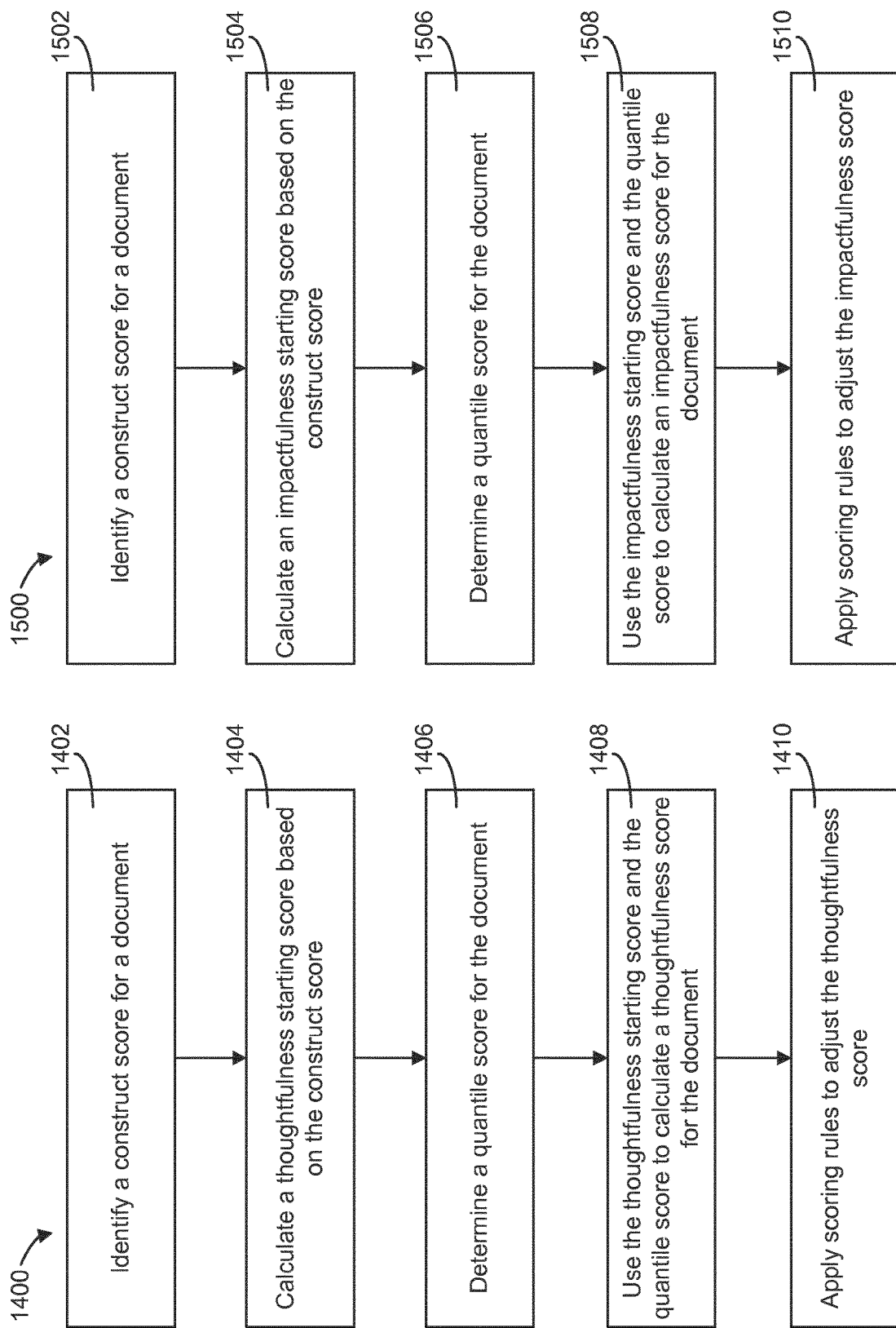

EMOTION PROCESSING SYSTEMS AND METHODS

CROSS-REFERENCE TO RELATED PATENT APPLICATIONS

This application is a continuation of, and claims the benefit of and priority to, U.S. patent application Ser. No. 17/184,325, filed Feb. 24, 2021, which is a continuation of, and claims the benefit of and priority to, U.S. patent application Ser. No. 16/293,801, filed Mar. 6, 2019, which is a continuation of, and claims the benefit of and priority to, U.S. patent application Ser. No. 15/640,163, filed Jun. 30, 2017, now U.S. Pat. No. 10,268,507, which is a continuation of, and claims the benefit of and priority to, U.S. patent application Ser. No. 14/550,798, filed Nov. 21, 2014, now U.S. Pat. No. 9,727,371, which claims the benefit of and priority to U.S. Provisional Patent Application No. 61/908,031, filed Nov. 22, 2013, U.S. Provisional Patent Application No. 61/925,178, filed Jan. 8, 2014, U.S. Provisional Patent Application No. 61/968,334, filed Mar. 20, 2014, and U.S. Provisional Patent Application No. 61/994,117, filed May 15, 2014, each of which is incorporated by reference herein in its entirety.

BACKGROUND

Big data can be defined as any data that is too large, too complete, and/or too expensive to process using existing technologies and architectures.

Conventional parallel processing approaches have utilized a threaded architecture in an attempt to achieve processing power scaling. However, this approach has only proven to be somewhat useful, because threaded architectures often share all resources such as memory, I/O, disk resources, CPU resources, and other system resources. Given this sharing, threads need to be carefully managed. This management often means that "parallel" threads are not truly asynchronous or independently parallel. Left unmanaged, a shared-but-threaded architecture can result in a competition for resources between threads. This competition can result in issues such as thread locking, racing, and blocking, among other issues. Even in instances with adequate CPU bandwidth, these issues can cause bottlenecks, artificial delays, and/or the overall sub-optimization of resources.

It is challenging and difficult to design systems for processing in a parallel fashion and a high degree of flexibility.

SUMMARY

One embodiment of the present disclosure relates to a system for conducting parallelization of tasks. The system includes an interface for receiving messages comprising a representation of logic describing two tasks to be executed in parallel, the message further comprising a content payload for use in the tasks. The system further includes a processor comprising devices running on independent machines, each device comprising a processing manager unit and at least two processing units. The processing manager is configured to parse the received messages and to distribute the at least two tasks to the at least two processing units for independent and parallel processing relative to the content payload.

Another embodiment of the present disclosure relates to a computerized method for processing tasks. The method includes receiving a message describing at least two processing tasks to be parallelized and completed relative to a payload content of the message. The method also includes parsing the received message to identify the at least two tasks for parallelization. The method further includes distributing the tasks, in parallel, to a discrete processing unit. The method also includes at each discrete processing unit, completing the entirety of its task asynchronously with another discrete processing unit.

The messaging source can have a website crawler. The website crawler may be configured to generate the message having the representation of logic describing two tasks to be executed in parallel and the content payload for use in the tasks. The messaging source can have a streaming data interface for receiving streaming data. The messaging source may be configured to process the streaming data and to generate the message using the streaming data. The messaging source is configured to use the streaming data to create the payload and wherein the identification of the tasks are not a part of the original streaming data. The messaging source may include a query engine for querying a data source and for generating a series of the messages using the query results. In some exemplary embodiments, the identification of the tasks are not a part of the query result data. The interface may include a framework manager configured to queue the messages. Each processing manager unit may be configured to request new messages from the queue when resources permit. The messages utilize a mark-up language to identify the tasks to be completed in parallel and the content payload.

BRIEF DESCRIPTION OF THE FIGURES

The details of one or more implementations are set forth in the accompanying drawings and the description below. Other features, aspects, and advantages of the disclosure will become apparent from the description, the drawings, and the claims.

FIG. 4 is an example of the source code for the HTML_CLEANER plug-in (e.g., as referenced in FIG. 2), according to an exemplary embodiment.

FIG. 5 is another example message for commanding task parallelization, according to an exemplary embodiment.

FIG. 8C illustrates, according to one embodiment, a user interface page showing information regarding a comparison of one or more brands.

FIG. 8D illustrates, according to one embodiment, a user interface page showing information regarding brand health of one or more brands.

FIG. 8E illustrates, according to one embodiment, a user interface page showing information regarding slice and dice data of one or more brands.

FIG. 8F illustrates, according to one embodiment, a user interface page showing information regarding a theme cloud (negative) of one or more brands.

FIG. 8G illustrates, according to one embodiment, a user interface page showing information regarding a word cloud (negative) of one or more brands.

FIG. 8H illustrates, according to one embodiment, a user interface page showing information regarding a theme cloud (positive) of one or more brands.

FIG. 8J illustrates, according to one embodiment, a user interface page showing information regarding my data upload.

FIG. 8K illustrates, according to one embodiment, a user interface page showing further information regarding my data upload.

FIG. 8L illustrates, according to one embodiment, a user interface page showing information regarding my modules.

FIG. 8M illustrates, according to one embodiment, a user interface page showing further information regarding my modules.

FIG. 8N illustrates, according to one embodiment, a user interface page showing information regarding my codebooks.

FIG. 8O illustrates, according to one embodiment, a user interface page showing further information regarding my codebooks.

FIG. 8P illustrates, according to one embodiment, a user interface page showing information regarding routing rules.

FIG. 8Q illustrates, according to one embodiment, a user interface page showing information regarding manage brands.

FIG. 8R illustrates, according to one embodiment, a user interface page showing further information regarding manage brands.

FIG. 10 is a flowchart of a process performed by the systems of the previous Figures for deriving grams and categories from the text of a document, according to an exemplary embodiment.

FIG. 11 is a flowchart of a process performed by the systems of the previous Figures for validating and correcting extracted grams, according to an exemplary embodiment.

FIG. 12 is a flowchart of a process performed by the systems of the previous Figures for assigning grams to driver groups, according to an exemplary embodiment.

FIG. 13 is a flowchart of a process performed by the systems of the previous Figures for determining a construct score for a document, according to an exemplary embodiment.

FIG. 14 is a flowchart of a process performed by the systems of the previous Figures for determining a thoughtfulness score for a document, according to an exemplary embodiment.

FIG. 15 is a flowchart of a process performed by the systems of the previous Figures for determining an impactfulness score for a document, according to an exemplary embodiment.

DETAILED DESCRIPTION

Referring generally to the Figures, a system for conducting a parallelization of tasks is shown and described. That is, unlike conventional parallelization techniques, which only parallelize at the thread level or the data level, an entire task to be completed is parallelized with another task to be completed. In an exemplary embodiment, the system can receive messages that include a representation of the logical flow of tasks to be processed. The messages also include a payload content (e.g., a paragraph of text to be processed). The system, upon parsing the received representation of the logic, can identify two (or more) tasks to be completed in parallel relative to the payload content of the message. The system can then respectively distribute the two tasks to two parallel processing units. Each parallel processing unit can complete the entirety of its task independently of and asynchronously with the processing of another parallel processing unit's task or tasks.

Figure 1:
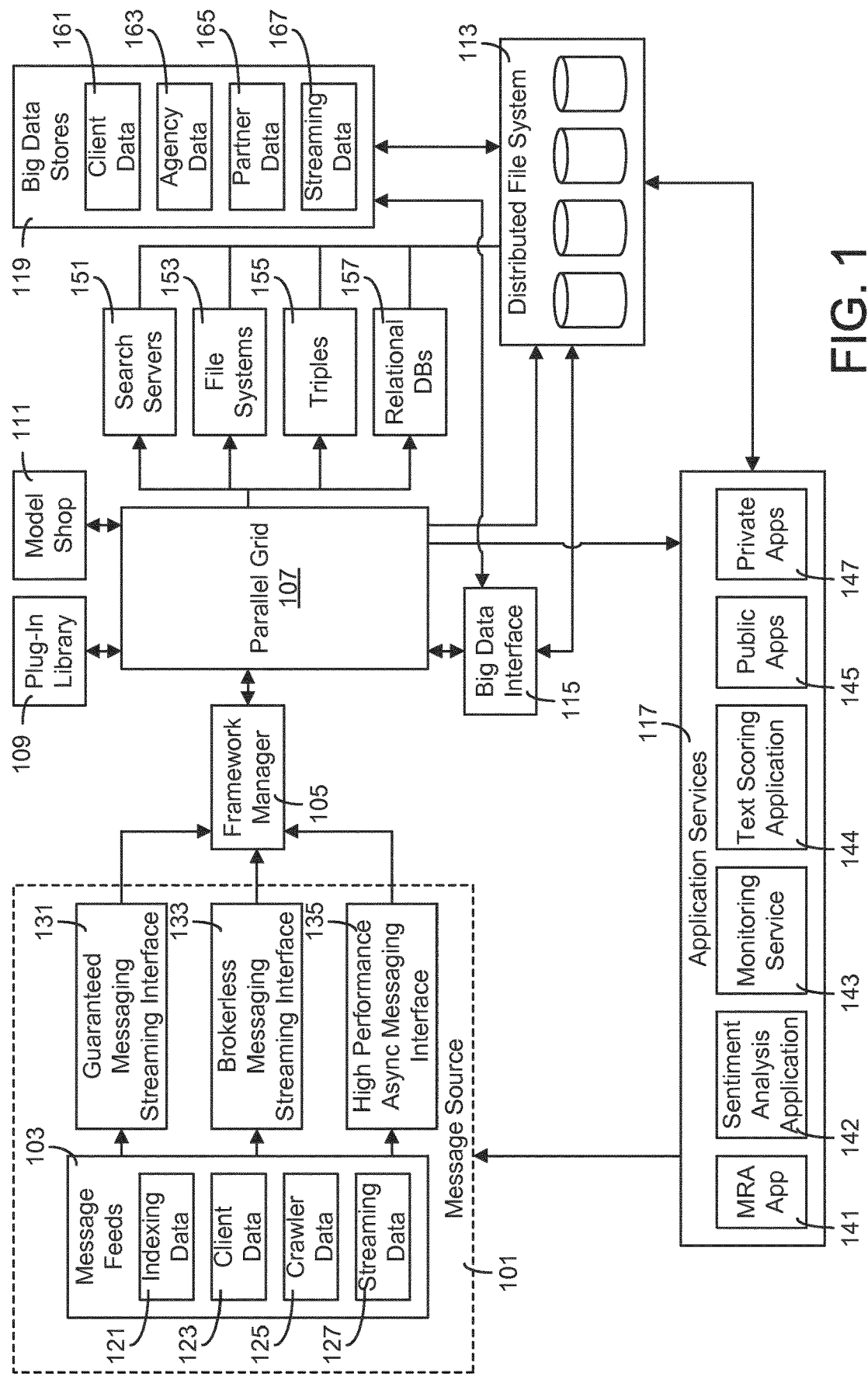
FIG. 1 is a system for conducting parallelization of tasks, according to an exemplary embodiment.

Referring now to FIG. 1, a system for conducting parallelization of tasks is shown, according to an exemplary embodiment. The system is shown to include message sources 101. Message sources 101 transmit a message that includes a representation of the logical flow of tasks to be processed. The message also includes a payload content (e.g., a paragraph of text to be processed, an image to be processed, a link to data to be processed, a pointer to data to be processed, etc.).

Framework manager 105 receives the message from the message sources 101. Framework manager 105 then distributes the message to the parallel grid 107. The parallel grid 107 can parse the message, including the representation of the logic, and can identify two (or more) tasks to be completed in parallel. The tasks conducted may be to process or transform the payload content of the message. Details of the parallel grid 107 will be described in greater detail with respect to subsequent Figures and paragraphs.

The processing tasks described in the representation of the logical flow of tasks to be processed may be defined in a plug-in library accessible to all nodes of the processing grid 107. In other words, when a task is to be conducted by a node of processing grid 107, the node can fetch (or otherwise access for action) the appropriate plug-in from the plug-in library 109. In some embodiments, each plug-in is a single-purpose plug-in. Model shop content or other resources can be retrieved from model shop 111. Parallel grid 107 can thus be able to adapt to different types of logic representations in the messages received for processing. Nodes of the parallel grid, in an exemplary embodiment, are not preconfigured to handle only a small set of tasks. Rather, the nodes can be configured "on the fly" using the content of the plug-in library 109 and/or model shop 111. For example, a node can be configured to generate a message "on the fly" and perform other operations. Additional detail regarding the plug-in library 109 will be provided in later paragraphs.

Output from the parallel grid 107 can be provided to any selected output. The output may be, for example, specified by the message from the message source 101. For example, the parallel grid 107 can provide data to a distributed file system 113 for storage. The parallel grid 107 can provide data to application services 117. Data provided to application services 117 may be provided to applications that provide user interfaces (e.g., graphical user interfaces) for outputting processing results (separately and/or in the aggregate) to users (e.g., users connected to the servers via client browsers or otherwise). Application services 117 may run on a single server or on a combination of servers.

Application services 117 includes a variety of services which may interact with a client or user. Some embodiments may include private applications 147 and public applications 145. Private applications 147 may have limited access to a select group of users. The select group of users may include a subset of a user or client institution. Public applications 145 may be accessible by members of the public or a less or unrestricted group of members belonging to the user or client institution. Application services 117 may also include text scoring applications 144. In some embodiments, text scoring applications 144 may provide a score of the payload of a message. The score may be related to a parameter such as an estimated emotion or estimated behavioral correlate as discussed in later paragraphs. Application services 117 may further include monitoring service 143. Monitoring service 143 may provide a client or user with results relating to, for example, monitoring the emotion of a data source. For example, social listening and response may provide a client or user with information related to positive or negative changes in emotions corresponding to a particular brand or product. The monitoring service 143 may further suggest a course of action in response to the changes identified through social listening. More detail will be provided in later paragraphs. Application services 117 may further include a sentiment analysis application 142. In some embodiments, sentiment analysis application 142 may provide to the client or user information regarding the estimated emotions, estimated behavioral correlates and/or emotional score associated with the payloads corresponding to a particular brand or product. For example, sentiment analysis application 142 may provide information regarding the percentages of each estimated emotion and/or estimated behavioral correlate associated with the payloads of a particular brand or product. Application services 117 may also include MRA applications 141. MRA (i.e., marketing research applications) may allow a user to compare different data sources (e.g., by emotion) to determine which marketing approach has been more effective. MRA may also allow a user to categorize data sources to determine which attributes to a brand are most appealing.

MRA applications 141 analyzes verbatim responses to open-ended surveys. The MRA applications 141 break down surveys into questions, and their associated responses and analyzes them in real-time. A raw data file, which may include branching and skip logic questions and any related metadata, is uploaded. The number of categories responses to be assigned is selected, so that responses with multiple attributes can be auto-coded into multiple categories. An automated natural coding process then clusters responses into groups of related documents. Merging, renaming or deleting clusters is then possible. MRA applications 141 allow for a user to dynamically create and apply codeframes to survey responses so all responses can be coded into the categories the analyst is most interested in monitoring. The analysis may be further analyzed using the system and methods described herein to measure sentiment, emotion, context, psychological profiles and other calculated characteristics of the survey responses.

Output from parallel grid 107 may be displayed to a client or user through application services 117. In some embodiments, application services 117, and the associated specific services detailed above, may use different types of display techniques. For example, application services 117 may display the output of parallel grid 107, or output from other analysis (e.g. analysis performed by an application service 117) using charts. These may include pie charts, bar graphs, plots, etc. The output displayed may be customizable by the user or client. For example, a user or client may select the type of display and the specific information to be displayed using a public application 145 or private application 147. The output display may also include figures. For example, the output displayed by the application services 117 may include venn diagrams, word maps, word charts, word clouds, etc.

In an exemplary embodiment, output from the parallel grid 107 can temporarily be returned to framework manager 105 for further handling and distribution of tasks. In an exemplary embodiment, output can also or alternatively be provided to a big data interface 115. The big data interface 115 can facilitate transactions with big data stores 119 and/or with distributed file system 113. Big data interface 115 may route data, standardize data types, normalize data, index data, and/or perform a similar function to facilitate data transfer.

Big data stores 119 may include client data 161, agency data 163, partner data 165, and/or streaming data 167. In some embodiments client data 161 may include data for analysis provided by the user or client. For example, client data 161 may include social media posts from a client or user webpage. Client data 161 may be related to a particular product, brand or time frame. In further example, client data 161 may be social media posts for a time period corresponding to a product launch, news story, product recall, etc. In some embodiments, agency data 163 may include data or information sourced from a third party. For example this data may include ratings from a ratings agency, reviews from a reviewing website, search trends, focus group results and evaluations, etc. In some embodiments, partner data 165 includes data from organizations partnered with the client, user, or provider of the system. In some embodiments, big data stores 119 may also include streaming data 167. Streaming data 167 may include any big data, including the data discussed above, that is collected on a continuous (i.e. streaming) basis. Big data may also include data such as web cookies, breadcrumbs, sales figures, or other data sources which may be processed to conduct a target determination (e.g., emotion, marketing effectiveness, etc.).

Output from parallel grid 107 may also be provided to any or any combination of search servers 151, files systems 153, triples 155, and relational databases 157. Search servers 151 may store the output from parallel grid 107 in a searchable format. Search servers 151 may include an indexer and querying engine. In some embodiments, search servers 151 may be any of a Microsoft Search Server, Solr, Autonomy, Google Mini, etc. Search servers 151 may be configured to use any of a variety of search methodologies (e.g., Lucene, elastic, MarkLogic, etc.). File systems 153 may include any file system which controls how the output is stored and retrieved. File systems 153 may store information mediums including hard disk, solid state memory, magnetic tape, optical disk, cloud based storage, or any other medium. For example file systems 153 may be a New Technology File System storing the output of parallel grid 107 on a hard disk. Other file systems 153 may be used including those associated with Microsoft, Linux, Unix, or other operating systems. Triples 155 may store the output of parallel grid 107 in a tuple of length 3. For example the three components of the triples 155 may be the payload, an associated emotion, and an associated behavioral correlate. In some embodiments output from parallel grid 107 may be of other lengths. For example, output may be made to ordered pairs or quadruples. Output from parallel grid 107 may also be made to relational databases 157. Relational databases 157 may store the output of parallel grid 107 as tables of data items ordered according to a relational model. In some embodiments an SQL database may also be used. The output from parallel grid 107 sent to any of search servers 151, files systems 153, triples 155, and relational databases 157 may be accessed by the distributed file system 113 and in turn may be accessed by the big data interface 115, application services 117, and/or big data stores 119.

Message source 101 can include one or more message feeds 103. Message feeds 103 may be streaming feeds (e.g., streaming text, streaming video, streaming audio). Message source 101 may also or alternatively be or include one or more non-streaming interfaces. For example, a messaging engine (e.g., on a client computer, on a social media server, etc.) may send messages as a batch. In other embodiments, the framework manager 105 or another component of the system may fetch or get messages from an inbox, a database, a compressed file, or another data source. Message source 101 may further include information from application services 117. Data may be provided by the client or user through the application services 117. For example, a client or user may input data through a private application 147 or a public application 145. This data may be a message source 101. Message source 101 may include data or information from the distributed file system 113. Message source 101 may include data or information from big data stores 119.

Message feeds 103 are shown to include an indexing data feed or store 121, client data feed or store 123, crawler data feed or store 125, and/or streaming data 127. Indexing data feed or store 121 may include data from social media, big data, or other sources that has been indexed. Client data feed or store 123 may include data provided by a user or client. This data may originate from application services 117 or big data stores 119 as discussed above. Client data 123 may be data from the client or user otherwise provided to message source 101. Crawler data feed or store 125 may include data acquired by a web crawler. The web crawler may be used to index social media websites, review websites, or any other website where the desired data types and sets are likely to be found. Streaming data 127 may include any data source which is gathered continuously. Message feeds 103 may include data such as web cookies, breadcrumbs, sales figures, etc.

A guaranteed messaging streaming interface 131 can be provided. The guaranteed messaging streaming interface 131 may be configured to receive data from message feeds 121-127 and to standardize the data for framework manager 105. In other words, interface 131 may be configured to standardize the message data from a first standard (from message feeds 121-127) to a second standard (for framework manager 105 and parallel grid 107). In one embodiment, interface 131 may implement an advanced message queuing protocol (AMQP) for implementing a standard for the messages being transmitted from feeds 121-127 to framework manager 105. Examples of implementations of the AMQP are RabbitMQ and Apollo. According to another embodiment, interface 131 may implemented using a Java message service (JMS) for sending messages from message feeds 121-127 to framework manager 105.

A brokerless messaging streaming interface 133 can be provided. The brokerless messaging streaming interface 133 may be configured to allow any message broker (e.g., message feeds 121-127) to communicate with framework manager 105 independent of language or platform. For example, framework manager 105 with a first language or platform may communicate with a message feed in a second language or platform via interface 133. In one embodiment, interface 133 may implement a Simple (or Streaming) Text Oriented Message Protocol (STOMP) for enabling the communication between message feeds 121-127 and framework manager 105. One such example of an implementation of the STOMP is ZeroMQ.

A high performance asynchronous messaging interface 135 can be provided. The high performance asynchronous messaging interface 135 can manage communications that take place between the various message feeds 121-127 and framework manager 105. More particularly, interface 135 may receive a message from a message feed 121-127. If framework manager 105 is busy or not connected to message source 101, interface 135 may place the message in a message queue while continuing to receive and process other messages, without requiring an immediate response to the first message by framework manager 105. Examples of an implementation of interface 135 include JActor and Akka.

Figure 2:
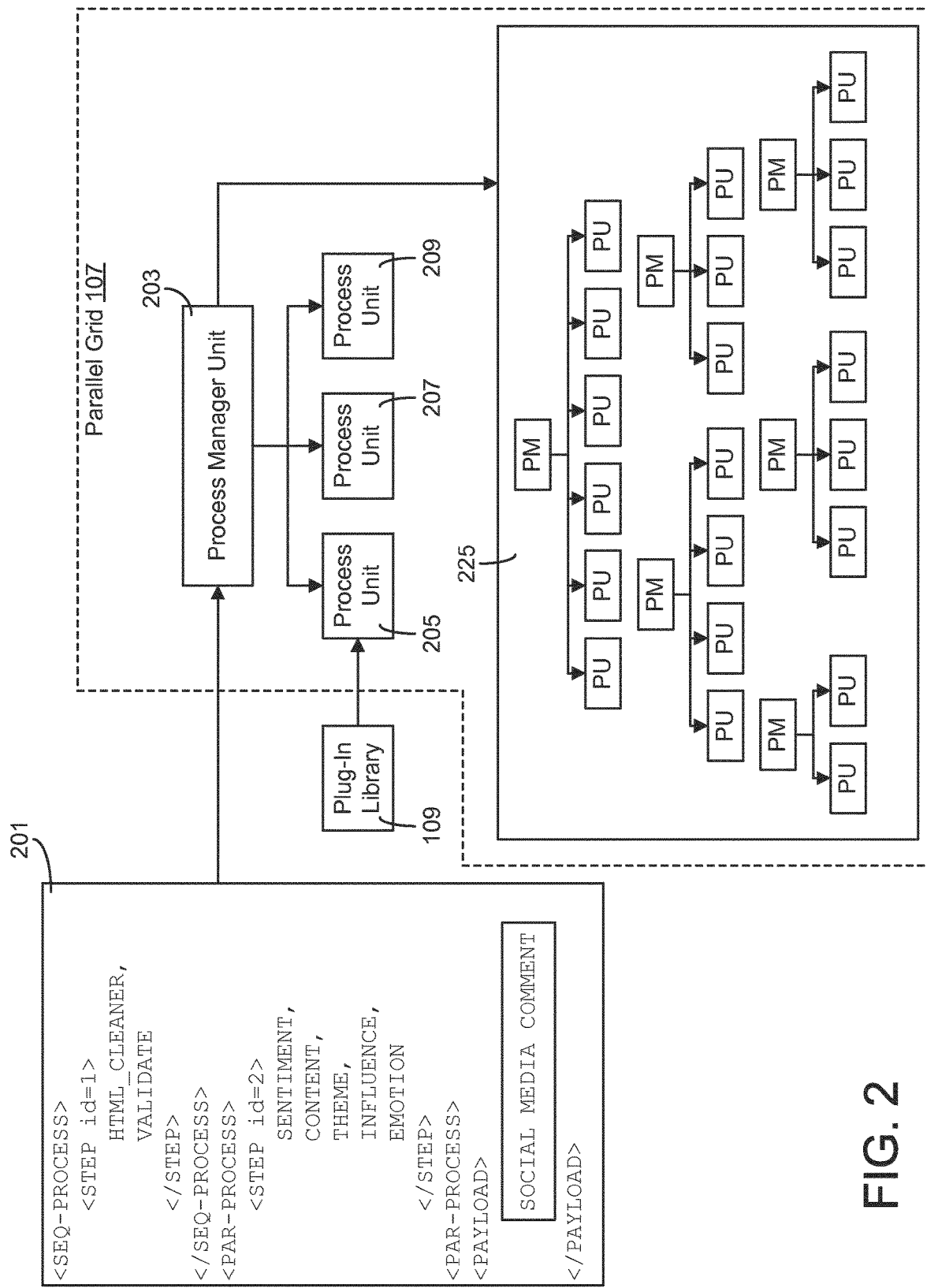
FIG. 2 is a simplified block diagram of the parallel grid of FIG. 1, according to an exemplary embodiment.

Referring now to FIG. 2, a simplified block diagram of the parallel grid 107 is shown, according to an exemplary embodiment. The parallel grid 107 is shown as receiving a simplified exemplary message 201. As shown, exemplary message 201 includes a mark-up language representation of a logical flow of tasks to be completed. Exemplary message 201 is shown to include two sequential process tasks to be completed, HTML_CLEANER and VALIDATE. In message 201, HTML_CLEANER and VALIDATE are marked as sequential via the <SEQ-PROCESS> tag. The markup <STEP id=1> is used to indicate that HTML_CLEANER and VALIDATE are sequential steps to be associated with the identifier of 1. The system can receive and parse the message 201, sending the message to process manager unit 203 of parallel grid 107. The system may send the message 201 to process manager unit 203 with an indication that step id=1 is the step for execution by process manager unit 203.

Process manager unit 203 can cause HTML_CLEANER to be executed by using a process unit 205. Process manager unit 203 can send the content payload from the message (e.g., a set of social media posts) along with an indication of the process task to be completed (e.g., HTML_CLEANER). Upon receiving such information, for example, process unit 205 can recall instructions for HTML_CLEANER from plug-in library 109.

Plug-in library may contain scripts (e.g., Javascript, Perl, etc.), compiled executable modules, compiled bytecode for execution on a virtual machine environment (e.g., .class, .jar), pre-compiled class files, source files (e.g., .java, .py, etc.). One example for the HTML_CLEANER plug-in is shown in FIG. 4.

When the first process is complete, process unit 205 can return the updated content payload to the process manager unit 203. Process manager unit 203 can update the content payload in the message itself or in an intermediate data structure used for processing the messages. In various embodiments, one or both of process manager unit and process unit 205 may be configured to update the content payload. Because HTML_CLEANER and VALIDATE tasks are marked with the sequential tag, VALIDATE is caused to run on an available process unit (e.g., any of process units 205-207) using the content payload cleaned by HTML_CLEANER.

Upon completion of the VALIDATE task, the process manager unit 203 can then continue to the parallel processing portion of the message 201. As shown in the example message 201 of FIG. 2, the mark-up PAR-PROCESS is used to indicate a parallel process. Step 2 is defined to include the tasks of SENTIMENT, CONTENT, THEME, INFLUENCE, and EMOTION. These task names may correspond to a task for judging the sentiment of a social media post, categorizing the content of the social post, categorizing a theme for the social media post, judging the influence of the social media post, and ranking the emotion of the social media post.

In some embodiments, the process manager unit 203 and/or the framework manager 105 can function as a framework message router. For example, the process manager unit 203, upon parsing the PAR-PROCESS section of the message 201, can access state, utilization and/or historical information for its own process units 205-209 to determine how to distribute the parallel tasks to be completed. For example, the process manager unit 203 can distribute the SENTIMENT task (along with the HTML cleaned and verified content payload) to process unit 205, CONTENT task to process unit 207, and THEME task to process unit 209. The final two tasks to be processed can be passed to other process manager units and process units of the parallel grid 107. As illustrated in the parallel grid 107 of FIG. 2, a group 225 of processing resources may be used to complete the tasks INFLUENCE and EMOTION. In an exemplary embodiment, the process manager unit 203 uses utilization or state information regarding other process manager and process unit sets to determine which process manger/process unit set should receive the tasks INFLUENCE and EMOTION. Alternatively, or in conjunction with such local decision making, the framework manager 105 can assist with the distribution process when one process manager unit's resources are utilized. For example, the framework manager can be queried by the process manager unit 203 to determine which other process manager unit should receive the overflow tasks. In yet other embodiments, process manager units can be configured to keep all tasks of a parallel process such that overflow tasks are done when local process unit resources permit.

Figure 3:
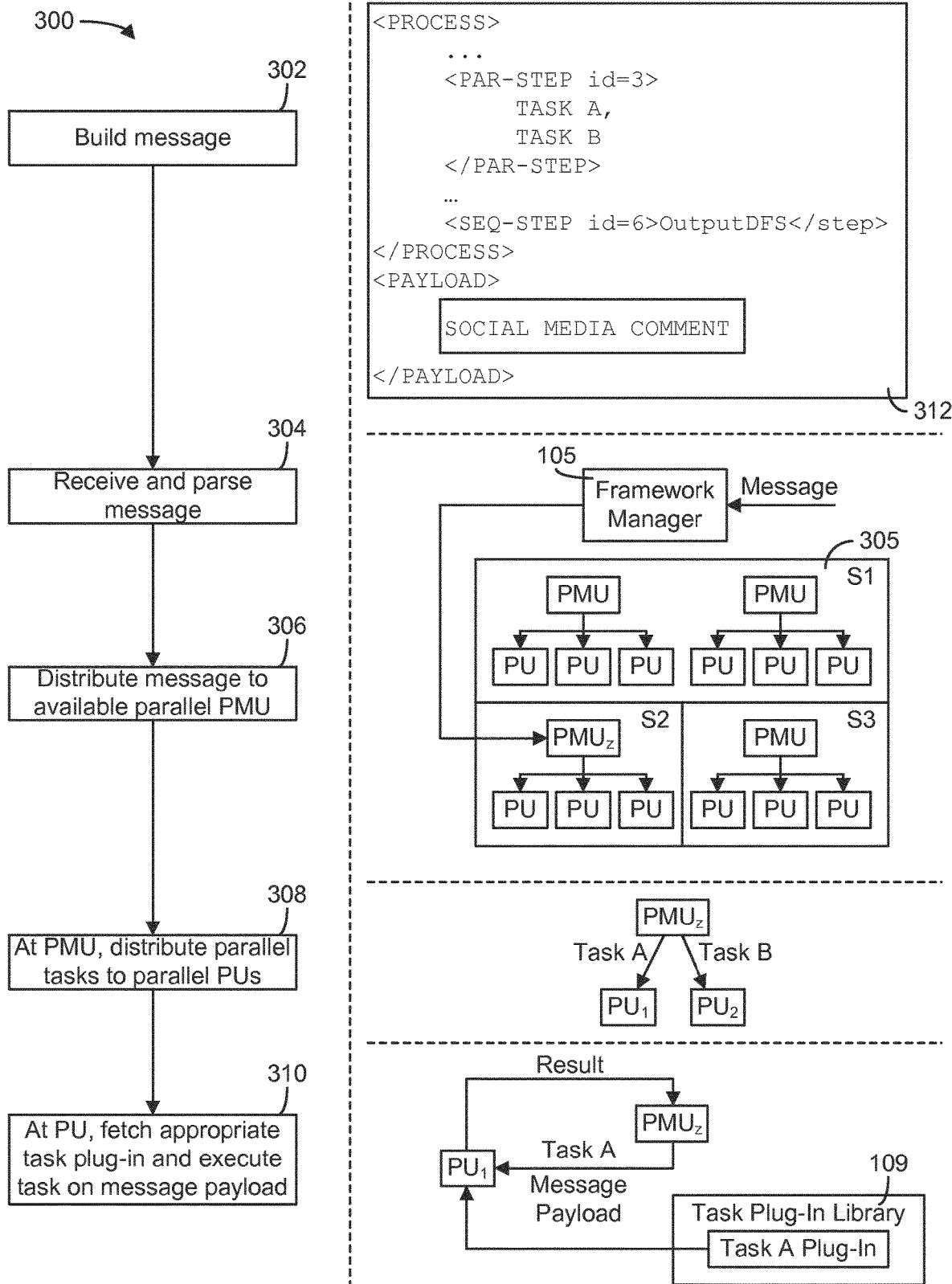
FIG. 3 is a flow chart of a process for parallelizing tasks utilizing the system described in FIGS. 1 and 2, according to an exemplary embodiment.

Referring now to FIG. 3, a flow chart of a process 300 for parallelizing tasks utilizing the system described in FIGS. 1 and 2 is shown, according to an exemplary embodiment. Process 300 is shown to include building a message (step 302). A simplified example message 312 is provided on the right side of FIG. 3 to provide an illustration associated with step 302. As described with reference to FIG. 1, the message 312 may be created on-demand by an activity of a user application, by a crawler process (e.g., configured to scrape data for processing from a social media site), by a messaging interface, by a combination of such elements, and/or in conjunction with one or more databases.

Referring still to FIG. 3, process 300 is further shown to include receiving and parsing the message (step 304). The receiving and parsing may be completed entirely by the framework manager 105. Alternatively, the receiving and parsing may be completed only in enough detail to recognize the next step for distribution to the parallel grid 305. In an exemplary embodiment, the framework manager places messages to be handled into a queue.

In some embodiments, over time, the framework manager 105 can receive information from the server nodes (illustrated as S1, S2, S3) of the parallel grid 305. The information can include status (e.g., whether available or not, capacity, percentage of usage, etc.). The framework manager 105 can use this information to determine where to distribute the message. The framework manager 105, can for example, determine that PMUz on server S2 has available processing capacity and decide to route message 312 to PMUz.

Once messages are received, the framework manager 105 can distribute tasks for parallel processing (step 306) by a plurality of servers (e.g., S1-S3) and by a plurality of processing manager units (PMUs). As shown in FIG. 3, servers S1-S3 and the PMUs within the servers S1-S3 are available to receive parallel tasks from the framework manager 105.

At PMUz running on server S2, the tasks of the message are then distributed to parallel processing units (step 308). As shown in FIG. 3, for example, Task A is provided to PU1 as Task B is provided to PU2. In an exemplary embodiment, Task A is completed independently and asynchronously from Task B at the task processing level, each processing unit PU1, PU2 completing their own task naturally, as server resources allow. The parallel processing units to which the tasks are distributed may include available and/or unavailable processing units. In some embodiments, the processing manager can assign higher processing load tasks to processing units configured to have higher resource allocations than other processing units on the same server. In other embodiments, such prioritization is not done. In some embodiments, each processing unit is generated on the fly as tasks are created. In such an embodiment, for example, when PMUz distributes parallel tasks to PU1 and PU2, PMUz also causes processing units PU1 and PU2 to be created. Once created, the tasks run in parallel.

Referring still to FIG. 3, process 300 is further shown to include, at each processing unit, fetching an appropriate task plug-in from task plug-in library 109 and executing the task on the message payload (step 310). As illustrated in FIG. 3, the processing unit PU1 can pass the result back to the process management unit PMUz. Passing this result back may include transmitting the result, populating a database record on PMUz, and/or conducting any other suitable transmission of result information to PMUz. In an exemplary embodiment, PU1 places the result data back into the message and transmits the message with updated state and result information back to PMUz. Alternatively, PU1 sends the result back to PMUz and PMUz places the result data back into the message with updated state information. PMUz can gather the results of each task (e.g., Task A and B). When PMUz has completed both Task A and Task B, PMUz may continue to parse the message 312. Eventually PMUz will reach the sequential step SEQ-STEP Output_DFS. The task associated with Output_DFS may be run by, for example, PU1. Output_DFS may include outputting the results of Task A and Task B to a distributed file system. Other sequential or parallel steps may be used to complete additional or alternative output steps. For example, in parallel with or in sequence with the output of information to a distributed file system, the message may contain a task of outputting the result to a web service for display.

Referring now to FIG. 4, an example of the source code for the HTML_CLEANER plug-in (e.g., as referenced in FIG. 2) is shown. Plug-ins utilized by the process units can import packages including classes or other resources for use. Each processing unit PU uses the plug-in to instantiate the proper class or classes at runtime to support the requested task.

As the example of FIG. 4 illustrates, the plug-in imports the Jsoup package and the jsoup.safety.Whitelist package, in addition to other packages having resources which support the example plug-in. The illustrated plug-in is written in Scala and generally gets the content payload of the message, uses the Jsoup.clean function to clean the content payloads, and returns the content payload. The plug-in is shown as also outputting a result string of "success," which may be used by the PU or PMU.

Referring now to FIG. 5, another example message for supporting the parallelization is shown. The message includes a representation of the logic to be completed with respect to a payload. The payload is defined near the bottom of the message. As shown, the payload can be defined by an identifier and/or metadata. The data may be embedded in the message itself. In other situations the data is included with the message in the form of a pointer or link to an accompanying file or a separate data store. As shown, the message itself can include header information such as client identifier, project identifier, a timestamp, other identifiers, and a result queue identifier. The task logic is specified to have two sequential tasks (e.g., HTML_CLEANER, DOCUMENT_VALIDATE) to be run prior to the parallel tasks (e.g., LINK_CRAWLER, ENTITY_EXTRACTOR, RELATIONSHIP_DISCOVERY, DEMOGRAPHIC_APPEND, and CORPUS_IDENTIFIER).

Figure 6A:
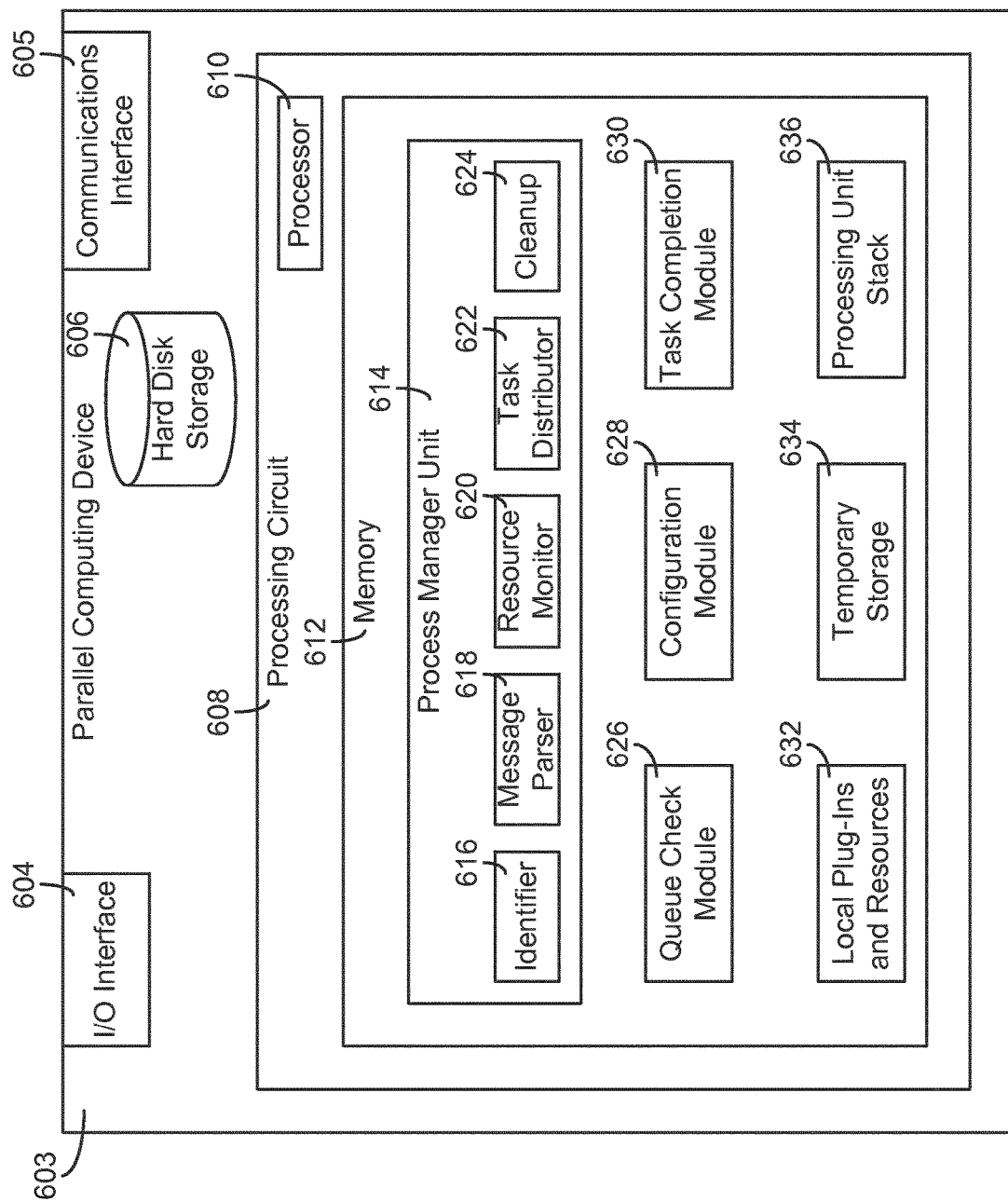
FIG. 6A is a block diagram of a parallel computing device that can be used in the processor of the previous Figures, according to an exemplary embodiment.

Referring now to FIG. 6A, a block diagram of a parallel computing device 603 that can be used in the processor of the previous Figures is shown and described, according to an exemplary embodiment. The parallel computing device 603 may correspond with a server that forms a part of the parallel grid. Advantageously, the parallel computing device 603 does not need to be a part of a server bank. The parallel computing device 603 can run on a computer (e.g., laptop, desktop, remote server, etc.) that is distributed from a central location or server bank. In some embodiments, parallel computing device 603 is or includes purpose-build hardware (i.e., hardware built for a specific application or purpose).

Communications interface 605 may be any type of communications interface configured to communicate with at least the upstream framework manager previously described. For example, the communications interface may be a wireless networking device (e.g., WiFi, Zigbee, Bluetooth, etc.), a wired interface (e.g., Ethernet, USB, Firewire, etc.), and/or can be a slot/plug-in interface (e.g., in an embodiment where the computing unit coupled to a server bank via a blade configuration). The communications may thus be local communication or memory bus communications, wireless communications, Internet communications, and/or wired communications.

Parallel computing device 603 further includes an I/O interface 604. I/O interface 604 may be or include a serial or parallel port interface, a wireless interface, a USB interface, a display interface, a keyboard interface, and/or any other type of I/O interface. In embodiments where the parallel computing device 603 is a blade computer, interface 604 might not be present. In embodiments where the parallel computing device 603 is a laptop computer, the I/O interface 604 may include a display, a touchpad, and/or other interfaces found on laptop computers.

Parallel computing device 603 is further shown to include a processing circuit 608 including a processor 610 and memory 612. Processor 610 may be, or may include, one or more microprocessors, application specific integrated circuits (ASICs), circuits containing one or more processing components, a group of distributed processing components, circuitry for supporting a microprocessor, or other hardware configured for processing. Processor 610 is configured to execute computer code stored in memory 612 to complete and facilitate the activities described herein with respect to the parallel computing device (e.g., process manager unit with processing units).

Memory 612 can be any volatile or non-volatile computer-readable storage medium capable of storing data or computer code relating to the activities described herein. For example, memory 612 is shown to include modules which are computer code modules (e.g., executable code, object code, source code, script code, machine code, etc.) configured for execution by processor 610. According to some embodiments, processing circuit 608 may represent a collection of multiple processing devices (e.g., multiple processors, etc.). In such cases, processor 610 represents the collective processors of the devices and memory 612 represents the collective storage devices of the devices. When executed by processor 610, processing circuit 608 is configured to complete the activities described herein as associated with parallel computing device 603.

Hard disk storage 606 may be a part of memory 612 and/or used for non-volatile long term storage in the parallel computing device 603. Hard disk storage 606 may store local files, temporary files, a queue of messages, tables used for processing, compilers, an operating system, and any other component for supporting the activities of the parallel computing device 603 described herein.

Memory 612 is shown to include process manager unit 614. Process manager unit 614 corresponds with process manager unit 203 of parallel grid 107 shown in previous figures, according to various exemplary embodiments. Process manager unit 604 receives messages (e.g., message 201 of FIG. 2, messages from framework manager 105), parses the messages, and distributes parallel tasks to processing units 636 (e.g., shown in FIGS. 2, 3, etc.).

Process manager unit 614 is further shown to include an identifier 616. Identifier 616 can be an alphanumeric string or other value for uniquely identifying the process manager unit 614. It should be noted that each parallel computing device 603 may include multiple process manager units 614 having unique identifiers. In an alternative embodiment the identifier 616 may be a unique identifier associated with processor 610 or communications interface 605 (e.g., an IP address, a mac address, etc.). The framework manager 105 may use the unique identifiers of the various parallel computing devices 603 to keep track of which devices are available, which devices are a part of the parallel computing grid, and/or to assist with the appropriate distribution of tasks.

Message parser 618 is configured to parse the logic representations of the messages (e.g., message 201 of FIG. 2, messages from framework manager 105, etc.). When message parser 618 encounters a message having parallel tasks, message parser 618 distributes the tasks to available processing units of the processing unit stack 636 using task distributor 622. Task distributor 622 can use resource information of the processing unit stack 636 to determine how to distribute parallel tasks. Task distributor 622 may use historical task-to-load information to estimate how intensive a task will be. In an exemplary embodiment, task distributor 622 can adjust its task distribution scheme depending on the types of tasks, the current processing load of the parallel computing device, and/or the average time to completion of tasks.

Processing unit stack 636 can be self-managing (e.g., as new processing units are needed, processing unit stack 636 can create a new processing unit for use by the process manager unit). In other embodiments, processing unit stack 636 is managed by process manager unit 614. Resource monitor 614 can be used by process manager unit 614 to adapt the number of allocated processing units. Cleanup module 624 can conduct any necessary garbage collecting, reduction of processing units when not necessary, or other clean-up tasks.

Process manager unit 614 includes resource monitor 620. Resource monitor 620 may periodically check the available resources of processing unit stack 636. Resource monitor 620 may also monitor the number of tasks required to be completed. Resource monitor 620 may interface with task distributor 622 to optimally assign tasks to processing units within processing unit stack 636. Temporary storage module 634 may provide temporary storage tasks, payloads, outputs, etc. required for processing circuit 608. Process manager unit 614 may control access to temporary storage 634 for processing unit stack 636. Memory 612 also includes a local plug-ins and resources module 632. Local plug-ins and resources module 632 may store the plug-in retrieved from the plug-in library 109. In some embodiments, local plug-ins and resources module 632 may also store models retrieved from the model shop 111. Processing unit stack 636 may access local plug-ins and resources module 632 as required to complete tasks using the corresponding plug-in or model. Memory 612 also includes queue check module 626. Queue check module 626 is used to check the tasks assigned to the parallel computing device. In some embodiments, queue check module 626 may also check the queue of each processing unit in the processing unit stack 636. Queue check module 626 may be accessed by process manager unit 614 in order to assign outstanding tasks to processing units within the processing unit stack 636 and to keep track of tasks assigned to the parallel computing device 603. Memory 612 also includes configuration module 628. Configuration module 628 may be accessed by process manager unit 614 in order to configure the processing circuit 608 to perform the assigned task. For example, configuration module 628 may be accessed by process manager unit 614 in order to determine the correct plug-ins to retrieve from the plug-in library for a particular task.

Figure 6B:
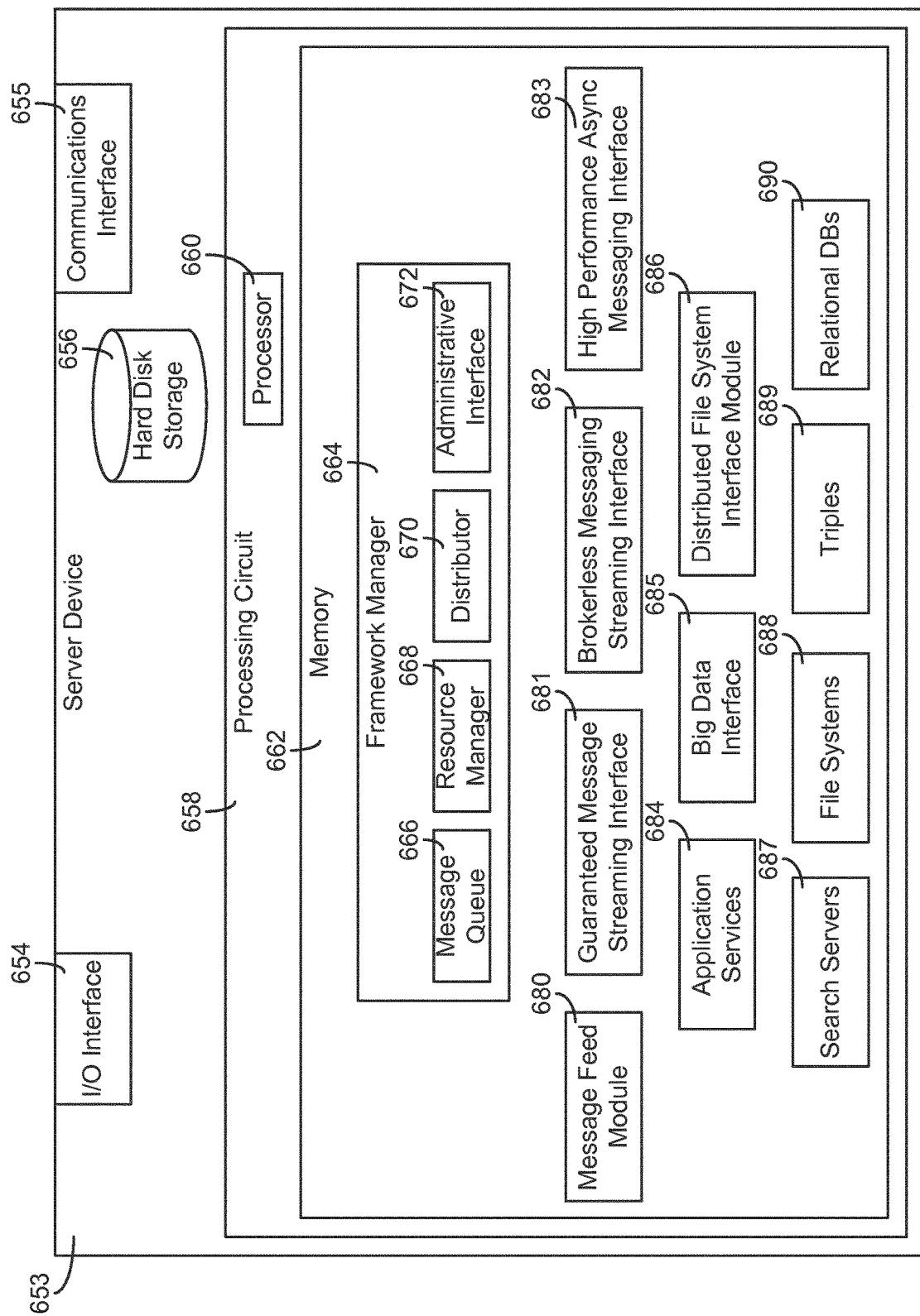
FIG. 6B is a block diagram of a server device including a framework manager that can be used with the parallel computing device and processing grid of the previous Figures, according to an exemplary embodiment.

FIG. 6B is a block diagram of a server device 653 including a framework manager 664 that can be used with the parallel computing device and processing grid of the previous Figures, according to an exemplary embodiment. The server device 653 may correspond with a server that forms a part of the parallel grid. The server device 653 may alternatively run on a computer (e.g., laptop, desktop, remote server, etc.) that is distributed from a central location or server bank. The server device may be a parallel computing device containing the framework manager.

Communications interface 655 may be any type of communications interface configured to communicate with at least the upstream framework manager previously described. For example, the communications interface 655 may be a wireless networking device (e.g., WiFi, Zigbee, Bluetooth, etc.), a wired interface (e.g., Ethernet, USB, Firewire, etc.), and/or can be a slot/plug-in interface (e.g., in an embodiment where the computing unit coupled to a server bank via a blade configuration). The communications may thus be local communication or memory bus communications, wireless communications, Internet communications, and/or wired communications.

Server device 653 further includes an I/O interface 654. I/O interface 654 may be or include a serial or parallel port interface, a wireless interface, a USB interface, a display interface, a keyboard interface, and/or any other type of I/O interface. In embodiments where the server device 653 is a blade computer, interface 654 might not be present. In embodiments where the server device 653 is a laptop computer, the I/O interface 654 may include a display, a touchpad, and/or other interfaces found on laptop computers.

Server device 653 is further shown to include a processing circuit 658 including a processor 660 and memory 662. Processor 660 may be, or may include, one or more microprocessors, application specific integrated circuits (ASICs), circuits containing one or more processing components, a group of distributed processing components, circuitry for supporting a microprocessor, or other hardware configured for processing. Processor 660 is configured to execute computer code stored in memory 662 to complete and facilitate the activities described herein with respect to the server device (e.g., framework manager unit with modules).

Memory 662 can be any volatile or non-volatile computer-readable storage medium capable of storing data or computer code relating to the activities described herein. For example, memory 662 is shown to include modules which are computer code modules (e.g., executable code, object code, source code, script code, machine code, etc.) configured for execution by processor 660. According to some embodiments, processing circuit 658 may represent a collection of multiple processing devices (e.g., multiple processors, etc.). In such cases, processor 660 represents the collective processors of the devices and memory 662 represents the collective storage devices of the devices. When executed by processor 660, processing circuit 658 is configured to complete the activities described herein as associated with server device 653.

Hard disk storage 656 may be a part of memory 662 and/or used for non-volatile long term storage in the server device 653. Hard disk storage 656 may store local files, temporary files, a queue of messages, tables used for processing, compilers, an operating system, and any other component for supporting the activities of the server device 653 described herein.

Memory 662 includes framework manager 664. Server device 653, using framework manager 664, receives messages from the message source. Framework manager 664 temporarily stores messages from the message source in message queue 666. Framework manager 664 uses resource manager 668 in conjunction with communications interface 655 and I/O interface 654 to determine how to allocate tasks associated with the messages. Tasks may be allocated to parallel computing devices 603 within parallel grid 107 based on the resources available to each parallel computing device 603 and the queue of tasks already assigned. Framework manager 664 includes distributor 670. Server device 653 uses distributor 670 along with I/O interface 654 and communications interface 655 to send messages and associated tasks to each parallel computing device 603. Framework manager 664 also includes administrative interface 672. Administrative interface 672 may be used to allow a client or user to change the parameters of framework manager 664. For example, administrative interface 672 may be configured to allow a client or user to determine the amount of resources to be used to handle tasks. This may constitute a portion of all the parallel computing devices 603 available. Administrative interface 672 may also be configured to allow a client or user to prioritize tasks such that certain tasks are performed first or sooner than others. Administrative interface 672 may be configured to allow a client or user to select particular computing resources to handle particular tasks. In some embodiments, administrative interface 672 may be used by a client or user to select which plug-ins will be used for a particular task or which plug-ins and/or models are made available to parallel computing devices 653.

Memory 662 of server device 653 further includes several modules. Server device 653 includes a message feed module 680. Message feed model 680 is configured to retrieve the messages from the message source. In some embodiments, message feed module 680 may be configured with administrative interface 672. Message feed module 680 may be configured to retrieve or ingest messages only from particular message sources. Message feed module 680 may also be configured to only retrieve messages meeting certain user or system defined parameters. Memory 662 also includes a guaranteed message streaming interface 681. As described above, guaranteed message streaming interface module 681 is configured to receive messages, from the message feed module 680 in this embodiment, and is configured to standardize the data within the message for use by the framework manager 664. Standardizing the data may include standardizing the message data from a first standard to a second standard. In this embodiment, memory 662 further includes a brokerless messaging streaming interface 682. As previously described, brokerless messaging streaming interface module 682 allows any message broker to communicate with the framework manager 664 as executed by the server device 653. Multiple languages or platforms may be used when the framework manager 664 communicates with the message feed module 680. In some embodiments, and as is shown, memory 662 includes a high performance asynchronous messaging interface module 683. Server device 653 may use the high performance asynchronous messaging interface module 683 to control communication between the message feeds and the server device 653 running the framework manager 664. The high performance asynchronous messaging interface module 683 may be used to place a message in the message queue 666 if the framework manager 664 is otherwise busy or not connected to the message source.

In the illustrated embodiment, server device 653 includes several modules in memory 662 which may be used to control output from and input into the framework manager 664 running on server device 653. Server device 653 may include an application services module 684 as discussed previously and in following paragraphs. Application services module 684 may be used by server device 653 to display outputs from the parallel grid. In some embodiments, application services module 684 may be further used by server device 653 to provide inputs into the framework manager 664. For example, a client or user may input data through an application service such as a private application 147 which may be run by application services module 684 on server device 653. This data may then be handled by the framework manager running on server device 653. Server device 653 may also include a big data interface module 685. Big data interface module 685 facilitates output to big data stores and input from big data stores to the framework manager 664. Server device 653 may further include a distributed file system interface module 686. Distributed file system interface module 686 may be used by server device 653 and framework manager 664 to retrieve data from the distributed file system 113. This data may be used as an input into the framework manager 664 for distribution to the parallel grid 107. The application services module 684, big data interface module 685, and distributed file system interface module 686 may also be used by the framework manager 664 to designate an output destination for parallel grid 107 and the parallel computing devices 603 therein.

The illustrated embodiment also includes four modules for controlling the output of parallel grid 107. Memory 662 includes search servers module 687. Search servers module 687 may be used by server device 653 to designate that parallel grid 107 output to search servers 151. Search servers module 687 may further be used to control the parameters corresponding to the operation of the search servers 151. For example, search servers module 687 may be used to designate which search server 151 to output to or the architecture of the output. Memory 662 also includes a file systems module 688. File systems module 688 may be used by server device 653 to designate that parallel grid 107 output to a particular file system 153. For example, file systems module 688 may be used by the framework manager 664 and server device 653 to cause parallel grid 107 to output to the file systems 153 using a particular file type. For example, New Technology File System may be used. Triples module 689 of the illustrated embodiment controls the parameters associated with parallel grid 107 output to triples 155. For example, triples module 689 may set the three parameters to be output to triples 155. For example, the output to triples 155 may be set to include the payload, an associated emotion, and an associated behavioral correlate. Memory 662 also includes a relational databases module 690. Relational databases module 690 may set the parameters for output to relational databases 157. For example, relational databases module 690 may be configured to provide for output of parallel grid 107 to relational databases 157 and control what values are output. For example, the payload and estimated emotion may be the only outputs, or the outputs could include the estimated behavioral correlate as well. These four modules, the search servers module 687, file systems module 688, triples module 689, and relational database module 690, may also be configured to provide for inputs into the framework manager run by server device 653.

Figure 7A:
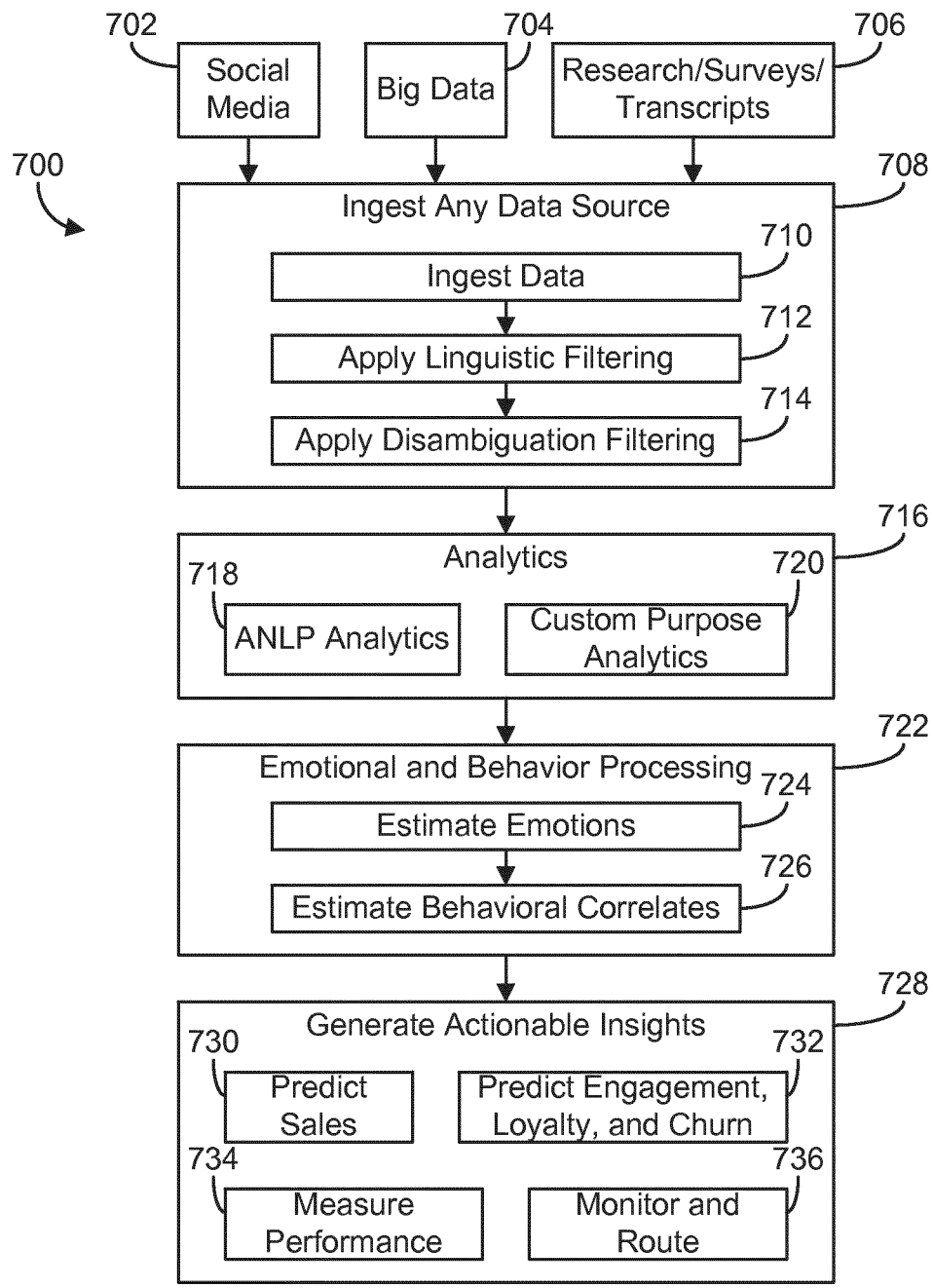
FIG. 7A is a process for processing message payload content to determine emotional scores and behavioral correlates, according to an exemplary embodiment.

FIG. 7A is a flowchart illustrating the steps for processing message payload content to determine emotional scores and behavioral correlates, according to an exemplary embodiment. Process 700, using the components and steps discussed above, ingests data 708, performs analytics 716, conducts emotional and behavior processing 722, and generates actionable insights 728. Data sources for process 700 may include any of social media 702, big data 704, or research, surveys, or transcripts 706. These data sources may be provided by the client or user, third party data collection and/or analysis services, or retrieved from social media sources. For example, social media 702 data may include posts from social media websites or other information generated by web crawlers targeted towards social media providers. Big data 704 may be provided by a client or user or may be acquired from third parties. Big data 704 may also be generated from partners and streaming sources. For example, big data 704 may include an archive of social media posts maintained by a client or user for a given period of time. This period of time may be of any length or may be targeted. In some embodiments, the client or user may provide an archive of social media posts spanning a time frame corresponding with a new product launch. Such data would be ingested as big data 704. Research, surveys, or transcripts 706 may also provide a source of data for process 700. Any data source may be generated or may be provided by a client or user. In some embodiments, the client or user may provide data for analysis by process 700 through application services 117, 684. For example, a client or user may provide data for analysis through a private application 147 which may be accessed via a browser in some embodiments.

Process 700 ingests any data source 708 including social media 702, big data 704, and research, surveys, transcripts 706. The data is first ingested 710. Data is gathered from sources including social media 702, big data 704, or research, surveys, or transcripts 706. The data ingested is then processed by applying linguistic filtering 712. Linguistic filtering 712 may include determining that the language of the post (e.g. English, French, German, etc.) corresponds to the relevant market for which process 700 is being applied. Linguistic filtering 712 may also include ensuring that payload content (e.g., a paragraph of text to be processed from a social media post) is generated by a consumer rather than a merchant or automated source. Disambiguation filtering 714 is also applied to the payload. Disambiguation filtering 714 may filter out payload content with multiple possible meanings. In some embodiments, disambiguation filtering 714 may elect a meaning and assign it to the content of the payload. The combination of applying linguistic filtering 712 and applying disambiguation filtering 714 in ingesting any data source 708 may include preprocessing, cleaning, harmonizing, or normalizing of the payload.

The ingested data source and corresponding payload are analyzed using analytics 716. Analytics 716 may include one or both of ANLP Analytics 718 and custom purpose analytics 720. Analytics 716 may further include plug-ins and model shop content. ANLP Analytics 718 and custom purpose analytics 720 are accessed by the components of parallel grid 107 in order to analyze the payload as required by the tasks included in the message (e.g. to process or transform the payload content of the message).

The analyzed payloads may then be further processed to estimate the emotions associated with the payload and to estimate the behavioral correlate to the emotion. Emotional and behavior processing 722 includes estimating emotions 724 and estimating the behavioral correlates 726. To estimate emotions 724, components of parallel grid 107 apply plug-ins from the plug-in library 109 and/or models from the model shop 111 to the payload. This results in an estimated emotion associated with the payload. For example, the payload may be estimated to contain the emotion anger. In some embodiments, multiple emotions may be estimated to correspond to a payload. These emotions may be scored or assigned a value relative to the perverseness or strength of the emotion in the payload. In some embodiments, the emotion with the highest score may be assigned to the payload. In other embodiments, or depending on the needs of the client or user, the emotion with the highest score will be assigned to the payload and all other estimated emotions will be disregarded. To estimate behavioral correlates 726, components of parallel grid 107 apply plug-ins from the plug-in library 109 and/or models from the model shop 111 to the payload. This results in an estimated emotional correlate corresponding to the payload and the emotion corresponding with the payload. For example, the payload may be estimated to contain the emotion anger and be further estimated to be associated with the emotional correlate of likely to return the product.

The payload may be further processed by process 700 in order to generate actionable insights 728. In some embodiments, process 700 generates actionable insights 728 through the use of the components of parallel grid 107, plug-ins from the plug-in library 109, and/or models from the model shop 111. In some embodiments, process 700 may generate actionable insights 728 through application services 117, 684. The application services 117, 684 may run independently of parallel grid 107. One or more application services 117, 684 may run on servers. In some embodiments, application services 117, 684 may be performed as tasks with parallel grid 107 and the associated components including the plug-in library 109 and/or the model shop 111. For example, process 700 may predict sales 730, measure performance 734, predict engagement 732, loyalty, and churn, and/or monitor and route 736.

Process 700 may predict sales 730 using emotion scores assigned to the payload in earlier processes of process 700. One or more emotion scores assigned to the payload may be used to predict sales 730. Multiple payloads determined to be related to the same product through process 700 may be analyzed by application services 728 to predict sales 730. In some embodiments, a weighted average of emotion scores may be used or other similar analytic technique (e.g. average emotion score, median emotion score, distribution of emotion score, modeling of behavior associated with emotion score, etc.). In some embodiments, the estimated behavioral correlate 726 may be used alone or in conjunction with the estimated emotion 724 to predict sales 730.

Process 700 may measure performance 734. In some embodiments, application services 728 may measure performance 734 using estimated emotions 724 and estimated behavioral correlates 726 as related to specific brand attributes. For example, all the payloads determined to be associated with the client or user's brand may be processed with process 700. The resulting estimated emotions and/or estimated behavioral correlates may be used by application services 117, 684 to assign one or more brand attributes to the brand being analyzed. In some embodiments, application services 117, 684 may also be used to measure performance 734 by determining brand awareness. For example, process 700 may be used to analyze message feeds 103 related to a particular class of product. The message feeds may be further analyzed to determine what percentage or distribution of payloads have an estimated emotion 724 and/or estimated behavioral correlate 726 associated with the client or user's brand. In some embodiments, brand awareness may be further analyzed to determine if the brand awareness is primarily related to positive estimated emotions and positive estimated behavioral correlates or negative estimated emotions and behavioral correlates. The results may be reported in absolute terms (e.g. positive) or relative terms (e.g. 60% positive, 40% negative). In some embodiments parallel grid 107 and the associated components may be used in conjunction with or in place of application services 117, 684 to measure performance 734.

Process 700 may predict engagement, loyalty, and/or churn 732. Process 700 may predict engagement, loyalty, and/or churn 732 by determining shock and loyalty experiences related to a brand. For example, process 700 may determine the number of payloads associated with a particular brand. Process 700 may further determine the number of payloads in that set with a positive estimated emotion 724 and/or an estimated behavioral correlate corresponding to brand loyalty. Process 700, through application services 117, 684 and/or parallel grid 107 and the associated components, may predict engagement, loyalty, and/or churn 732 based on the percentage, distribution, or strength of the positive estimated emotions 724 and/or the estimated behavioral correlates 726 corresponding to brand loyalty relative to the total number of payloads associated with a particular brand. In some embodiments, process 700 may predict engagement, loyalty, and/or churn 732 through similar analytic processes using other estimated emotions 724 and/or estimated behavioral correlates 726. For example, the percentage or distribution of negative estimated emotions 724 and/or negative behavioral correlates 726 relative to the total number of payloads associated with a particular brand may be used to predict engagement, loyalty, and/or churn 732.

Process 700 may also monitor and route 736. In some embodiments, process 700 may monitor and route 736 through social listening and response. For example, process 700 may be used to determine if a brand or product has negative estimated emotions 724 and associated negative estimated behavioral correlates 726. Social media data sources may indicate, through process 700, that a product has a substantial number of payloads with an associated estimated behavioral correlate 726 of likely not to purchase the product again. A client or user may take an action in response to the generated actionable insight 728 to attempt to recapture the consumer's business or loyalty.

Generally, demographic variables are collected from consumers. For example, these demographic variables may include age, gender, region, income, etc. The consumers then provide a corpus of comments about their experiences with products and services. The same consumers also provide completed survey which help them to describe thoughts, feelings, behaviors, etc. which relate to their experiences with products and services described in the comments. The surveys provide a state of mind associated with the comment and the person who wrote the comment. Using this correlation between experience with products, comments, and state of mind, a computational model is created predicting consumers' state of mind from comments gathered from other sources. The model uses the association between language and emotion. As has been previously described these comments may gathered from a variety of sources such as social media, big data etc. The computational model just described is implemented by the system previously described through the plug in library and model shop. The analysis is conducted using the systems and methods previously described herein.

In some embodiments, models go through a confirmatory analysis prior to being implemented through the plug in library and/or model shop. Crowdsourcing techniques are used to validate and refine the computational models. In this process, human raters read comments taken from sources, such as social media, and rate the emotional state expressed in the comment. The human ratings are compared to the ratings generated by the computation model that was developed using the above described steps. For example, traditional validation methods (97% target) as well as the Turing test may be used. If there is a match, within tolerances, then the model is valid and is used in the analysis. If the there is no match, the model requires refinement.

The models created are scalable and may be used in any context. The models may be used for any brand or company. Additionally, the process of creating models and validation is repeated to grow the model and improve the accuracy of the model with respect to understanding emotion and behavior. Thus the analysis improves over time.

Figure 7B:
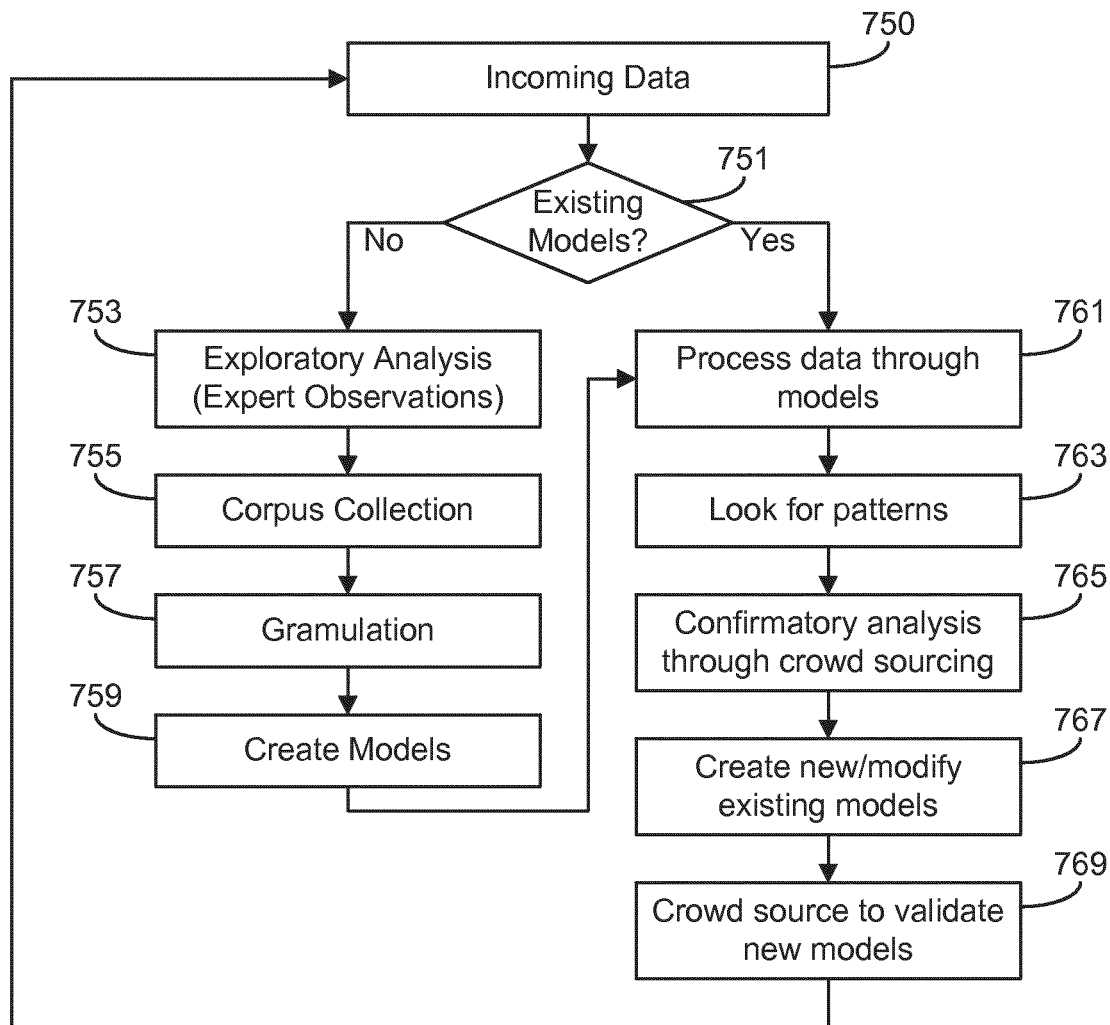
FIG. 7B is a flowchart illustrating the process of model creation and validation according to an exemplary embodiment.

An embodiment of the model creation and validation process is illustrated in FIG. 7B. Incoming data (750) is gathered from a data source. The incoming data may be comments generated from consumers as discussed above in relation to the model generation process. In other embodiments, the incoming data may come from other sources. For example, the incoming data may be gathered from social media website. Then, it is determined whether there are existing models (751). If there are no existing models, then exploratory analysis (expert observations) is conducted (753). In some embodiments the exploratory analysis is conducted by human raters. As previously described, demographic variables may be collected pertaining to authors of the data. Corpus collection takes place (755). This includes gathering comments. In some embodiments, this step may include the creation of additional comments written by real consumers about their experiences. The collected corpus is gramulated with gramulation techniques (757). In some embodiments, this process includes breaking the collected corpus and/or comments within the corpus down into smaller parts. For example, a comment may be broken down into individual words to be analyzed. Models are then created (759). In some embodiments, the models are created using the techniques described above. The authors of the corpus of comments complete surveys including thoughts, feelings, and behavior which link the commenter's state of mind to the comment. The computational model is then constructed using this association between words of the comments and the survey results. The model is capable of predicting consumer state of mind. Once the model has been created (759), data is processed through the model (761).

In the case that there are existing models at step (751), the incoming data is processed through the models (761). The models analyze the data to predict consumer state of mind (e.g. emotion). Patterns are looked for in the results (763). For example, patterns which appear to be caused by errors in the model may be identified and the model adjusted. A confirmatory analysis through crowd sourcing is then performed (765). This step may include, as discussed above, human raters assigning an emotion to the same data processed with the model. The results of the human raters and the models are compared. Using this comparison, new models are created and/or models may be modified (767). For example, models may have additional words with associated emotional states added to them, additional contextual situations for certain words and the associated emotions may be provided to the model, etc. The new model and/or modified model is then crowd sourced to validate the new model and/or modified model (769). This may include comparing the results for the emotions attached to each comment from the human raters to the emotions attached to each comment by the new and/or modified models. The comments may then be reused as incoming data (750). In some embodiments additional new comments may be added as incoming data.

The results of the analysis, using the previously described systems and methods, are accessed using the previously described application services. These application services may include private applications, public applications, etc. The application services may be implemented through a user interface. The user interface may access information from the distributed file system or other sources to display to the user the results of the analysis conducted using the systems and methods described herein.

Figure 8A:
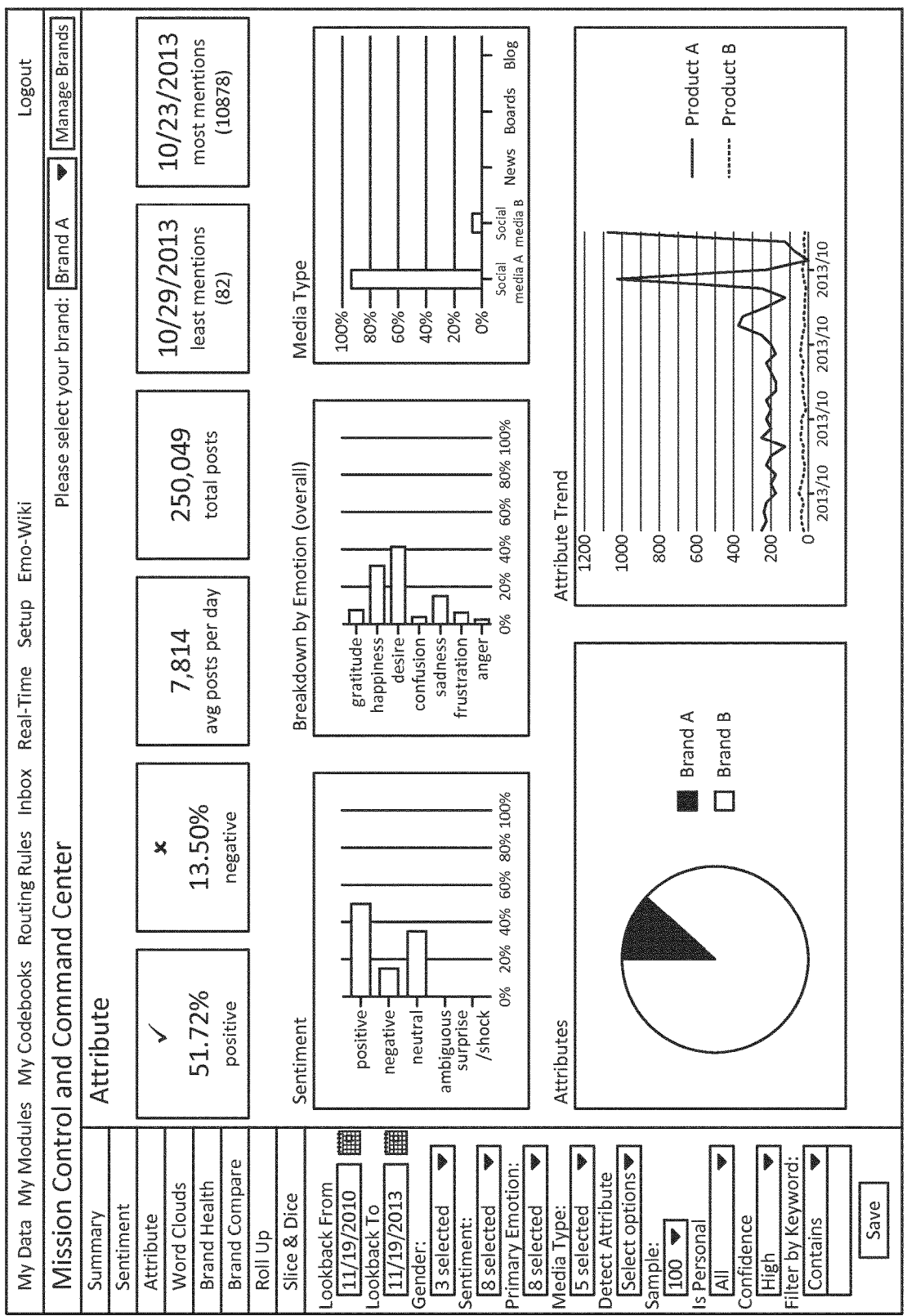
FIG. 8A illustrates, according to one embodiment, a user interface page showing information regarding attributes of one or more brands.

FIGS. 8A-8R illustrate an embodiment of a user interface which may allow a user to access the previously described application serves and/or interact with the systems and methods previously described for conducting the analysis. FIGS. 8A-8R illustrate a variety of pages which may be presented to a user according to an embodiment of the invention. The pages are presented to the user through a dashboard having a Mission Control and Command Center allowing for the selection of a brand and the management of brands. A particular brand which may be selected using the drop down window displayed in the upper right hand corner of the interface. A user may also manage the brands which are selectable through the drop down menu by clicking the manage brands button also located in the upper right hand corner of the display. In some embodiments, a user may manage other aspects of the brands using the manage brands button. With general reference to FIGS. 8A-8R, the user interface/display includes a menu ribbon at the top of the display. The menu ribbon may be made up of buttons and/or dropdown menus. In some embodiments, the menu ribbon may include hyperlinks. The menu ribbon includes menus for My Data, My Modules, My codebooks, etc. each of which will be discussed with reference to later drawings. The menu ribbon allows a user to access the information associated with each menu and to provide inputs where relevant. The user interface/display further includes a navigation panel on the left with buttons associated with summary, sentiment, attribute, word clouds, brand health etc. pages. These pages may be accessed by a user by clicking on the associated button in the navigation panel. These pages are discussed in greater detail with reference to the associated figures herein.

FIGS. 8A-8R further illustrate a filed with filter parameters located in the lower left hand corner of the display. The filter filed includes fields allowing the user to select a date range for which information will be displayed about the brand. The filter field further allows the user to filter the data presented by the attributes of the commenter. For example and as illustrated, a user may select a class of consumer for which brand data will be displayed (e.g. gender). Multiple genders may be selected. In some embodiments, the user may filter the information displayed by other categories pertaining to commenters such as race, ethnicity, age, place of residence, income, etc. The user may also select using the drop down menus of the filter field the particular sentiments for which data will be displayed, the primary emotions for which data will be displayed, and/or the media type from which comments originated. Users may also use the detect attribute drop down menu to filter the data used in the analysis by one or more attributes which were detected. For example, a user could use the drop down to only display results for comments which included happiness, excitement, and anger. Furthermore, the user may select the sample size to be used in the analysis by selecting a sample size from the sample drop down menu in the filter field. In some embodiments, the Is Personal drop down menu may be used to filter the results by the type of comment that is made. For example, the drop down menu may be used to filter out comments which are made on a brands social media page, published outside of social media, made by corporate social media accounts, etc. In some embodiments, the confidence drop down menu may be used to filter the results depending on the confidence level attached to the analysis of each comment. For example, results which detect an attribute with low confidence that the comment is characterized by the attribute may be filtered out of the results.

With continued general reference to FIGS. 8A-8R. FIGS. 8A-8R illustrate various charts and graphs. In some embodiments, the information displayed may be displayed using a chart or graph other than what is depicted in the figures. For example, information may be displayed in formats such as bar charts, pie graphs, word clouds, line graphs, etc. Furthermore in some embodiments, the information displayed may be organized in a different manner than what is depicted. For example, higher level detail may be positioned in a column on the left side of the display, finer level detail in a middle column, and comparisons in a rights column. The illustrations provided in FIGS. 8A-8R also represent the default views provided to users for each page. In some embodiments, the default views may be different. In some embodiments, the default views, which may or may not include filter settings, may be customized by a user.

FIG. 8A illustrates a Mission Control and Command Center which displays a variety of brand data to the user. In FIG. 8A information the attribute page is particularly displayed. The attribute information is displayed for a particular brand which may be selected using the drop down window displayed in the upper right hand corner of the interface. A user may also manage the brands which are selectable through the drop down menu by clicking the manage brands button also located in the upper right hand corner of the display. The attribute information displayed includes a top row of higher level information. This includes the percentage of positive emotions and/or attributes associated with the brand. The higher level information also includes the percentage of negative emotions and/or attributes associated with the brand. In some embodiments, the higher level information displayed in the top row may include percentages of other emotions and/or attributes associated with the brand. For example, the higher level information may include the percentage of neutral, ambiguous, surprise, shock, etc. emotions and/or attributes associated with the brand. In some embodiments, these attribute percentages may be determined with regard to a number of social media posts. As is illustrated the higher level information displayed in the top row may include the average number of social media posts per day. In some embodiments, this is the number of posts on a brands social media page. In other embodiments, this may be the number of posts per day which mention the brand or a product of the brand across numerous social media pages and/or profiles. Also displayed among the higher level information in the top row may be the total number of social media posts.

As just described, this may be the total number of posts on a brand page or, in some embodiments, may be the total number of posts across multiple social media pages and/or profiles. Also displayed in the top row is the date on which the least mentions of the brand, or a product of the brand, occurred. Also included with this information is the actual number of mentions. The top row may further include the date on which the most mentions of the brand, or a product of the brand, occurred. In some embodiments, the top row of high level information may include additional or other information which may be chosen by the user.

Also included is a middle row of charts illustrating finer detail than the higher level detail top row. The finer detail charts may illustrate the percentage of various sentiments corresponding to attributes of the selected brand (e.g. the products of the brand). Multiple attributes may be shown on each chart by color coding the attributes. The finer detail row may also include a chart illustrating the breakdown by emotion of attributes associated with a brand. This breakdown may include such emotions as gratitude, happiness, desire, confusion, etc. associated with the brand. Also included in the finer detail row of charts is a breakdown of the media type used in the analysis displayed. The media type breakdown illustrates the sources of the information used to analyze the attributes associated with the selected brand. For example, the media type chart may illustrate the percentages of social media posts from a first social networking website, social media posts from a second social networking website, news stories mentioning the brand, comments on message boards, blog posts, etc. The breakdown by media type may be color coded so as to show what attributes of a brand receive comments from which media source.

With continued reference to FIG. 8A, the lower displays comparison information. The comparison information may compare two or more brands, attributes of two or more brands, and/or two or more attributes. In some embodiments, the two or more products are of a same brand. In some embodiments, the two or more products are competing products from different brands. As is illustrated, brand attributes may be compared using a pie chart. Comments about two or more brands may be analyzed for a particular attribute. The share of total positive emotions and/or sentiments for each brand may be displayed using a pie chart. In some embodiments, negative attributes or particular attributes may be compared. Furthermore, in some embodiments other charts may be used to display the information (e.g. bar chart). The comparison information may also include a chart illustrating the attribute trends for one or more products. The attribute trend may illustrate the number of positive attribute comments a product receives over time.

Figure 8B:
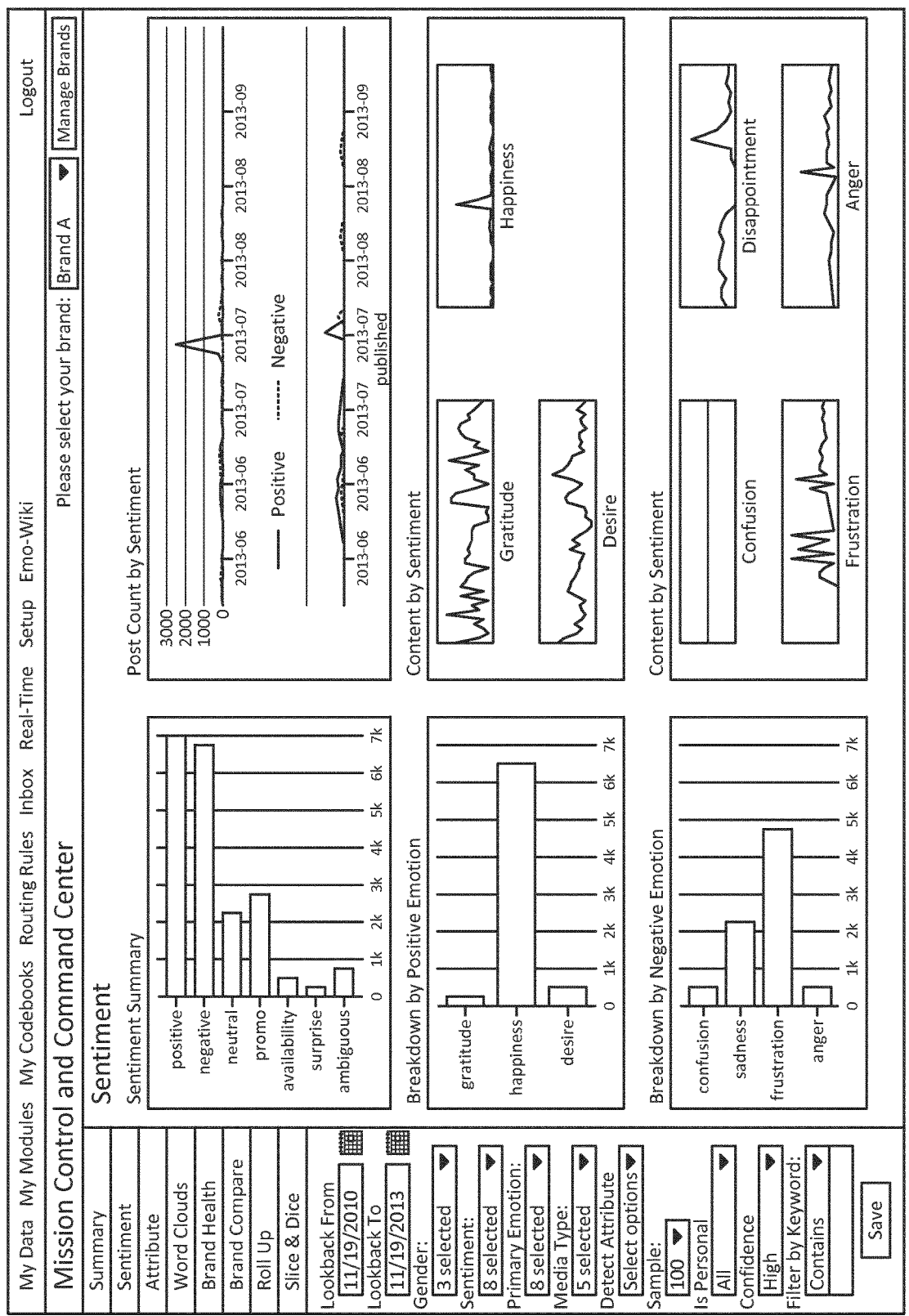
FIG. 8B illustrates, according to one embodiment, a user interface page showing information regarding sentiment of one or more brands.
Figure 8C:
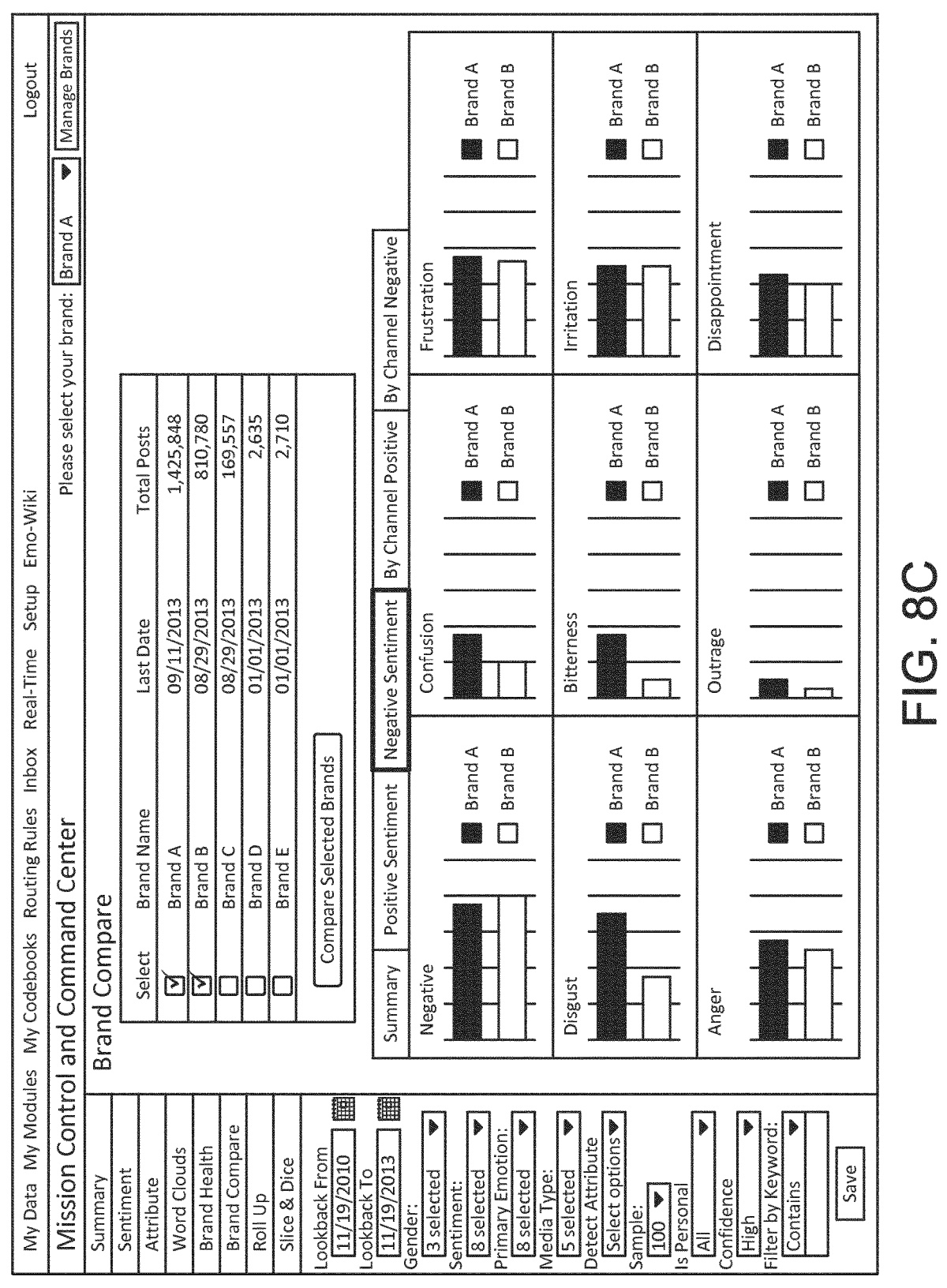
Figure 8F:
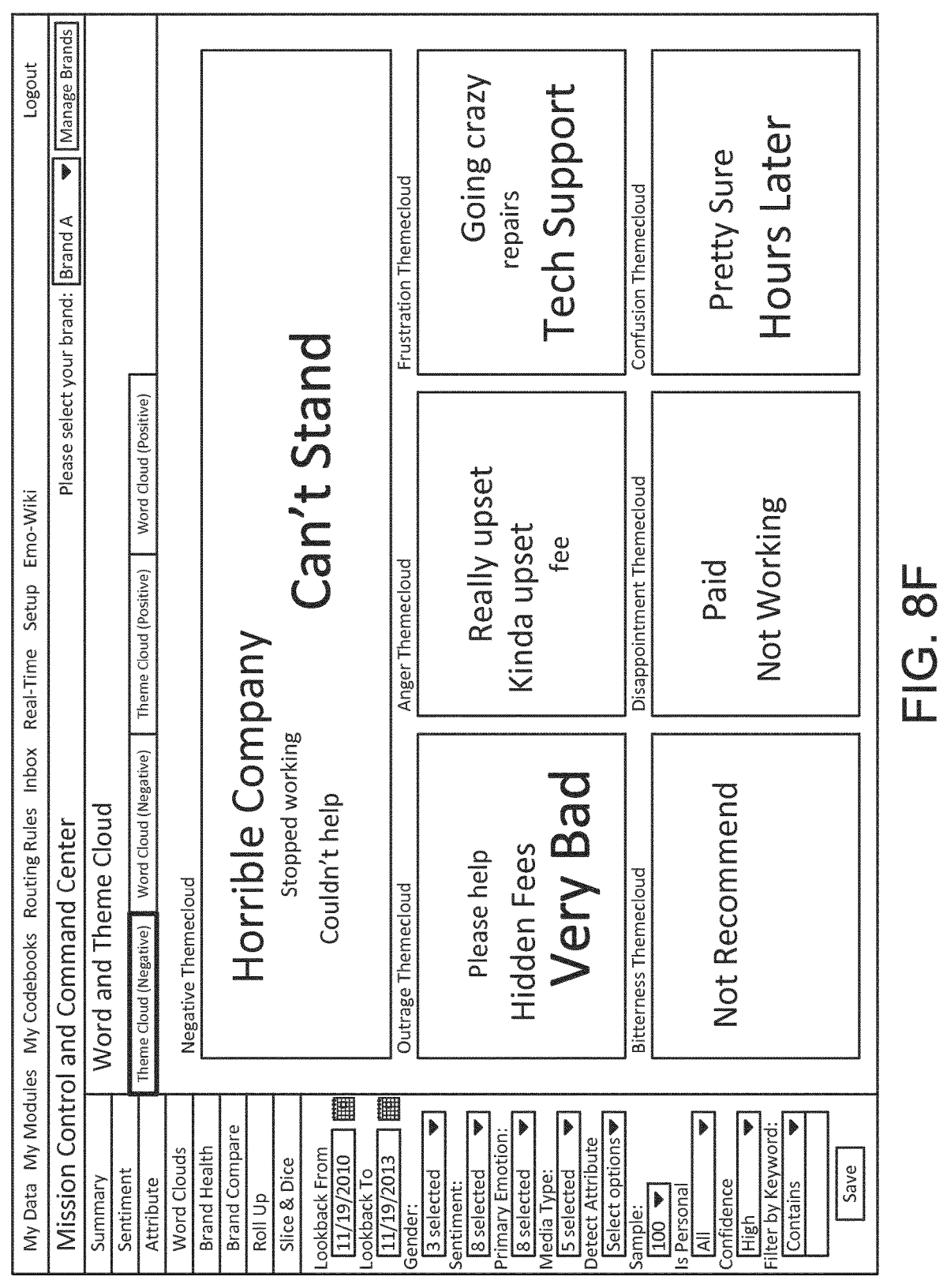
Figure 8G:
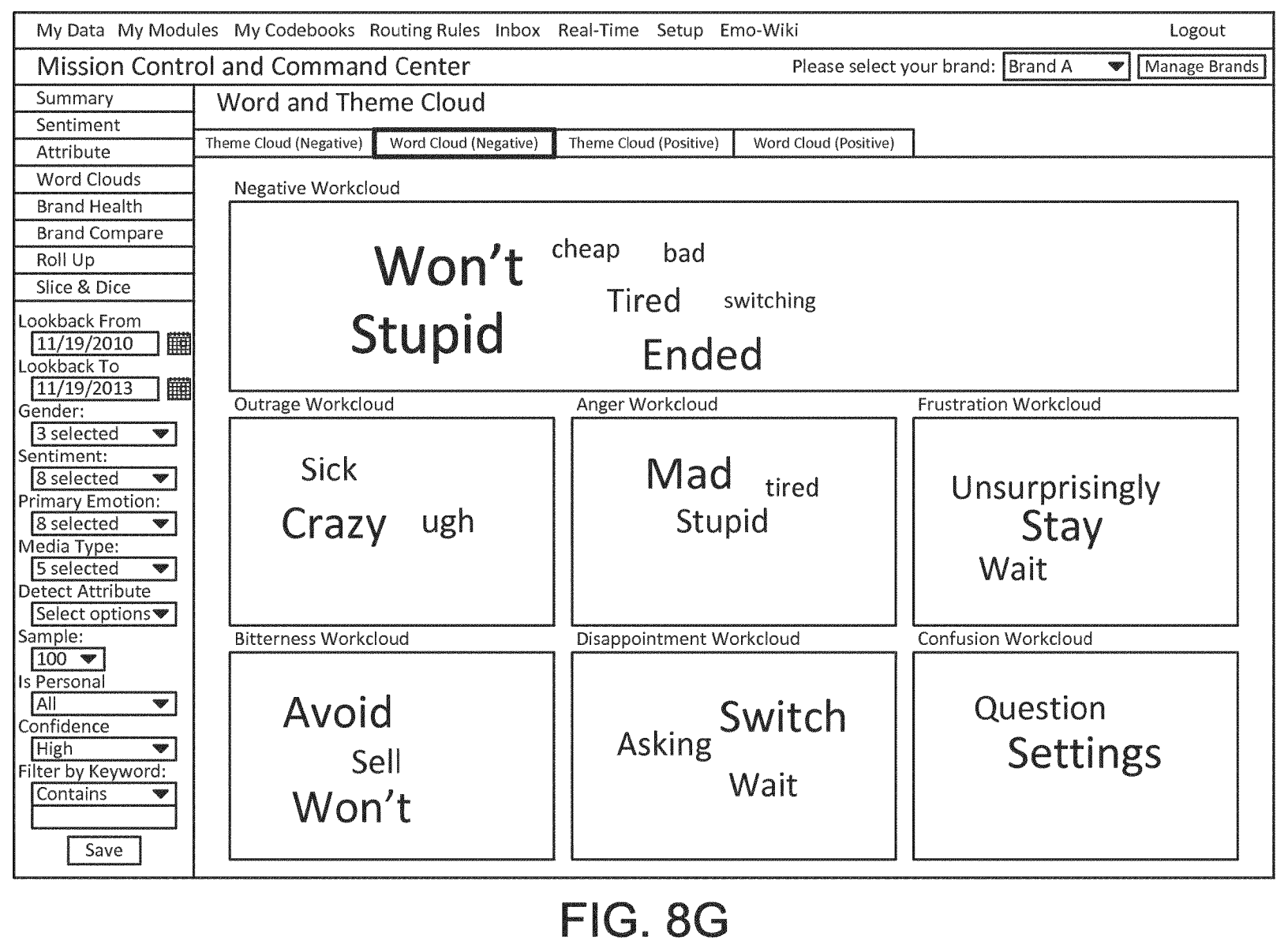
Figure 8H:
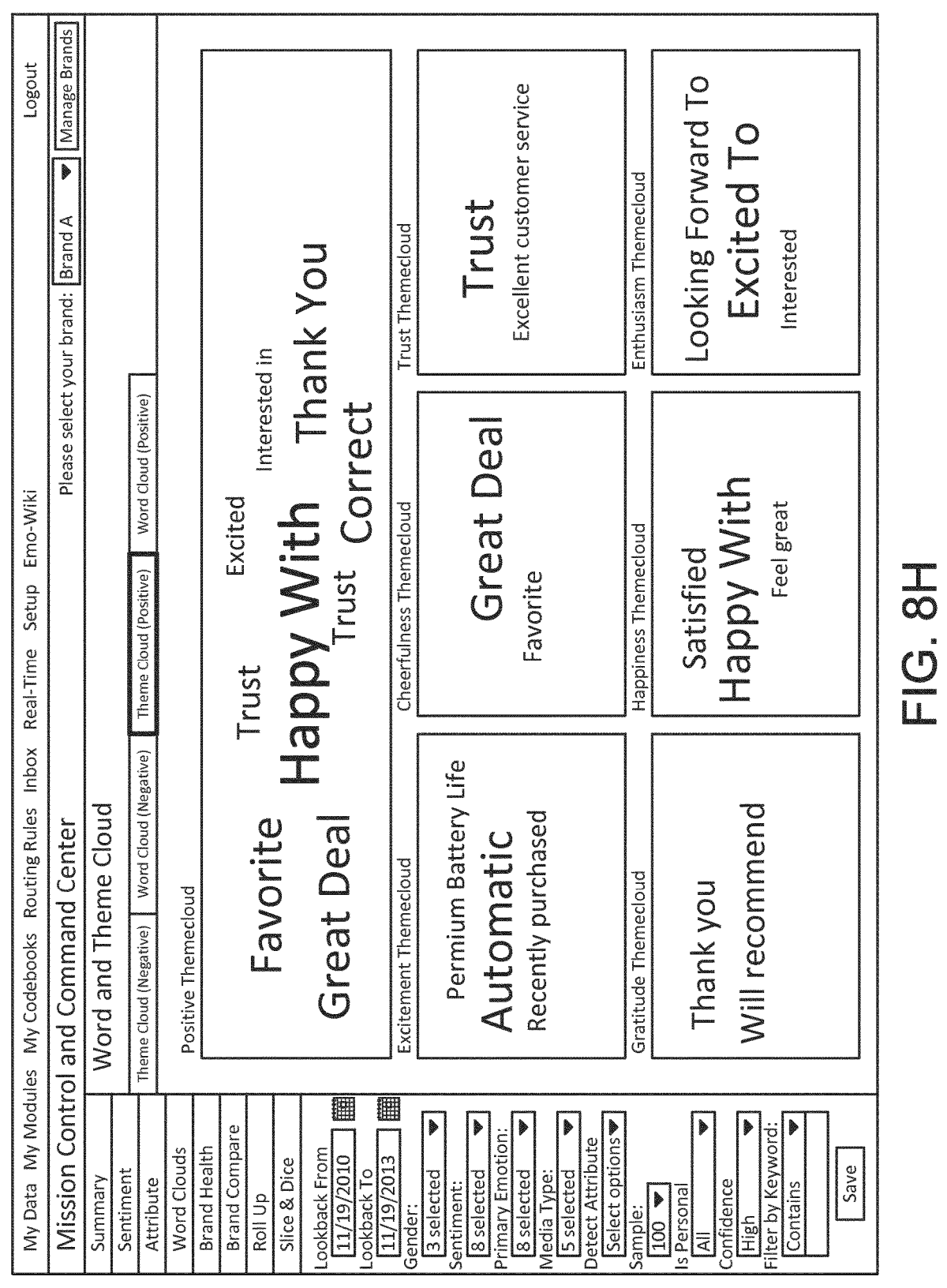

FIG. 8B illustrates a Mission Control and Command Center which displays a variety of brand data to the user. In FIG. 8B, information about the sentiment page is particularly displayed. This page may include a chart illustrating a sentiment summary as depicted in the upper left. The sentiment summary shows the number of comments associated with each sentiment. For example, the sentiment summary may illustrate using a bar graph the total number of comments which are positive, negative, neutral, etc. In the top right, the sentiment page displays the post count by sentiment. The post count by sentiment illustrates the number of posts of a particular one or more sentiments made over time. Multiple sentiments may be illustrated on the same line graph using different line types and or different line colors. For example, positive and negative sentiments may be displayed. In some embodiments one or more sentiments may be graphed including positive, negative, neutral, etc. This may be illustrated using a line graph. The post count by sentiment may also include an additional line graph which illustrates the number of comments for one or more sentiments over time where a sub category of comments is displayed. For example, a line graph may display only comments which are published (e.g. published in a magazine review). In some embodiments other categories of comments may be displayed in addition or instead of published comments such as public comments, comments of a certain media type (e.g. only social media comments), comments of wide circulation (e.g. published comments, social media comments made by people with a large number of followers, etc.), etc. The sentiment page also includes a breakdown by positive emotion. The breakdown by positive emotion provides greater detail to the positive sentiment number displayed in the sentiment summary chart. The breakdown by positive emotion chart illustrates the number of positive sentiment comments which expressed a sub category of positive sentiment. For example, a bar chart shows the number of gratitude comments, happiness comments, desire comments, etc. The sentiment page also includes a breakdown by negative emotions in the lower left corner. In some embodiments, additional or other breakdowns by emotion may be displayed (e.g. neutral, surprise, etc.) Also displayed on the sentiment page is content by sentiment. The content by sentiment may be broken into two fields, one of which shows positive content by sentiment (middle right) and other shows negative content by sentiment (lower right corner). In some embodiments, the graphs displayed in the content by sentiment fields may be the intensity (e.g. number) of comments over time.

FIG. 8C illustrates a Mission Control and Command Center which displays a variety of brand data to the user. In FIG. 8C the brand compare page is particularly displayed. At the top of the display is a series of check boxes which allow the user to select which brands to compare. Also included is information about the brand such as the brand name, the last date for which updated data is available, the total number of posts (comments) associated with the brand, etc. Also included is a compare selected brands button which when pressed by the user will update the information displayed below.

A series of charts, for example bar charts, are displayed comparing the brands. A series of tabs allows the user to further select the comparison data which is displayed. The negative sentiment tab is displayed in the figure. The negative sentiment tab displays bar charts comparing the percentage of each type of negative sentiment associated with each brand. For example, a bar char illustrates the percentage of negative sentiment comments are associated with each brand. The percentage of confusion sentiment comments associated with each brand is also. Bar charts display the sub categories of negative sentiments including frustration, anger, disgust, etc. This type of display is repeated for the sentiments on the other tabs. For example, the positive sentiment tab may include bar charts displaying the percentage of happiness, satisfaction, etc. associated with each brand. Tabs also provide charts showing a summary of sentiment by brand (e.g. percentage of all positive sentiments associated with each brand), channel positive, channel negative, etc. In some embodiments, the summary by brand tab may include both positive and negative emotion charts for the brands compared. For example, the summary tab may include descriptive information of each brand as well as charts showing each brands percentage of anger and happiness emotions. In some embodiments, the channel positive tab may include charts such as the ones described above comparing brands with respect to different distribution channels. For example, the happiness and satisfaction of the brands may be illustrated with respect to in store sales, on line sales, resale, etc. In some embodiments, the channel negative tab shows the negative emotions associated with each brand by percentage of each brand as well as by distribution/sales channel. In some embodiments, the information may be displayed using other types of charts and/or figures (e.g. pie charts).

FIG. 8D illustrates a Mission Control and Command Center which displays a variety of brand data to the user. In FIG. 8D the brand health page is particularly displayed. The brand health page includes a section displaying information of weekly trends by media type. Weekly trends by media type displays trends of the number of comments about the brand for a given week. Under the media label is the type of media for which the trend information applies. For example, the type of media for which trend data is displayed may include, one or more social media networks, reviews, blog comments, etc. For each social media type the current week count of comments (of that social media type) is displayed. Also displayed are the previous weeks count of comments about the brand, the week to week percentage change in the number of brand comments, and a trend indicator. The trend indicator corresponds to the percentage change. The trend indicator may be a symbol such as a green arrow, red arrow, gray bar, caution sign, green light, red light, stop sign, icons of different sizes, etc. Also displayed on the brand heath page is the monthly trends by media. The monthly trends by media type displays similar information to that of weekly trends by media type except that the information displayed is on a month by month basis rather than a week by week basis. Also displayed on the brand heath page is the quarterly trends by media. The quarterly trends by media type displays similar information to that of weekly trends by media type except that the information displayed is on a quarter by quarter basis rather than a week by week basis. In some embodiments trends by media type may be displayed over other time periods. For example, trends by media type may be displayed on a year by year basis, day by day basis, etc. Also included on the brand health page is a field which allows the user to set one or more periods for which the preciously discussed data may be displayed. The periods may be set by the user typing in a start and/or stop date or by selecting a start and/or stop date using a calendar.

FIG. 8E illustrates a Mission Control and Command Center which displays a variety of brand data to the user. In FIG. 8E the slice and dice page is particularly displayed. The slice and dice page includes a reset analysis grid button which, when pushed by the user, refreshes the grid according the preferences input by the user. The user inputs preferences using the buttons located beneath the reset analysis grid button. The user may alter formulas using the formula button. In some embodiments formulas may relate to the method in which data is processed to provide the analysis (e.g. parameters affecting how a primary emotion, secondary emotion, and/or sentiment is attached to a comment). The user may also alter the layout of the analysis grid (e.g. what is displayed, in what order it is displayed, etc.) using the layout button, sort the entries in the analysis grid (e.g. by publish date, media type, etc.) using the sort button, filter the data (e.g. exclude social media type comments) using the filter button, etc. using the illustrated buttons. The user may also alter the way in which data is displayed in the analysis grid using the group button. For example, certain types of data and/or data points may be displayed in a group in the analysis grid. In some embodiments, the user may view a summary of the analysis grid using the aggregate button. The aggregate button may perform additional analysis of data in the analysis grid using a combination of one or may data points and/or types (e.g. display further information regarding blog media type comments). A user may alter the layout of the analysis grid using the chart button. For example, a user may determine what information is included in the analysis grid and/or how it is displayed. In some embodiments, pressing/clicking the chart button may generate a visual representation of the data in the analysis grid (e.g. bar charts, pie charts, line graphs, etc.). The crosstab button allows a user to generate a contingency table. The contingency table may be created by cross tabulation. The contingency table may also be created using a statistical process summarizing categorical data from the analysis grid. A user may alter the way in which the analysis grid is displayed using the paging button. The paging button allows the user to determine the number of results shown per page of the analysis table. In some embodiments, other display and data options may be available to the user. The slice and dice display also includes navigation tools allowing the user to navigate the pages of the analysis grid such as arrow buttons and a field to jump to a certain page. The slice and dice display also includes buttons to allow the user to export the analysis grid as spreadsheet, CSV, or PDF. In some embodiments, the analysis grid may be exported in other file formats (e.g. a word or text document). The slice and dice display also provides the user with the analysis grid. The analysis grid shows data about individual comments about the selected brand/product. The information displayed about the comments includes the date on which the comment was made, content, the media type of the comment, word count, emotions, the author, etc. In some embodiments, additional information may be included (e.g. the gender of the author). The content link column includes a link to the text of the comment.

With respect to FIGS. 8F-8I, the figures illustrate the word and theme cloud page. The word and theme cloud page includes a row of tabs near the top of the page. Each tab allows a user to view word clouds associated with a particular measured value. As illustrated, the tabs include a negative and positive theme cloud labeled theme cloud (negative) and theme cloud (positive) and a negative and positive word cloud labeled word cloud (negative) and word cloud (positive). In some embodiments, additional values, attributes, emotions, comment phrase, comments, etc. may be displayed using word clouds on tabs. The word clouds displayed show the most frequently occurring words or phrases in the comments pertaining to a particular brand/product. The more frequently a word or phrase is found in comments, the larger the word is displayed in the word cloud figure. In some embodiments, the frequency with which words appear in comments may be represented with other or additional techniques. These techniques may include changing the font type, emphasizing words (e.g. bold, italicize, etc.), displaying the number of occurrences near the word (e.g. put the number of occurrences in parenthesis below the word), etc. The word clouds may be configured to display information in this way with respect to a particular theme, sentiment, emotion, attribute, etc. as explained in following discussion of FIGS. 8F-8I.

FIG. 8F illustrates the word and theme cloud page. In FIG. 8F the negative theme cloud tab is particularly displayed. The negative theme cloud tab includes a negative themecloud image. This image displays the most commonly used words and phrases by size for all negative themes, words, sentiments, and/or emotions for which the comments were analyzed. The negative themecloud may be a high level image including words and phrases associated with all negative themes, words, sentiments, and/or emotions. In some embodiments, the negative themecloud image may be a summary of all or some of the negative themes, words, sentiments, and/or emotions in the comments. Also included in the negative theme cloud tab are themeclouds which illustrate the most used words and phrases associated with a particular theme, sentiment, and/or emotion. As is illustrated in FIG. 8F, word clouds may show the most frequently used words and/or phrases for particular emotions, one cloud per emotion, including outrage, anger, frustration, bitterness, disappointment, and/or confusion. In some embodiments additional themeclouds may be displayed for additional negative themes, words, sentiments, and/or emotions. In some embodiments, the user may customize the negative themecloud image, for example to include or exclude certain negative emotions (e.g. include outrage and anger but exclude confusion from the negative themecloud image).

FIG. 8G illustrates the word and theme cloud page. In FIG. 8G the negative word cloud tab is particularly displayed. The negative word cloud tab includes a negative wordcloud image. This image displays the most commonly used words by size for all negative themes, words, sentiments, and/or emotions for which the comments were analyzed. The negative themecloud may be a high level image including words associated with all negative themes, words, sentiments, and/or emotions. In some embodiments, the negative wordcloud image may be a summary of all or some of the negative themes, words, sentiments, and/or emotions in the comments. Also included in the negative word cloud tab are wordclouds which illustrate the most used words associated with a particular theme, sentiment, and/or emotion. As is illustrated in FIG. 8G, word clouds may show the most frequently used words for particular emotion, one cloud per emotion, including outrage, anger, frustration, bitterness, disappointment, and/or confusion. In some embodiments additional wordclouds may be displayed for additional negative themes, words, sentiments, and/or emotions. In some embodiments, the user may customize the negative wordcloud image, for example to include or exclude certain negative themes (e.g. include outrage and anger but exclude confusion from the negative wordcloud image).

FIG. 8H illustrates the word and theme cloud page. In FIG. 8H the positive theme cloud tab is particularly displayed. The positive theme cloud tab includes a positive themecloud image. This image displays the most commonly used words and phrases by size for all positive themes, words, sentiments, and/or emotions for which the comments were analyzed. The positive themecloud may be a high level image including words and phrases associated with all positive themes, words, sentiments, and/or emotions. In some embodiments, the positive themecloud image may be a summary of all or some of the positive themes, words, sentiments, and/or emotions in the comments. Also included in the positive theme cloud tab are themeclouds which illustrate the most used words and phrases associated with a particular theme, sentiment, and/or emotion. As is illustrated in FIG. 8H, word clouds may show the most frequently used words and/or phrases for particular emotions, one cloud per emotion, including excitement, cheerfulness, trust, gratitude, happiness, and/or enthusiasm. In some embodiments additional themeclouds may be displayed for additional positive themes, words, sentiments, and/or emotions. In some embodiments, the user may customize the positive themecloud image, for example to include or exclude certain positive emotions (e.g. include excitement and happiness but exclude trust from the positive themecloud image).

Figure 8I:
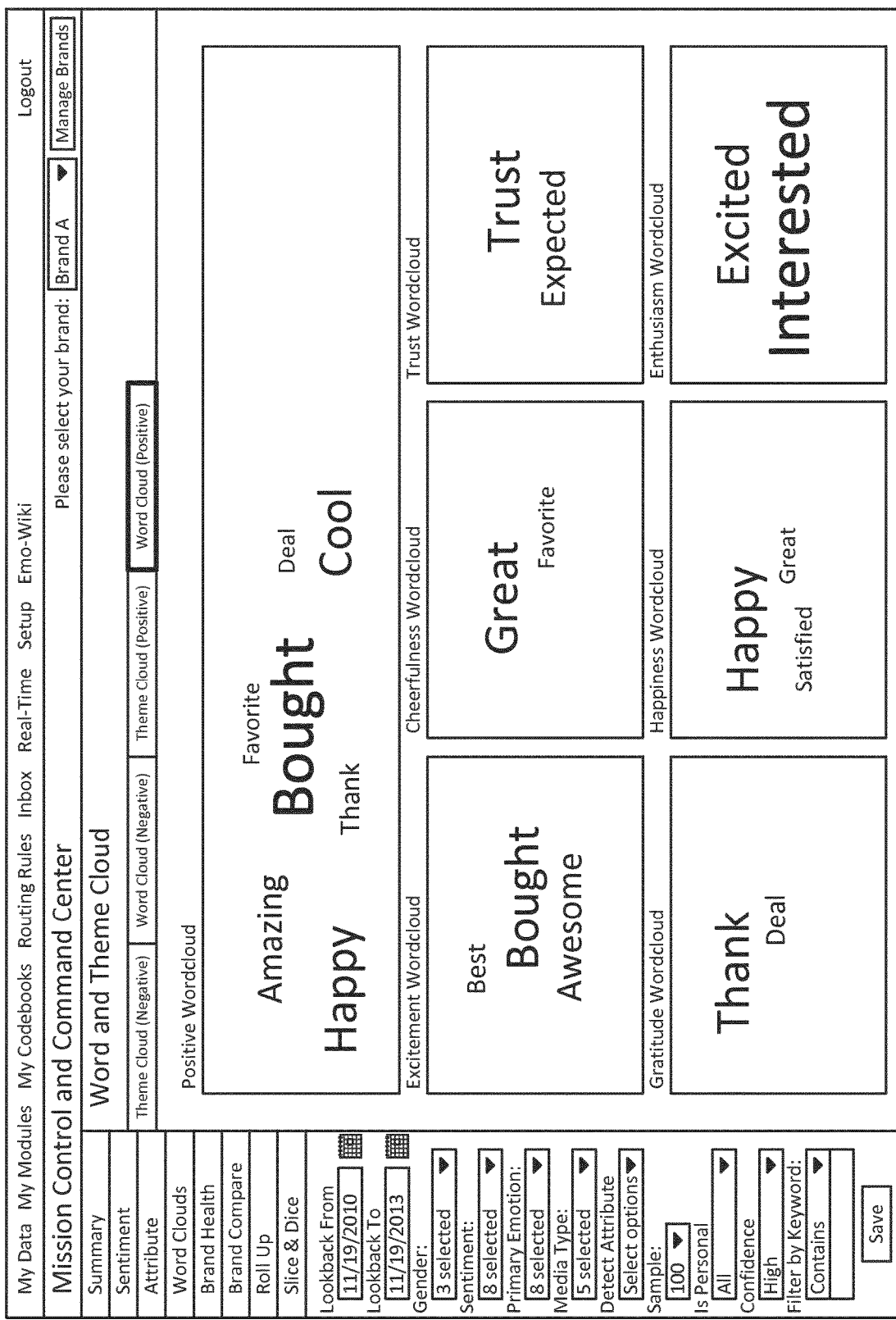
FIG. 8I illustrates, according to one embodiment, a user interface page showing information regarding a word cloud (positive) of one or more brands.
Figure 8L:
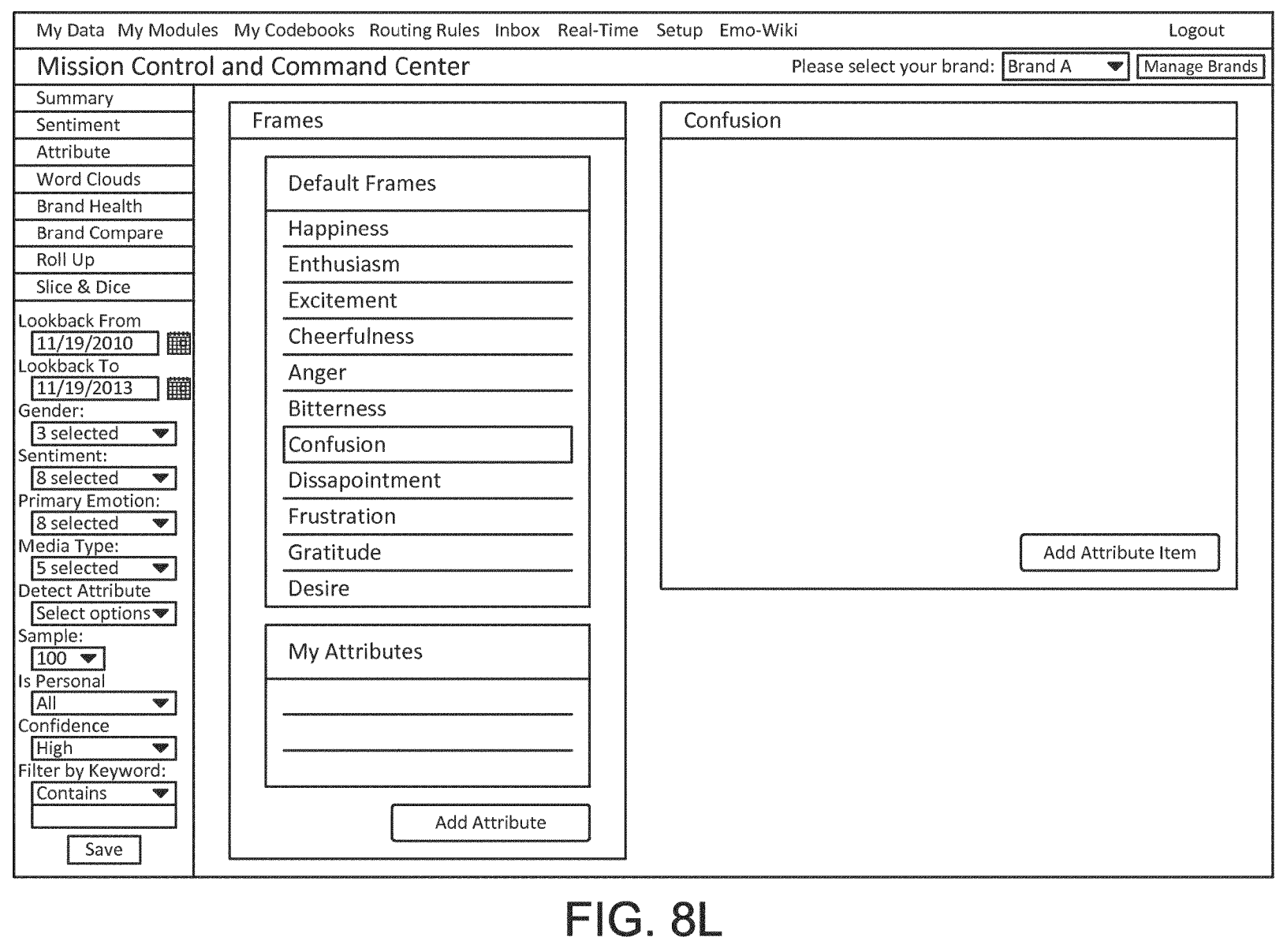
Figure 8M:
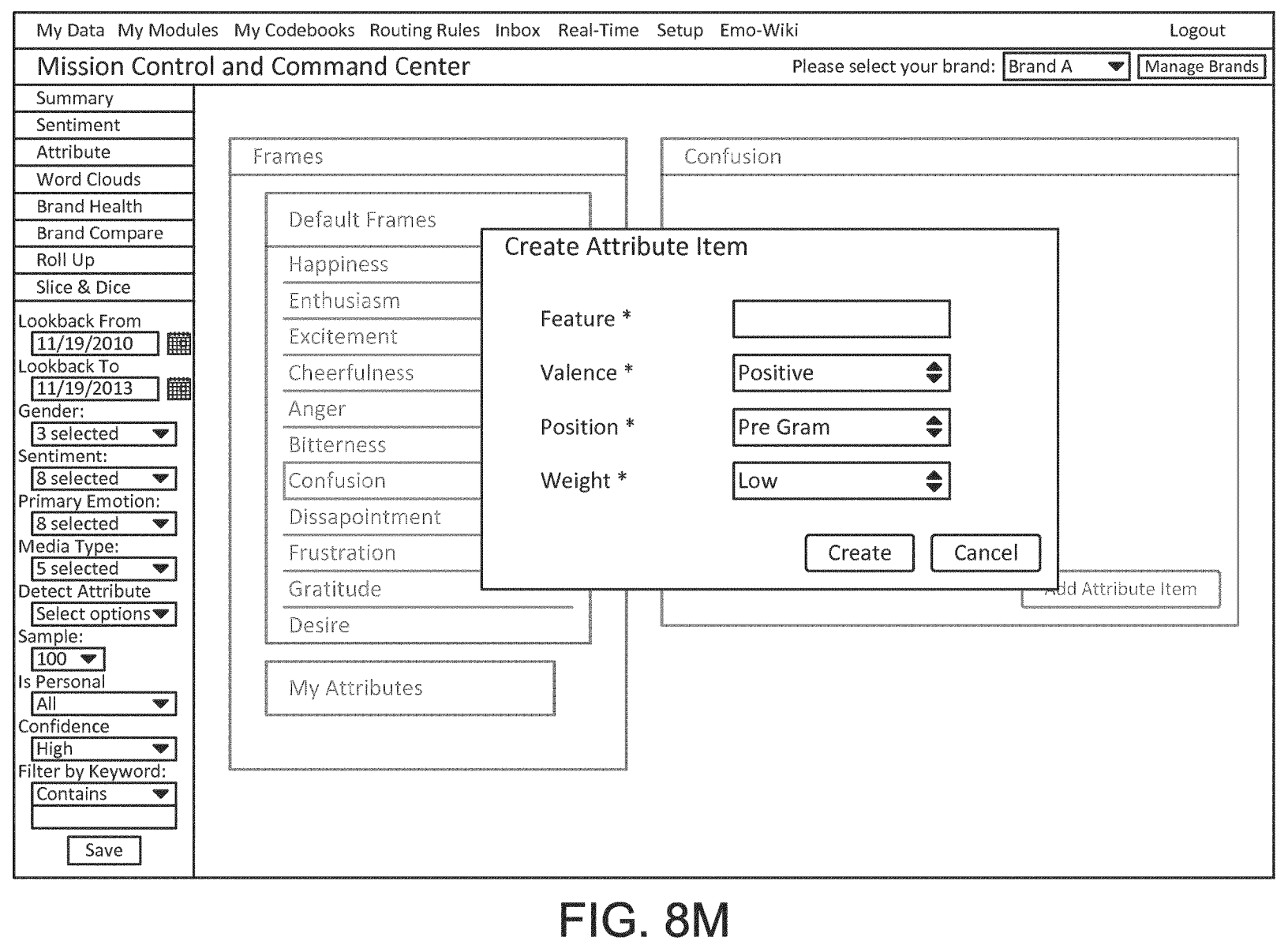
Figure 8Q:
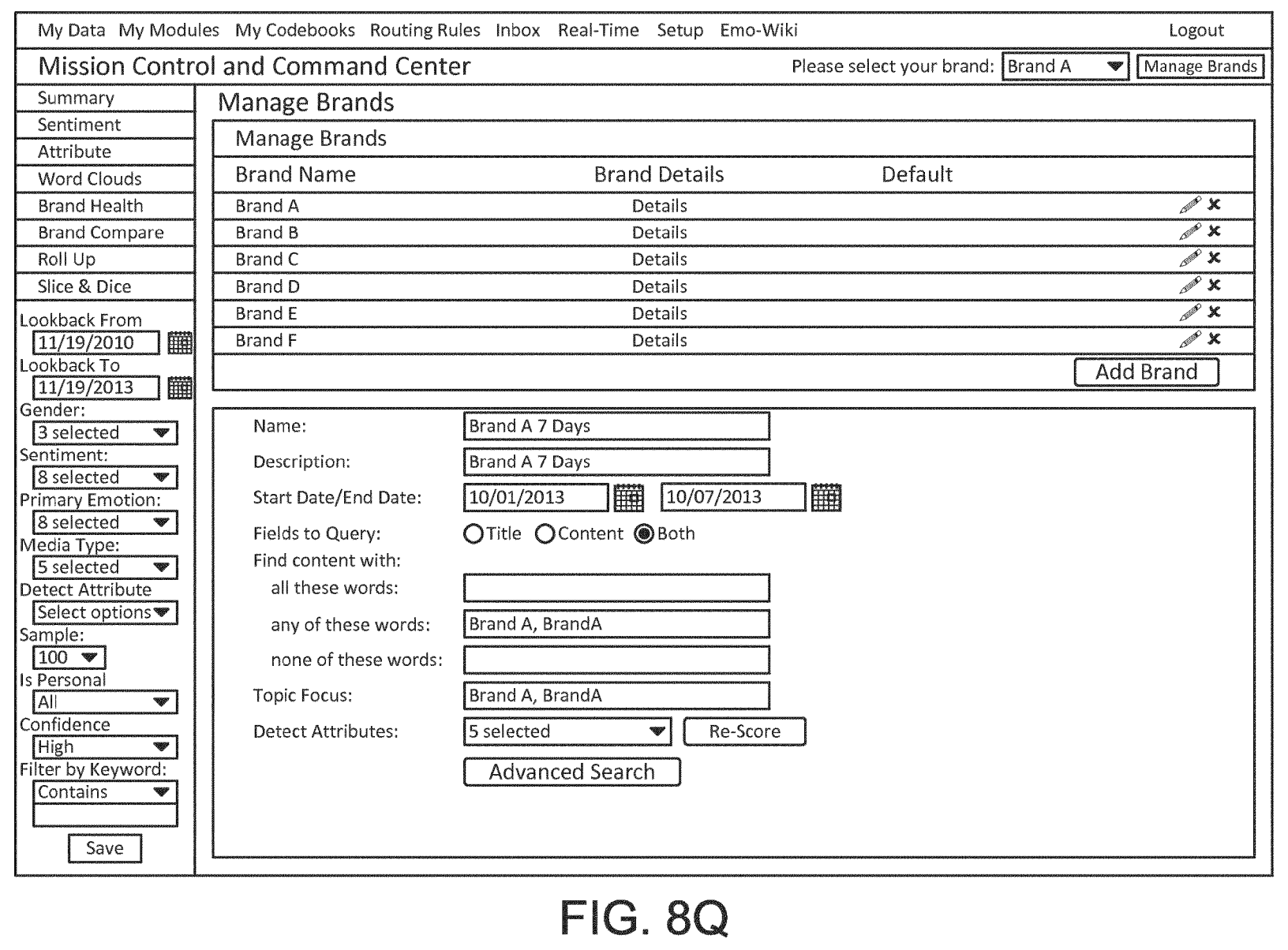
Figure 8R:
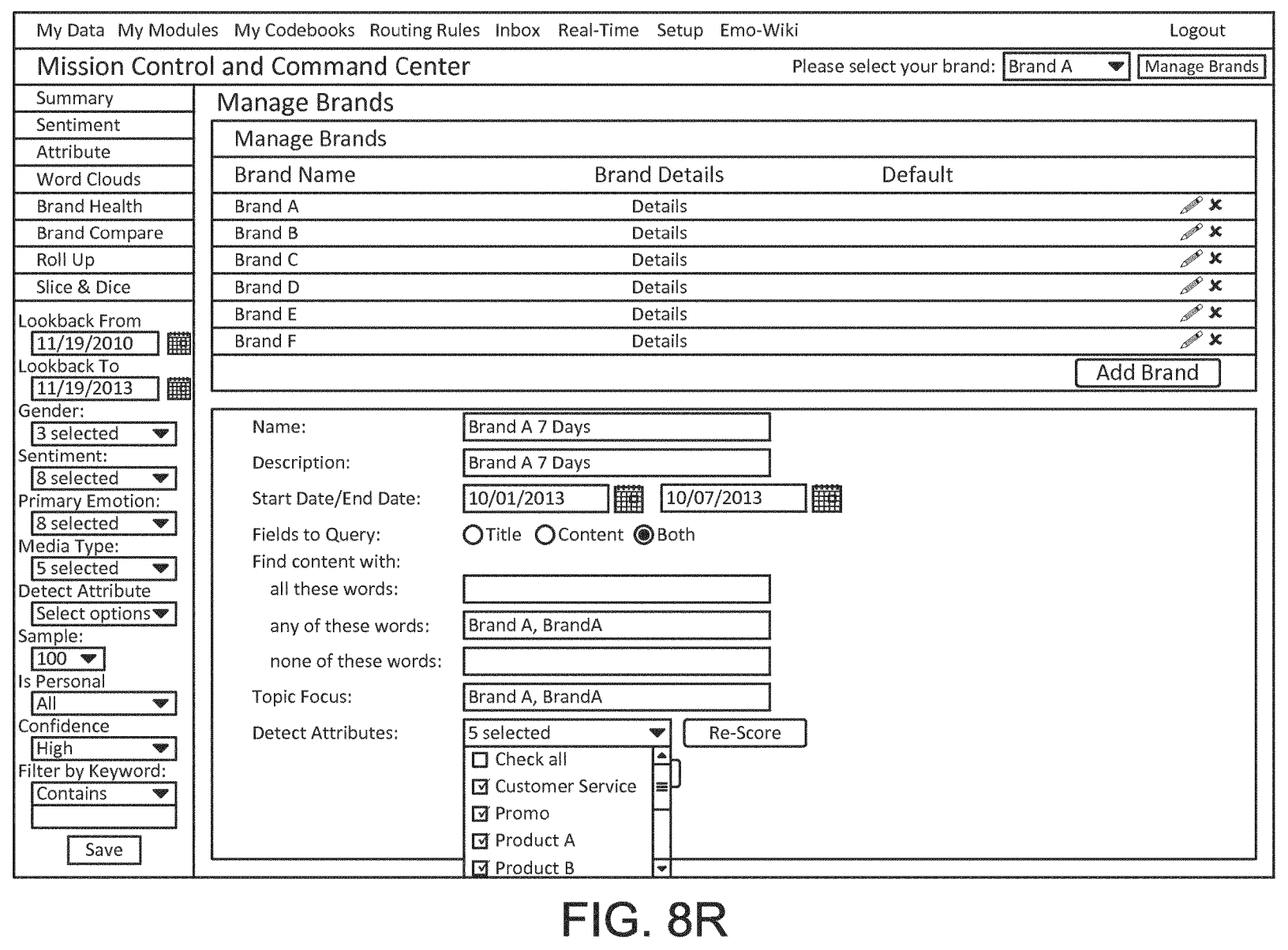

FIG. 8I illustrates the word and theme cloud page. In FIG. 8I the positive word cloud tab is particularly displayed. The positive word cloud tab includes a positive wordcloud image. This image displays the most commonly used words by size for all positive themes, words, sentiments, and/or emotions for which the comments were analyzed. The positive themecloud may be a high level image including words associated with all positive themes, words, sentiments, and/or emotions. In some embodiments, the positive wordcloud image may be a summary of all or some of the positive themes, words, sentiments, and/or emotions in the comments. Also included in the positive word cloud tab are wordclouds which illustrate the most used words associated with a particular theme, sentiment, and/or emotion. As is illustrated in FIG. 8I, word clouds may show the most frequently used words for particular emotions, one cloud per emotion, including excitement, cheerfulness, trust, gratitude, happiness, and/or enthusiasm. In some embodiments additional wordclouds may be displayed for additional positive themes, words, sentiments, and/or emotions. In some embodiments, the user may customize the positive wordcloud image, for example to include or exclude certain positive themes (e.g. include excitement and happiness but exclude trust from the positive wordcloud image).

The navigation panel in the upper left hand corner of the mission control and command center further includes a button to access a summary page (summary button). In some embodiments, the summary page may include summary information about the brand being analyzed and/or the analysis of the brand. For example, the summary page may include information such as a theme cloud (positive) chart, the percentages of brand associated comments which are negative and positive, a comparison between the user's brand and competing brands, trends for the brand (e.g. increasing or decreasing number of social media comments mentioning the brand), the intensity of positive sentiments of the brand over time. In some embodiments, the summary page may include overview or summary material from one or more of the sentiment, attribute, word clouds, brand health, brand compare, roll up, and slice and dice pages. The information described on those pages as high level, overview, summary, etc. may be incorporated into the summary page.

The navigation panel in the upper left hand corner of the mission control and command center further includes a button to access a roll up page (roll up button). In some embodiments, the roll up page presents an aggregation of analysis results across multiple products of a brand and/or multiple brands selected by a user. In some embodiments, the roll up page may be used to display analysis results for a portfolio of products. In one embodiment, the roll up page may display one or more brands in hierarchical tree with attributes of a brand listed below that brand and sub attributes listed below the corresponding attribute. Corresponding to each entry may be analysis results at a level of detail commensurate with the position of the brand, attribute, or sub attribute in the hierarchical tree. For example, the percentage of positive and negative emotions associated with a brand may be positioned to the right of the brand in the tree. Below the brand may be listed one or more products which fall under the brand. For each product the percentage of positive and negative emotions may be displayed to the right of the product such that a user can determine the contribution of each product to the overall emotions attached to the brand.

FIG. 8I illustrates a Mission Control and Command Center which displays a variety of brand data to the user. In FIG. 8I the my data page is particularly displayed. The my data page is accessed through the menu ribbon and the my data button. The my data page allows a user to manage the data used in the analysis. In some embodiments, a user may take actions such as adding data, viewing a list of all data being analyzed, removing data from the set which is analyzed, and/or otherwise managing the data to be analyzed. In the embodiment illustrated in FIG. 8J, a user may upload data to be analyzed. The "my data" page associated with uploading data includes an information field. The information filed contains instructions, information, and/or warnings related to uploading data. For example, the information field may instruct the user as to the file type and content of the file which may be uploaded. The information field may also instruct the user as to the options available with respect to uploading data as well as which information is required. The my data page associated with uploading data includes a window with three tabs. The tabs include upload CSV file here, select fields, and success. In some embodiments, additional tabs may be included. The tabs allow the user to navigate through the steps of the process of uploading data. The tabs also allow for a visualization of where in the process the user is currently working.

The first tab is illustrated in FIG. 8J and is the upload CSV file here tab. This tab includes options to select the delimiter used in the file to be uploaded and the file to upload. To select the delimiter used in the file to be uploaded, a user uses a drop down menu. The drop down menu contains a list of the available delimiters which the system may use. For example, the delimiter drop down menu may allow a user to select delimiters such as commas, semicolons, periods, colons, etc. The upload CSV file here tab of the my data page associated with uploading data also includes a choose file button. The choose file button allows a user to specify the file path of the file containing the data to be uploaded. In some embodiments, the choose file button may present the user with a field to type in the file path of the file to be uploaded. In some embodiments, the choose file button may present the user with a dialog box for selecting the file to upload. The dialog box may allow the user to visually browse for the desired file. Upon selecting a file, the name of the file selected is displayed to the right of the choose file button. If no file has been selected, no file chosen is displayed. The upload CSV file here tab further includes an upload button. When the user actuates the upload button, the my data page associated with uploading data displays the select fields tab.

FIG. 8K illustrates the select fields tab of the my data page associated with uploading data. The select fields tab includes an updated information field with information relevant to the select fields tab. The information filed contains instructions, information, and/or warnings related to uploading data. For example, the information field associated with the select fields tab may instruct the user as to the meaning of each field, which fields are required, which fields are recommended, etc. The information field may also instruct the user as to the options available with respect to uploading data as well as which information is required. The select fields tab includes an input field labeled study/brand name. This input field allows a user to label the data being uploaded. The select fields tab also includes a field labeled topics. This field displays any topics associated with the data to be uploaded. The field also allows for the user to add additional topics to be associated with the data to be uploaded. Custom attributes associated with the data to be uploaded may also be selected using the menu labeled custom attributes. Similarly one or, in some embodiments, more custom identifier columns may be selected for the data to be uploaded using the drop down menu labeled custom identifier column. The author column drop down menu allows the user to select an author column. The content column drop down menu allows the user to select a content column. The date column drop down menu allows a user to select a date column. In some embodiments, multiple selections may be made for one or more of the fields/dropdown menus described above. In some embodiments, the drop down menus include options which affect how the uploaded data is displayed, what information is uploaded, how the information is processed, parameters affecting the analysis, etc. The select fields tab further includes a score button. The score button, allows the user to complete the upload of the data and to have the data analyzed by the system. Also included is a cancel button which allows the user to cancel the upload and/or analysis of the data file selected in the previous tab. In some embodiments, the select fields tab may include additional menus for additional columns, additional attributes, additional options, etc.

The my data page associated with uploading data further includes a success tab. The success tab may include a filed providing an indication to the user that the data has been successfully uploaded. The success tab may further include summary information about the data file which was successfully uploaded. In some embodiments, additional information may be provided about the data upload such as a summary of the fields selected, data about the file uploaded, a confirmation number, etc. In some embodiments, the success tab may further include a button which allows the user to upload an additional data file. In some embodiments, the success tab may further include a button which allows the user to exit the my data page and return to a home or other page. In some embodiments, the success tab may be replaced with an error tab if the data file is not successfully uploaded. For example, if the data file is not properly delineated the error tab may be displayed to the user. The error tab may include a field providing information to the user. The information field may include such information as an error code, contact information for technical support, a diagnostic summary of the failed upload process, tips for an additional upload attempt, an estimated cause of the error, etc. The error tab may further include a button which allows the user to attempt the upload again. This button may return the user to the upload CSV file here tab or the select fields tab. The tab the user is returned to may be tab with the selected option which caused the error to occur. In some embodiments, the tabs retain the information selected and/or input by the user. In some embodiments, the tabs and fields/menus may return to the default values. In some embodiments, the error tab may further include a button which allows the user to cancel the upload. This button may return the user to the my data page, home page, or another page. In some embodiments, additional navigation buttons may be included on each tab of the my data page. These navigation buttons may include first, previous, last, next, etc. which allow the user to navigate between tabs. In some embodiments, clicking on the tabs themselves allows navigation between the tabs.

FIG. 8L illustrates a Mission Control and Command Center which displays a variety of brand data to the user. In FIG. 8L the my modules page is particularly displayed. The my modules page includes a frames field. The frames field includes a list of frames which are used by the system in the analysis of comments related to the brand. The frames may be related to and/or include emotions and/or sentiments which the system identifies in the comments associated with the brand. The frames may be the attributes, emotions, or sentiments which the system detects are associated with the comments to be analyzed. For example, the attributes, emotions, or sentiments to be detected for association with the brand may include happiness, enthusiasm, excitement, anger, confusion, etc. The frames are categorized in the frames field. Under the heading default frames, the default frames are listed which the system uses in the analysis. Under the heading my attributes, the frames filed lists the custom attributes defined by the user. These custom attributes which are defined by the user may also be used by the system to analyze comments associated with the brand. Within the frames field is an add attribute button.

The add attribute button allows the user to create an additional custom attribute which may be used in the analysis. In some embodiments, the add attribute button may also allow a user to manage (e.g. remove, edit, etc.) the custom attributes. In some embodiments, an additional button may be provided in the frames field for the removal of custom or default frames and/or attributes. In some embodiments, the add attributes button prompts a user to choose from a list of attribute items to be associated with the new custom attribute. In some embodiments, the user may also create a custom attribute item to be associated with the new attribute to be created. Attribute items are discussed in more detail with reference to FIG. 8M. By clicking on a listed frame of attribute (e.g. confusion), the user may access additional information and/or options related to that frame or attribute.

The my module page includes a detail window (labeled confusion in FIG. 8L) which displays this additional information and/or options. The detail window may display the attribute items for a particular frame or attribute. The detail window may include other information such as a description of the frame or attribute. In some embodiments the detail window may include such information as the feature, valence, position, weight, etc. of each attribute item for the particular selected frame or attribute. The detail window also includes an add attribute item. The add attribute item button allows the user to create an additional custom attribute item which may be used in the analysis. In some embodiments, the add attribute item button may also allow a user to manage (e.g. remove, edit, etc.) the attribute items for a particular frame or attribute. In some embodiments, an additional button may be provided in the detail window for the removal of custom or default frames and/or attributes. When a user clicks or presses the add attribute item button, a pop up field is displayed with options used to create the new attribute item.

FIG. 8M illustrates the create attribute item pop up field which is displayed when the user clicks or presses the add attribute item button. The pop up includes a field labeled feature. The feature field allows a user to input (e.g. type in) the feature of the new attribute item to be created. The pop up also includes a drop down menu which allows the user to select a valence which is attached to the attribute item to be created. For example, a user may select that the new attribute item is positive, negative, neutral, etc. The position drop down menu allows the user to select from options which affect the way the attribute item is used in the analysis. The user may select a variety of options relative to the gram used in the analysis. For example, the position may be pre-gram. The pop up also includes a weight drop down menu. This menu allows the user to select a weight to give to the attribute item to be created. The weight may be used to affect the analysis. The weight may be selected from a variety of options. For example, the weight given a particular attribute item may be low, lowest, medium, high, highest, etc. The pop up further includes buttons which allow the user to create the new attribute item (create button) and to cancel the additional of the new attribute item and return to the my modules page (cancel). In some embodiments, additional characteristics of the new attribute may be selected and/or modified using the create attribute item pop up.

FIG. 8N illustrates a Mission Control and Command Center which displays a variety of brand data to the user. In FIG. 8N the my codebooks page is particularly displayed. The my codebooks page allows a user to view, edit, and otherwise manage codebooks. In some embodiments, a codebook contains keywords associated with a particular aspect or feature of a brand. The keywords in the codebook may be further divided into categories based on particular sub-features or sub-aspects of the brand. For example, FIG. 8N illustrates a code book named shopping experience which contains keywords relevant to a purchasers shopping experience as it relates to the brand. The shopping experience code book is further divided into categories of keywords that relate to the check out counter and aisle. These categories contain individual keywords or phrases relevant to the category such as line or register.

The my codebooks page lists all of the codebook for a particular brand in the field labeled my code books. The my code books filed lists the code books for a particular brand by name. To the right of each code book are an edit button (paper and pencil) and a remove button (x). The edit button allows a user to edit the categories and keywords which are in the codebook. The remove button removes the code book from the analysis. Also included in the my code books field is a button which allows a user to add one or more additional code books. The add code book button allows a user to add an additional code book. In some embodiments, the add code book button displays an additional window to the user. The user may use the additional window to select from already created code books relevant to various aspects of a brand (e.g. product satisfaction). In some embodiments, the user may create a custom new code book using the window. For example, the window may prompt a user to enter new keywords categorize them, provide example comments, etc.

The my codebooks page also includes a field which provides more detailed information and options regarding a code book. When a code book is selected in the my code books field, information and options associated with that code book are displayed in the detailed information field at the bottom of the page. At the top of the field is a label showing which code book has been selected and what information is being displayed. For example, when the shopping experience code book is selected in the my code books filed, the detailed information field is label shopping exp and categories. The categories of keywords for that code book are then displayed. For example, the categories check out counter and aisle are displayed. The detailed information field displays the category name, a sample of keywords in that category, and includes buttons which allow the user to edit the categories and code book to which they belong. To facilitate editing, the detailed information field includes, for each category, an edit button (paper and pencil), a remove button (x), and an examples button. The edit button allows a user to edit the category (e.g. add or remove keywords). The remove button removes the category from the code book. The example button opens an additional view in the detailed information field with examples of the keywords in comments. The examples button is discussed in greater detail with reference to FIG. 8O. The detailed information field also includes an add category button. The add category button allows a user to add an additional category to a code book. In some embodiments, the add category button displays an additional window to the user. The user may use the additional window to select from key words relevant to various categories common to some brands (e.g. product satisfaction keywords or categories). In some embodiments, the user may create a custom new category using the window. For example, the window may prompt a user to enter new keywords, provide example comments, etc.

The examples button opens an view in the detailed information field. With reference to FIG. 8O, the examples view is added to the label at the top of the detailed information field. In some embodiments, this label functions as a set of tabs that allow the user to navigate between views of information for examples, specific categories, and/or code books. The examples view shows the user a list of example comments using the keywords in the category. The examples are listed under the label examples. FIG. 8O illustrates as example of this. The comment stuck in line is an example of the keyword line which is in the check out counter category of the shopping experience code book. In the examples view, an edit button (paper and pencil) and a remove button (x) are located to the right of each comment. The edit button allows a user to edit the example (e.g. rephrase the example, correct typos, etc.). The remove button removes the example from the category. Also included in the examples view of the detailed information field is an add example button. The add example button allows a user to add an additional example to a category. In some embodiments, the add example button displays an additional window to the user. The user may use the additional window to select from examples relevant to the particular category for which the user is viewing examples. In some embodiments, the user may create a custom new example using the window. For example, the window may prompt a user to enter a new example that uses a keyword from the relevant category.

In some embodiments, these examples are the examples used in the model generation process described above. The addition of more examples by the user may trigger the validation process of the model again before the model is applies. In some embodiments, the validation step may be skipped. The addition of examples provided by the user may further improve the accuracy of the model. In some embodiments, the example provided by one user may be incorporated into a model that is available for all users of the analysis system and methods. In some embodiments, a user may be required, encouraged, or given the option to provide surveys completed by the authors of the additional examples to be input using the add example button.

FIG. 8P illustrates a Mission Control and Command Center which displays a variety of brand data to the user. In FIG. 8P the routing rules page is particularly displayed. The routing rules page allows a user to set rules for how data monitoring alerts will be delivered to the user. Alerts may be set up which deliver to the user information regarding changes in the parameters monitored by the system with respect to one or more brands. FIG. 8P illustrates the monitoring and alerting interface for setting up and managing the rules and alerts associated with monitoring activities. At the top of the page is a rule summary field which includes summary information for all active monitoring rules for a particular user. The rules are listed by name and include the information displayed includes the name of the rule, a description of the rule, the brand for which the monitoring rule applies, the action which is taken when an alert rule is triggered (do this), and whether the rule is enabled. In some embodiments, whether the rule is enabled may be illustrated with words (e.g. yes or no), symbols, colors, and/or any combination of the preceding. To the right of each rule are action buttons including an edit button (paper and pencil) and a remove button (x). The edit button allows a user to edit the rule (e.g. change rule parameters, the brand for which the rules applies, the description of the rule, how the alert is delivered, etc.). In some embodiments, how the rule alert is delivered may include e-mail, text message, etc. The remove button removes the rule for the user. Also included in the rule summary field is an add rule button.

The add rule button allows a user to add an additional rule. In some embodiments, the add rule button displays an additional window to the user. The user may use the additional window to select from available rules. In some embodiments, the user may create a custom new rule using the window. For example, the window may prompt a user to enter a new rule including the parameters that trigger an alert, a description of the rules, how the alert is delivered, etc.

The routing rules page also includes a field which provides more detailed information and options regarding a rule. When a rule is selected in the rule summary field, information and options associated with that rule are displayed in the detailed information field at the bottom of the page. Each rule may be comprised of one or more rule parameters. The rules parameters are the details of the rule and control in what circumstances the rule will be satisfied. When the rule is satisfied, the alert is triggered. The detailed information field includes the column name, operation, and value for the each rule parameter. The column name drop down menus allow the user to select an attribute for which the rule parameter will apply. For example, the rule param-
eter may look at the happiness attribute for the brand. The operation drop down menus allow for the user to select the operation which test if the rule parameter is satisfied. For example, the operation may be whether the value of the column selected by the column name drop down menu is equal to, less than, greater than, etc. a value. The value fields allow for the user to input a value against which the value of the attribute selected by the column name menu will be evaluated using the operation. In some embodiments, the value may be a total number of comments having the selected attribute. The detailed information filed also includes a delete check box. If the delete check box is selected for a rule parameter when the update rule details button is selected, then the rule parameter will be removed from the rule being updated. The update rule button included in the detailed information field updates the rule with respect to the parameters changed in the detailed information filed.

The mission control and command center further includes an inbox button on the menu ribbon. The inbox button takes the user to an inbox. The inbox may store system messages to the user. For example, monitoring alerts may be sent to the indox included in the mission control and command center. The inbox may receive additional system updates. For example, the inbox may receive messages to the user informing the user of status updates regarding the analysis of data (e.g. when the analysis has begun, when the analysis is complete, etc.) The inbox may also allow the user to communicate with support personnel such as technical support providers, project managers, etc.

The mission control and command center further includes a real-time button on the menu ribbon. The real-time button allows the user to open a window displaying real time results of the analysis techniques described herein. For example, the window displayed by pushing the real-time button may display real time monitoring of brand trends. In some embodiments the real-time information displayed may include real time updates of the analysis results described herein. For example, the charts and information viewable on other pages may be continuously updated to reflect analysis which incorporates social media comments as they are made (e.g. analysis results are updated to reflect social media posts on a brands social media page as they occur). In some embodiments, all or a portion of the information and display techniques described herein may be viewed as they are updated in real time on the real-time page.

The mission control and command center further includes a setup button on the menu ribbon. In some embodiments, the setup button may allow a user to configured options related to the display of the information described herein. In some embodiments, the setup button allows for customization of parameters that do not affect the analysis of data. For example, setup may include setting a user name and password, managing permissions for others to access the information on the mission control and command center, how frequently pages are refreshed to incorporate new data. In some embodiments, the setup button may allow a user to configure additional analysis parameters not otherwise customizable in other portions of the mission control and command center. These parameters may include such options as how frequently social media websites are crawled for new comments to be analyzed, how frequently the analysis is rerun to update information, what system resources are used in the analysis process, allocation of processing loads and/or tasks, etc.

Additionally, the mission control and command center includes a emo-wiki (emotion wiki) button on the menu ribbon. This button allows a user to access the emotion wiki.

In some embodiments, the emotion wiki may include information pertaining to the emotions used in the analysis process. This may include keywords associated with certain emotions, sentiments and how they relate to the emotions, the meaning of an emotion (e.g. how an emotion is defined by the system), etc. In some embodiments, the emotion wiki may include analysis methodology respective to each emotion. For example, this may include information relevant to how emotions are detected, how false positives are reduced, how ironic comments are identified and processed, etc. An example of an emo-wiki entry is the following: Trust. Trust is an emotion that involves feeling that a product is reliable, gets the job done, and helps consumers achieve their goals. Trust is a strong indicator of brand loyalty, because once consumers fee that a product is worthy of their trust, they are highly unlikely to stray from that product.

FIG. 8Q illustrates the window which is displayed to the user when the manage brand button in the top right is selected. The manage brands window includes an overview field which lists the user's brands by name. For each brand listed, brand details are provided. In some embodiments, brand details include a description of the brand and/or high level analysis results. The default of the brand is also listed. In some embodiments, the default includes information as to whether the brand is analyzed by default, how the brand is analyzed by default, etc. Also included to the right of each brand are action buttons including an edit button (paper and pencil) and a remove button (x). The edit button allows a user to edit the brand. The remove button allows the user to remove the brand from the list of brands which are analyzed and/or monitored. Further included in the overview field is an add brand button.

The add brand button allows a user to add an additional brand to the list of brands to be analyzed and/or monitored. In some embodiments, the add brand button displays an additional window to the user. The user may use the additional window to select from available brand parameters (e.g. keywords associated with the brand). In some embodiments, the user may create a custom new brand using the window. For example, the window may prompt a user to enter a new brand including the parameters that define the brand and/or attributes along with what values are to be measured.

The manage brand window also includes a field which provides more detailed information and options regarding a brand. When a brand is selected in the overview field, information and options associated with that brand are displayed in the detailed information field at the bottom of the page. This information includes the name of the brand and a description of the brand. Also included are the start and end date for analysis and/or monitoring. The start and end dates may be changed by the user using the fields provided or the calendars. The user may also select how the comments associated for the brand are analyzed using the fields to query radial buttons. The user may select analysis of the tile of comments, the content of comments, or analysis of both. The user may also use the provided fields to find content with particular words. This searching may be by all words listed, any words listed, and may exclude content with particular words. Additionally, the field includes a topic focus input field. The user may use the topic focus input field to select a topic on which the analysis and/or monitoring will focus. Also included is a detect attributes drop down menu. This menu allows the user to specify for which brand attributes the analysis and/or monitoring will occur. FIG. 8R shows examples of options which may be selected by the detect attributes drop down menu in the manage brands window. Multiple attributes may be selected and may include such attributes as particular products, sales experience, etc. With renewed reference to FIG. 8Q, the detailed information field also includes a re-score button and an advanced search button. The re-score button allows the user to update the analysis of the brand according to the parameters selected and/or input in the detailed information field. In some embodiments, the advance search button opens an advance search window. The advance search window may allow the user to search with additional parameters. These additional parameters may allow for searching by particular sentiments or emotions attached to an attribute, specific characteristics of a commenter such as gender, specific media types such as social media comments, etc.

Referring generally to the user interface described above, some embodiments of the user interface may use different techniques and/or components to accomplish the same or similar functions. Buttons, fields, menus, links, hyperlinks, etc. may be used interchangeably where feasible.

The following includes a description of several emotions and other terms relevant to the system and methods disclosed herein. The descriptions may, in some embodiments, be entries in the emotion wiki. In some embodiments, plug ins may be developed for each of the emotions.

Valence. Valence is a term used to describe the degree to which an emotion is perceived to be pleasant or unpleasant. An emotion is said to be positively valenced when it is pleasant (i.e., joy, excitement), and negatively valenced when it is unpleasant (i.e., sadness, despair). Valence is measured on a dimensional scale, meaning that it can be positive or negative, or varying degrees between the two.

Arousal. Arousal is a term used to describe the degree to which an emotion is perceived to be activating or unactivating. An emotion is said to have high activation when it produces feelings of energy and of being "wide awake", and to have low activation when it produces feelings of lethargy or sleepiness. High activation is usually responsible for moving people to action, while low activation usually thwarts action. Similar to valence, arousal is measured on a dimensional scale, meaning that it can have high activation or low activation, or varying degrees between the two.

Dimension. In cognitive science, affective states are measured on a dimensional scale, meaning that there are varying degrees of how a particular affective state (or emotion) can be experienced. This is an important distinction, because at one time affective states were considered to be polarities, meaning that they were either good or bad, positive or negative. Subsequently, this is how many cognitive scientists in the past have gone about measuring consumer sentiment (i.e., positive, neutral, negative). Because any given affective state can be experienced at varying degrees, a dimensional scale of measurement is much more sensitive to the complex and multifaceted human experience of emotion. Most affective states can be categorized along the dimensions of valence and arousal (see above).

Cognitive Affect States. Some emotions are classified as cognitive-affect states, rather than pure affect states. Cognitive-affect states constitute a blend of cognitive and affective processes, where affective experiences are mediated by cognitive processes like reasoning, deliberation, or comparing desired outcomes to actual outcomes.

Emotions. Emotions are generally conceptualized as multifaceted, embodied phenomena that involve loosely coupled changes in the domains of subjective experience, behavior, and peripheral physiology. Emotion is associated with mood, temperament, personality, disposition, and motivation. Motivations direct and energize behavior, while emotions provide the affective component to motivation, positive or negative.

Consumer-based emotions. Years of theoretical and empirical work have been devoted to understanding emotions as they occur in everyday living. However, we suspect that the emotions that arise during consumer/product interactions are unique unto themselves. The goal of the system and method herein is to understand how emotions like anger, confusion, frustration, etc. are unique when they involve consumers' relationships with brands, products, or services. Thus, the system and method herein defines our emotions as "consumer-based emotions". We hypothesize (and have data to support) that generic frustration is qualitatively different from consumer-based frustration. Whereas frustration in every day life might involve feelings of goals being blocked, consumer-based frustration appears to be specifically related to the negative feelings associated with spending money on a product that does not do what it is intended to do, and thus prevents consumers' goals from being achieved. For this reason, many of emotions, used in the system and method herein, (as listed below) different somewhat from their standard and generic definition.

Happiness. Happiness is an emotion of well-being classified as having positive valence and high activation, and is characterized by positive emotions ranging from contentment to intense joy. Happiness is a fuzzy concept and can mean many things to many people. Part of the challenge of a science of happiness is to identify different concepts of happiness, and where applicable, split them into their components. Happiness may be a more stable trait (meaning that people either have a predisposition toward being happy or unhappy), rather than a transitory state (see cheerfulness and enthrallment below).

Cheerfulness. Cheerfulness is a positive emotion that is typically characterized by feelings of optimism and positivity. It is a transitory emotion that tends to arise in response to an event or situation, and decay when the event or situation is over.

Enthrallment. Enthrallment is a transitory, positive emotion that involves being "spellbound" or "captivated". People tend to describe the first moments of owning a new product as being enthralling, because all attention resources are directed toward learning about/using the product.

Excitement. Excitement is a positive emotion that is highly similar to cheerfulness. Excitement can be differentiated from cheerfulness because excitement is a high intensity emotion, whereas cheerfulness is a neutral intensity emotion.

Disappointment. Disappointment is a cognitive-affective state that results when a person compares desired outcomes to actual outcomes, and has a sense of being "let down". For example, a person who purchases a 4G Phone with the hope that it will be significantly faster than the 3G Phone, and discovers that it is only marginally faster, will experience disappointment.

Frustration. Frustration is a negative, activating cognitive-affective state that results when a person perceives that his or her goals are being blocked. In the context of learning, for example, frustration arises when students needs to learn about how the endocrine system and circulatory system work together to promote the healthy functioning of the body, but perceive that the textbook they are using is incomprehensible or written above their grade level. Individuals can be frustrated because of external blockages to their goals (i.e., a poorly written textbook), or because of internal blockages (i.e., poor reading skills). In the context of consumer behavior, people might become frustrated if they purchase a data analysis tool to help them better analyze data, but cannot use the tool because it does not work with their operating system.

Irritation. Irritation is a somewhat negative, low activating emotion that usually precedes frustration. It is characterized by feelings of agitation or "grouchiness."

Confusion. Confusion is a cognitive-affective state that results when people perceive a mismatch between their expectations and actual outcomes. Like the example above with the 4G Phone, people might experience disappointment when they perceive that the 4G is simply not as fast as advertised. However, people might experience confusion if they perceive that there is some other explanation for why the 4G is not as fast as expected (i.e., "perhaps something's wrong with this one", or "maybe I didn't set something up properly").

Contempt. Contempt is an intensely negative emotion that involves regarding an object or person as inferior, base, or worthless—it is similar to scorn. Contempt is involves having an open hatred or disrespect for on object or person, and usually arises when a person perceives that they have been INTENTIONALLY harmed, deceived, or mistreated by someone else.

Remorse. Remorse is a negative emotion that usually involves self-blame, guilt, or regret. A good way to think about remorse is "Disappointment+guilt/self-blame". For example, if a person spends $1,000 on a new laptop and realizes that she dislikes the operating system, she will probably feel disappointed in the product, and will blame herself for spending a large sum of money on a product that she can't use. In terms of the linguistic analyses we've conducted so far, remorseful people usually talk about "wasted money".

Pride. Having a sense of pride is a positive affective state that involves regarding one's self, one's achievements, or one's possessions as having a high sense of worth to one's self and/or to others.

Anger. Anger is an intensely negative, highly activating emotion that arises when people perceive that they have been ill-treated, treated unfairly, or been deceived. It is a feedback mechanism in which an unpleasant stimulus is met with an unpleasant response.

Outrage. Outrage is an intensely negative, highly activating emotion that is usually preceded by anger. In fact, it perhaps makes sense to consider outrage as "out of control anger".

Wow. Wow is a state of shock that is best described as being "pleasantly surprised". It involves feeling that your expectations have been exceeded, the product/service is better than anything else on the market, and is accompanied by a lot of -er words (it was better, stronger, softer, cheaper, etc). It is usually correlated with purchase intent.

Boo. "Boo" is conceptualized as the opposite of "wow". That is, it occurs when a person is unpleasantly surprised. Boo is an emotion that is highly similar to disappointment, and is sometimes difficult to differentiate from disappointment. The key difference between the two emotions is that disappointment involves a comparison of expectations to outcomes, while boo may not. Rather, people who experience boo might not have had any expectations at all. A person who experiences boo might be likely to say something like, "I didn't know what to expect when I tried it, but I really didn't like how it worked".

Mental Model Change (MMC). MMC involves more than just feeling pleasantly surprised. It's a feeling that your life is somehow improved because the product exists. Whereas Wow can be somewhat fleeting (WOW . . . that bleach pen really removes stains well!), MMC is long pasting and is associated with purchase intent AND some kind of behavioral change (Now that I know that this bleach pen gets rid of stains, I can play outside with my children more often!")

Gratitude. Consumers experience gratitude when they feel that a product or service has finally met their expectations or needs. Whereas "wow" occurs when expectations have been exceeded, gratitude tends to arise when expectations are simply met. Gratitude often occurs after a stint of disappointment or irritation, when a new product (or perhaps an improved version of the same product) finally does what the product is "supposed to do". Gratitude is also likely to arise when the consumer perceives that the manufacturer of a product cares about their needs or expectations.

Trust. Trust is an emotion that involves feeling that a product is reliable, gets the job done, and helps consumers achieve their goals. Trust is a strong indicator of brand loyalty, because once consumers feel that a product is worthy of their trust, they are highly unlikely to stray from that product.

Bitterness. Bitterness is a deep-seated feeling of ill will that results from a negative consumer experience. Consumers who feel bitter toward a manufacturer, brand, or company tend to hold on to the equivalent of "a grudge" against that manufacturer/brand/company, even when the manufacturer/brand/company makes efforts to rectify the problem.

Figure 9:
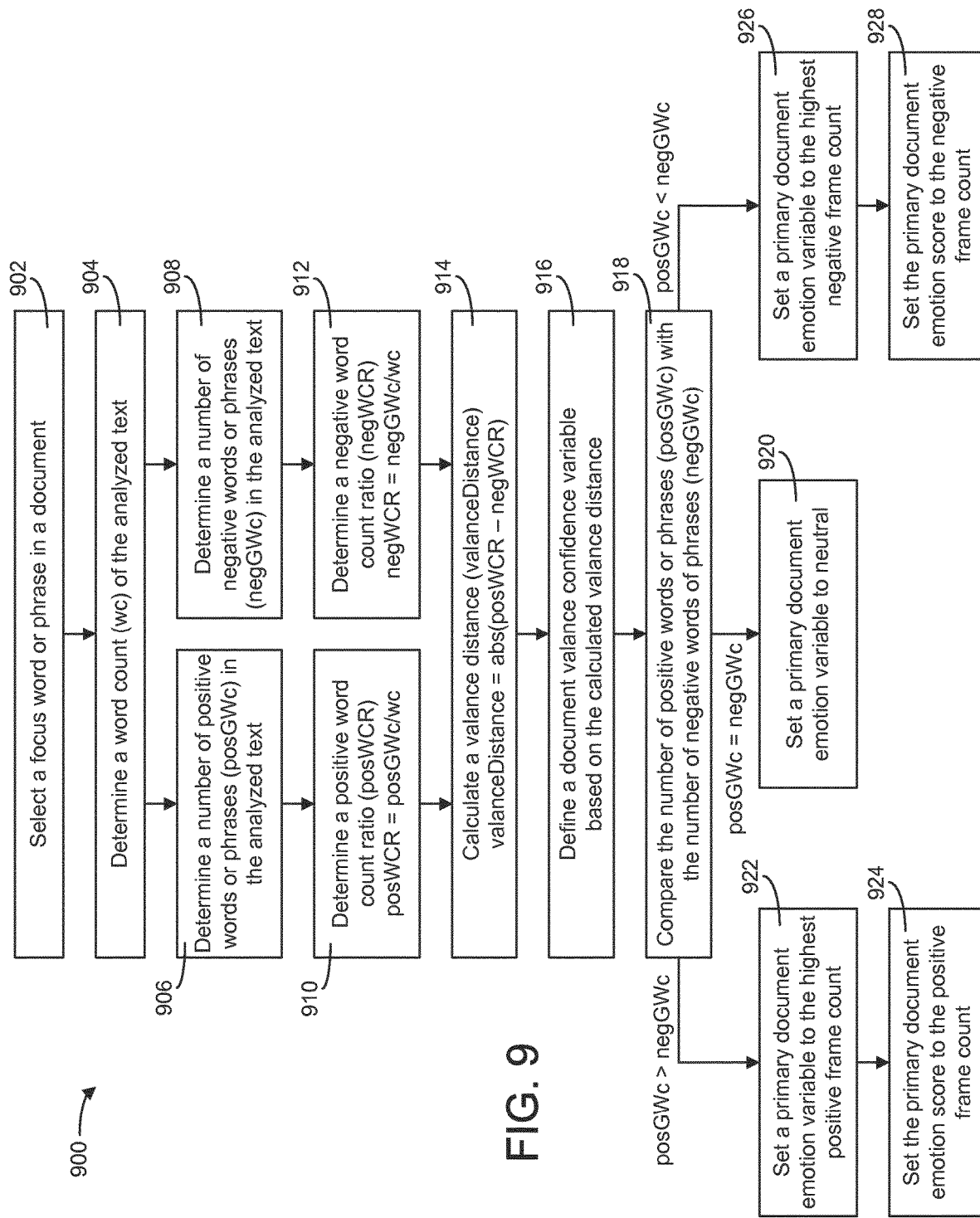
FIG. 9 is a flowchart of a process performed by the systems of the previous Figures for identifying an emotion, a cognitive state, a sentiment, or other attribute associated with a document, according to an exemplary embodiment.

Referring now to FIG. 9, a flowchart of a process 900 for identifying an emotion, a cognitive state, a sentiment, or other attribute associated with a document is shown, according to an exemplary embodiment. Process 900 may be performed by one or more components of the systems described with reference to FIGS. 1-8R. In some embodiments, process 900 may be used to determine whether a document (e.g., a webpage, a HTML document, a word processing document, a portable document format (PDF) document, etc.) expresses or implies a particular emotion (e.g., happiness, confusion, frustration, etc.) or sentiment (e.g., loyalty, value, trust, etc.). In various embodiments, process 900 may be used to determine a particular cognitive state (e.g., cognition, deception, intent, etc.) possessed by an author of a document or to identify an attribute or type of a document (e.g., promotional, educational, etc.). Process 900 may be performed to determine the sentiment that an author of a document has toward a particular topic or brand.

Process 900 is shown to include selecting a focus word or phrase in a document (step 902). The focus word or phrase may be, for example, a brand or topic about which a customer has expressed a sentiment the text of a document. The text of the document may be analyzed in a window around the focus word/phrase. The window may define a range of words on either side of the focus word/phrase in which the analysis is performed. The window size can be adjusted and the text of the document can be analyzed for various window sizes around the focus word/phrase. In some embodiments, the entire text of a document is analyzed.

Process 900 is shown to include determining a word count ("wc") of the analyzed text (step 904). The word count may be the total number of words in the document (e.g., if the entire document is analyzed) or a number of words in a window around the focus word/phrase. The analyzed text is parsed to determine a number of positive words or phrases ("posGWc") present in the analyzed text (step 906) and a number of negative words or phrases ("negGWc") present in the analyzed text (step 908). A positive word count ratio ("posWCR") is determined by dividing the number of positive words or phrases by the word count (i.e., posWCR=posGWc/wc) (step 910). A negative word count ratio ("negWCR") is determined by dividing the number of negative words or phrases by the word count (i.e., negWCR=negGWc/wc) (step 912).

Still referring to FIG. 9, process 900 is shown to include calculating a valance distance ("valanceDistance") by taking the absolute value of the difference between the positive word count ratio and the negative word count ratio (i.e., valanceDistance=abs(posWCR-negWCR) (step 914). The valance distance may indicate whether the sentiment or emotion of the document is highly positive or negative, moderately positive or negative, or fairly neutral.

Process 900 is shown to include defining a document valance confidence variable based on the calculated valance distance (step 916). Step 916 may include comparing the calculate valance distance with various threshold values. If the valance distance is less than a low threshold value (e.g., valanceDistance<0.20), step 916 may include setting the document valance confidence variable to low. If the valance distance is between the low threshold value and a high threshold value (e.g., 0.20<valanceDistance<0.60), step 916 may include setting the valance confidence variable to medium. If the valance distance is greater than the high threshold value (e.g., valance distance>0.60), step 916 may include setting the document valance confidence variable to high.

Still referring to the FIG. 9, process 900 is shown to include comparing number of positive words or phrases in the document with the number of negative words or phrases in the document (step 918). If the number of positive words or phrases is the same or substantially the same as the number of negative words or phrases (i.e., posGWc=negGWc), process 900 may include setting a primary document emotion variable to neutral (step 920).

If the number of positive words or phrases exceeds the number of negative words or phrases (i.e., posGWc>negGWc), process 900 may include setting the primary document emotion variable to the emotion associated with the highest positive frame count (e.g., Crave>Happiness>Gratitude) (step 922). The frame count associated with an emotion may be the number of words or phrases in the document associated with the emotion. Several lists of words or phrases associated with various emotions are provided below. Process 900 may further include setting the primary document emotion score variable to the positive frame count (step 924).

If the number of positive words or phrases is less than the number of negative words or phrases (i.e., posGWc<negGWc) process 900 may include setting the primary document emotion variable to the emotion associated with the highest negative frame count (e.g., Anger>Frustration>Disappointment>Confusion>Not_Happy>Not_Grateful) (step 926). Process 900 may further include setting the document primary emotion score variable to the negative frame count (step 928).

Several examples of attribute, emotion, and cognitive state frames are listed below. Each list includes a heading identifying an emotion, sentiment, cognitive state, or attribute. The items within each list are exemplary words or phrases (i.e., language features) that increase the frame count of the associated heading if the word or phrase is found within the examined text. The items within each list can be interpreted as the language of the emotion, sentiment, cognitive state, or attribute identified by the heading.

In some embodiments, list items are provided with a prefix of CEN, PRE, or POS. These indicate the position (Prefix, Center, or Post, respectively) that the language feature can be found in relation to the focus word or phrase.

In an exemplary embodiment, documents or portions of documents can be tagged by more than one attribute or emotion. Many documents or portions of documents or users can be evaluated. Predictive algorithms may process numerical tallies and/or scores to predict the future emotion associated with a product, product release, brand name or other metric.

Example of PROMOTIONAL Attribute Frame:
    CEN|best buy
    CEN|bestbuy
    CEN|black friday
    CEN|blackfriday
    CEN|buy one get one free
    CEN|christmas deals
    CEN|contest rules
    CEN|cyber monday
    CEN|cybermonday
    CEN|daily deals
    CEN|dailydelas
    POS|do you have
    PRE|factory unlocked
    PRE|for sale
    CEN|half off your next purchase
    CEN|here's your chance to get one
    PRE|in original box
    PRE|in original packaging
    CEN|last minute deals
    CEN|looking for deals
    CEN|lowest prices
    PRE|new in box
    CEN|one stop shop
    CEN|replacement for
    PRE|sealed with receipt
    CEN|small through
    POS|selling my
    CEN|how to unlock
    CEN|enter to win
    CEN|if you tweet:
    PRE|will send you
    CEN|holiday season is coming Example of Emotion 'Happiness' Frame:
    CEN|will help
    CEN|with joy
    CEN|wonderful
    CEN|wonderful i
    CEN|worked great
    CEN|works great
    CEN|worth the money
    CEN|you will be loved forever
    PRE|I loved it
    PRE|a great product
    PRE|all the way
    PRE|always cheers me up
    PRE|always makes my day
    PRE|and it is amazing
    PRE|and love it
    PRE|are the best
    PRE|awesome
    POS|enjoyed a
    POS|enjoying a
    POS|enjoying my
    POS|excited to try
    POS|exciting to have
    POS|getting
    POS|go with Example of Cognitive State 'Connection' Frame:
    PRE|allows me to
    CEN|community of
    PRE|gives me a sense of belonging
    PRE|makes me feel a sense of belonging
    CEN|my sense of belonging
    CEN|one of the team
    CEN|part of the group Models that can be used with and benefit from the above frame based processing and document scoring:
    Happiness
    Confusion
    Frustration
    Bitterness
    Cheerfulness
    Excitement
    Enthusiasm
    Gratitude
    Trust
    Contempt
    Remorse
    Irritation
    Disappointment
    Anger
    Outrage
    Embarrassment
    Behavior Shift
    Dynamic Themes
    Boo
    Not Happy
    Not Grateful
    Surprise/Shock
    Crave/Desire
    Unmet Needs
    Met Needs
    Value Category Level Models:
    CPG Category Models
    Vehicles
    Telecommunication
    Promotion
    Availability Individual Difference Models
    Personality (Big 5)
    Gender
    Age
    Ethnicity
    Education Additional Models
    Refined Influence
    Purchase Path
    Churn
    Launch Monitor
    Dynamic Share of Voice/Brand Awareness
    Brand Equity (Brand Performance Index)
    Loyalty (Satisfaction, Purchase Intent, Recommend, Return)
    Cognition (Attitudes, Perceptions, Beliefs, Motivators)
    Deception (Sarcasm, Irony, False Positives, False Negatives)
    Behavioral Economic Models
    New Category Models (Entertainment, Travel & Lodging, Food and Beverage, Media, High Tech, etc.)
    Consumer Engagement Index (By Category)

Referring now to FIGS. 10-15, several processes 1000-1500 for rule-based construct detection and scoring are shown, according to an exemplary embodiment. Processes 1000-1500 may be performed by one or more components of the systems described with reference to FIGS. 1-8R. Processes 1000-1500 may be used to assign various scores to a document based on textual data contained therein. Each score is associated with "construct." Constructs may include, for example, sentiments, emotions, opinions, recommendations, cognitive states, or other qualitative attributes or themes expressed in a document. Some exemplary constructs include happiness, confusion, frustration, bitterness, cheerfulness, excitement, enthusiasm, gratitude, trust, thoughtfulness, impactfulness, contempt, remorse, irritation, disappointment, anger, outrage, embarrassment, behavior shift, dynamic themes, boo, not happy, not grateful, surprise, shock, crave, desire, unmet needs, met needs, value, and/or other sentiments or mental states that can be expressed in a document.

Processes 1000-1500 may be used to identify one or more constructs in a document and to assign a score to the identified constructs based on the textual data of the document. The score for each construct may be at the document level. In other words, each document may have a document-specific score for each of the identified constructs. Documents may include, for example, consumer reviews, articles, essays, social media posts, user comments, or other forms of textual data. For example, the systems and methods of the present disclosure may be used to detect and score various sentiments expressed in consumer reviews of products or services. The score assigned to each construct may be intuitive (e.g., easily interpretable) and suitable for a wide range of mathematical and statistical analyses. For example, the score for a construct may operate as a continuous variable for statistical analyses.

In some embodiments, each of the identified constructs has a positive and negative form. The systems and methods described herein may balance positive evidence of a construct with negative evidence of the construct to assign a construct-specific score to a document. The evidence may be textual data extracted from the document. Each construct may be assigned a scaled score. In some embodiments, the assigned scores range from 0 to 10 where 0 is the minimum score, 5 is an unclassified score, and 10 is the maximum score. Any score between 0 and 4 may be deemed negative, and any score between 6 and 10 may be deemed positive.

In some embodiments, the systems and methods described herein asymmetrically guard against false positive results. Specifically, minimum or maximum scores (e.g., scores of either 0 or 10) may have the fewest instances of false positives. Scores between the minimum and maximum may have descending priority of detecting false positives based on the difference between the score and the closest minimum or maximum For example, scores of 9 and 1 may have the next highest priority, followed by scores of 8 and 2, and so forth. In this way, scores of 5 (unclassified) may have the lowest priority for detecting false positives.

Balancing the positive evidence of a construct with the negative evidence of a construct is made possible by the identification of relevant "grams" and "features" in the document. As used herein, a gram is a string of textual characters (e.g., letters, numbers, symbols, special characters, etc.) for which the meaning of the text string is not the focus. Grams represent keywords, phrases, or other text strings which can be counted in a document. The number of instances of various grams in a document may indicate whether the overall nature of the document is positive or negative and can be used to identify and score various constructs.

In contrast, a feature is a string of textual characters for which the meaning of the text string is the focus. Features may be patterns of wording that indicate a positive signal or a negative signal. For example, the pattern of wording "I recommend this product" is a feature because it provides a meaningful indication that the reviewer likes the product and thinks others should use it. Features may include one or more grams. For example, positive features may include such grams as "I love it," "I recommend it," or "it was easy to use." Negative features may include such grams as "I hated it," "it broke," or "I'd never buy it." Throughout this document, the terms "gram" and "feature" may be used interchangeably.

In some embodiments, various features may be classified as members of a "driver." A driver may be a general category such as "positive sentiment" or "recommendations." Various features may belong to one or more drivers. For example, the feature "I love it" may be a member of the "positive sentiment" driver, whereas the feature "I recommend it" may be a member of the "recommendations" driver.

Grams may fall into several categories of evidential confidence. The categories currently employed in the architecture include "Excellent," "Good," "Fair," "Questionable," "Bad," and "Terrible." In some embodiments, the categories further include "Prototypical Positive" and "Prototypical Negative." The names of these categories reflect the degree to which the member grams are likely to be influential in determining the positive value of the construct. For example, Excellent grams are important evidence of a positive construct; whereas Terrible grams are equally important counter-evidence. The categories and the method by which grams are derived and populated is described in greater detail with reference to FIG. 10.

The scaled score for a construct for any given document may be derived from a rule-based architecture which considers positive and negative evidence of the construct under investigation. For example, the text of the document may be analyzed to identify occurrences of various grams and features. Grams and features may provide positive and negative evidence of a construct based on the classification of the grams and features with respect to the construct (e.g., whether the gram is "excellent" evidence of the construct or "terrible" evidence of the construct). The methodology for assigning scores to constructs is described in greater detail with reference to FIGS. 13-15.

Referring now to FIG. 10, a flowchart of a process 1000 for deriving grams and categories is shown, according to an exemplary embodiment. Process 1000 may be performed by one or more components of the systems described with reference to FIGS. 1-8R. Process 1000 is shown to include classifying each of a set of multiple documents as either positive or negative with respect to a construct (step 1002). Step 1002 may include using a gateway metric to approximate the polarity of the documents. Polarizing the set of documents with respect to a particular construct may facilitate identification of various grams relevant to the construct. For example, grams that provide evidence of a positive form of the construct may occur more frequently in the documents classified as positive with respect to the construct, whereas grams that provide evidence of a negative form of the construct may occur more frequently in the documents classified as negative with respect to the construct. Step 1002 may produce two sub-datasets (i.e., a positive baseline and a negative baseline). Each data set may include one or more documents.

Still referring to FIG. 10, process 1000 is shown to include comparing the documents classified as positive with the documents classified as negative (step 1004). Step 1004 may include performing a statistical analysis on the documents to determine whether any particular grams (i.e., text strings) are correlated with the classification. For example, some grams may occur more frequently in documents classified as positive or negative with respect to the construct. Step 1004 may include identifying a number of occurrences of each identified gram in each document.

Still referring to FIG. 10, process 1000 is shown to include extracting grams from the documents and assigning scores to the grams based on the comparison (step 1006). Step 1006 may include determining whether any of the identified grams occur more frequently in the positive classified documents or the negative classified documents. In some embodiments, step 1006 includes identifying a ratio between a number or rate of occurrences of a particular gram in the positive documents and the number or rate of occurrences of the gram in the negative documents. Scores may be assigned to each gram based on the identified occurrence ratio. For example, grams that occur more frequently in the positive documents may be assigned a relatively higher score, whereas grams that occur more frequently in the negative documents may be assigned a relatively lower score.

Step 1006 may produce an extracted list of grams, derived from the documents, with each gram having a positive or a negative value. The extracted grams may include many grams that are potentially relevant to the identification of the construct at issue. In some embodiments, the list of extracted grams and the scores associated therewith define a model for scoring various documents. For example, highly-scored grams can be used as indicators of the construct at issue in another document. In other embodiments, the list of extracted grams and scores are used to develop a more sophisticated model (described in greater detail with reference to FIGS. 12-15).

Still referring to FIG. 10, process 1000 is shown to include assigning each extracted gram to a category based on a degree to which the gram evidences the construct (step 1008). Categories may include, for example, Excellent, Good, Fair, Questionable, Bad, Terrible, Prototypical Positive, Prototypical Negative, and Other. In some embodiments, grams are assigned to categories based on the scores assigned to the grams in step 1006. For example, grams with the highest scores may be assigned to the Excellent category, whereas grams with the lowest scores may be assigned to the Terrible category.

A gram may be assigned to the Excellent category if the gram is an excellent example of the construct under consideration. For example, the grams "I love it" or "I recommend it" may indicate language that describes a highly positive product experience and may be assigned to the Excellent category.

A gram may be assigned to the Good category if the gram indicates a relatively good product experience without necessarily rising to the Excellent level of the construct under consideration. For example, the grams "I liked it" or "works effectively" may indicate language that would describe a positive product experience and may be assigned to the Good category. Although grams assigned to the Good category may not seem ultimately important to the constructs of investigation, it is noted that many product experiences are a relationship between outstanding features and merely good features. This relationship is the subject of the scoring methodology described in greater detail with reference to FIGS. 13-15.

A gram may be assigned to the Fair category if the gram indicates a fair product experience, which does not rise to the Good level of the construct under consideration. For example, the grams "it was OK" or "acceptable" may indicate language that would describe a low positive product experience and may be assigned to the Fair category. Like Good grams, Fair grams may not seem ultimately important to the constructs of investigation. However, because many product experiences are a relationship between various levels of appraisal, Fair grams are relevant to the scoring methodology.

A gram may be assigned to the Prototypical Positive category if the gram is used in a document describing a generally positive product experience without necessarily having overtly positive words. For example, the gram "hey guys and girls" and "My family will be" are examples of the language people often use when they are being overtly positive elsewhere in the text. While such an assumption of positive language will be right far more often than it is wrong, it is still prone to error. As such, this category of grams may have the lowest priority is the scoring architecture and/or may be omitted entirely in some embodiments.

Although only the positive examples of gram categories (e.g., Excellent, Good, Fair, and Prototypical Positive) are explained here in detail, their negative counterparts may also exist within the architecture (e.g., Terrible, Bad, and Prototypical Negative). The description of the Terrible category is the opposite of the description of the Excellent category. The description of the Bad category is the opposite of the description of the Good category. The description of the Prototypical Negative category is the opposite of the description of the Prototypical Positive category.

A gram may be assigned to the Questionable category if the gram indicates the existence of positive or negative language without explicitly containing positive or negative language. An example of a Questionable gram is the word "however." This word is neither positive nor negative (in terms of polarity), and yet its presence suggests that both positive sentiment and negative sentiment may exist in the document (e.g., on either side of the Questionable gram). Other examples of Questionable grams may include "although," "but," "still," "nonetheless," "nevertheless," "even though," "conversely," "on the other hand," or other words of phrases that indicate the presence of both positive and negative sentiments.

Questionable grams may be extremely useful in the architecture for two reasons. First, Questionable grams are effective for guarding against false positives (and false negatives). For example, tracking every possible kind of positive and negative language may be extremely difficult. However, it's an easier task to collect a very large number of Questionable grams. If a positive or negative gram is missed, the presence of a Questionable gram may provide a warning that the text is not completely positive or completely negative and may trigger the reduction of a high confidence score associated with a document.

The second use of Questionable grams relates to the detection and scoring of certain types of constructs. For example, Questionable grams may indicate that the document is more detailed, considered, reflective, organized, crafted, reasoned, contemplative, or demonstrative of deeper levels of cognitive processing. Such attributes may be characteristic of a "thoughtfulness metric" construct expressed in the document. The thoughtfulness metric construct is described in greater detail with reference to FIG. 14.

Still referring to FIG. 10, process 1000 is shown to include expanding and validating the extracted grams (step 1010). Expanding extracted grams may include identifying numerous grams with meanings similar to the grams identified and extracted in step 1006. For example, if the gram "pleased" is extracted from the set of documents, the gram "thrilled" may be generated in step 1010 because the two grams have a similar meaning. Although these new grams may not have occurred in the initial dataset analysis, it is possible that such grams may exist in future documents.

In some embodiments, step 1010 includes generating grams based on common misspellings. Because misspellings are common in text such as consumer reviews or social media posts, it may be useful to implement a procedure for handling these misspellings. In some embodiments, step 1010 includes simply correcting the spellings. However, this process can be time consuming, computationally expensive, and runs the risk of introducing new errors. Correcting misspellings also assumes the misspelling is unintentional and robs the data of potential characteristics of the person who write the text.

In some embodiments, step 1010 includes identifying whether the misspelling is a mistake or an error. A mistake is an unintentional misspelling, whereby the writer would have written the correct spelling had there been the opportunity. By contrast, an error is the intentional spelling of a word that does not conform to most dictionaries. For example, the verb "recommend" is commonly misspelled as "reccommend" and the two-word adverbial "a lot" is commonly spelled as one word "alot." In some embodiments, expanding the extracted grams includes retaining common misspellings and adding the correct spellings.

In some embodiments, step 1010 includes dropping apostrophes. Whenever a gram with an apostrophe occurs, the non-apostrophe version may also be added. For example, if the gram "I wouldn't recommend it" was identified, then the gram "I wouldnt recommend it" may also be added.

In some embodiments, step 1010 includes adjusting for contraction negations. There are numerous ways to express a negation in English. One of the most common forms is to use the word "not." However, the word "not" is often abbreviated to "n't." Because these forms are both very common, all abbreviated and full versions of extracted grams may be included in the set of grams. For example, if the gram "I wouldn't recommend it" was identified, then the gram "I would not recommend it" may also be added. Similarly, if the gram "I would not recommend it" was identified, then the gram "I wouldn't recommend it" may also be added.

In some embodiments, step 1010 includes modifying grams for optimal performance (e.g., to improve recall/match rates in subsequent text). Most grams that start with the word "I" can have that word deleted. This deletion allows for greater recall rates (e.g., instances of occurrence in other documents) without affecting accuracy. For example, the gram "I will buy it" can become simply "will buy it." This deletion allows for many new instances to be included such as "definitely will buy it" which would not match the version of the gram with the personal pronoun.

In some embodiments, step 1010 includes adding negative versions of grams. For instance, if a gram such as "a great product" was identified and extracted from the set of documents, then the gram "not a great product" may also be added. In some embodiments, if a text string in the documents matches two or more grams, the longest gram may be considered as the best match for the text string. This helps to identify grams with the prefix "not" in front of an otherwise positive sentiment. (e.g., "not a great product").

In some embodiments, step 1010 includes validating the extracted grams. One technique for validating the extracted grams is face validation. Face validation is a broad approach for authenticating that any given appraisal is what it is supposed to be. As the name suggests, face validation primarily involves looking at the data and its associated output and checking (on the face of it) whether the result makes sense. Although face validation may not be the final justification of a system's performance, face validity may be a threshold test before more rigorous validation methods are employed.

Referring now to FIG. 11 a flowchart of a process 1100 for validating grams is shown, according to an exemplary embodiment. Process 1100 may be performed by one or more components of the systems described with reference to FIGS. 1-8R. In some embodiments, process 1100 may be used to accomplish the gram validation component of step 1010, described with reference to FIG. 10.

Process 1100 is shown to include assessing texts assigned a maximum score or a minimum score for accuracy (step 1102). Step 1102 may include examining documents which receive a score of 10 (maximum) and 0 (minimum) to determine whether the document is actually extremely positive or extremely negative with respect to the construct at issue. Documents that are assigned a maximum score or a minimum score may be the highest priority for validation due to the increased importance of avoiding false positives and false negatives for documents at an extremum of the score range.

Still referring to FIG. 11, process 1100 is shown to include identifying new grams for correction in response to a determination that the scores assigned to at least a threshold value of the assessed texts are erroneous (step 1104). For example, if more than 5% (or any other percentage, proportion, or quantity) of the texts are assigned inaccurate scores, then new grams may be identified for correction. The identification performed in step 1104 may also lead to tweaks in the architecture (e.g., adding additional categories, adjusting the scoring methodology, etc.).

Still referring to FIG. 11, process 1100 is shown to include assessing for accuracy texts assigned a score incrementally less than the higher score of the previously assessed texts or incrementally more than the lower score of the previously assessed texts (step 1106). Step 1106 may be performed in response to a determination that fewer than the threshold amount of texts assessed in step 1102 are assigned inaccurate scores. Step 1106 may initially include checking for errors in the texts assigned scores of 1 and 9. The score 1 is incrementally more than the minimum score of 0 and the score 9 is incrementally less than the maximum score of 10. In this embodiment, the increment is an integer value (i.e., 1).

If the error rate of the assessed texts is greater than the threshold value, process 1100 is shown to include repeating step 1104 to identify new grams for correction. The grams may be updated until the error rate for the assessed texts is less than the threshold value. Once the error rate for the assessed texts is less than the threshold value, step 1106 may be repeated. After assessing the texts assigned scores of 1 and 9, the texts assigned scores of 2 and 8 are assessed. The score 2 is incrementally more than the previous assessed score of 1 and the score 8 is incrementally less than the previous assessed score of 9. As shown in FIG. 11, steps 1104 and 1106 may be repeated until the scoring error requirements for all of the classified texts are satisfied.

Still referring to FIG. 11, process 1100 is shown to include unpacking unclassified texts (step 1108). In the scoring range from 0 to 10, texts assigned a score of 5 may be unclassified or neutral (i.e., neither positive nor negative with respect to a particular construct). However, many unclassified texts are, in reality, either positive or negative. In some embodiments, text may be unclassified if none of the categories contained member grams that were present in the text. If no member grams are present, the document may receive no hits and may be unclassified (e.g., assigned a score of 5).

Texts may have no identified categories for one of several reasons. First, the text may have no identified categories if the text simply has no positive or negative elements. Such a text can be described as a "natural unclassified." Second, a text may have no identified categories if the category lists do not yet include a reasonable gram that is present in the document text. In step 1104, new grams can be identified to correct for such scoring errors. Such a text can be described as "under-specified." Third, a text may have no identified categories if the identified grams are over specific. For example, the phrase "smooth reusable product" is clearly a positive attribute; however, such a phrase is highly specific and may not match any of the identified grams. Such a text can be described as "over-specified." Fourth, a text may have no identified categories if the Prototypical Positive grams and Prototypical Negative grams have not been added to the architecture. For example, grams such as "hey guys and girls" and "My family will be" (and numerous others) are not, in and of themselves, positive or negative; however, they do tend to co-occur in positive and negative text. Such a text may be described as "potentially specified."

Other texts may be unclassified because too many of the categories contained member grams that were present in the text (i.e., the text has high evidence of both positive and negative information). If too many member grams are present, the document may receive a high-multiple hit rate (or driver activation) that is currently outside the range of the architecture. Such documents may also be unclassified and assigned a neutral score (e.g., assigned a score of 5).

Texts that have too many identified grams across categories may fall outside of the current architectural assignment rules. An example of such a text is one that has multiple hits for the Excellent category and multiple hits for the Terrible category. When texts are relatively long, they may include multiple pieces of contrasting evidence. Such texts may be rich in information, and may be good examples of "thoughtfulness metric" texts (described in greater detail with reference to FIG. 14).

In some embodiments, step 1108 includes classifying unclassified texts based on the text's "rightedness." The polarity of a text with multiple contrasting category activations (positive or negative) is most likely to be evidenced by the final identified gram of the text. For example, if the final identified gram in the text is from the Excellent category, then the text is likely to be positive. By contrast, if the final identified gram of a text is from the Terrible category, then the text is more likely to be negative. Step 1108 may include determining whether the final identified gram is positive or negative and adjusting the score of the unclassified text accordingly. In step 1108, the score assigned to a document can be adjusted so any document initially scored as neutral (e.g., assigned a score of 5) incremented if the final gram is a positive gram (e.g., changed from a 5 to a 6) or decremented if the final gram is a negative gram (e.g., changed from a 5 to a 4).

In some embodiments, step 1108 includes classifying texts based on the relationship between the number of positive themes and negative themes in the text. For example, if the ratio of positive to negative themes is higher than a threshold value in all identified positive texts, then a given unclassified document with a similar ratio is likely to also be positive. The same supposition as ratio scoring can be applied to density scoring or difference scoring.

In some embodiments, step 1108 includes determining the ratio, density, or difference between positive grams and negative grams in a collection of documents scored positively and in a collection of documents scored negatively. If the ratio, density, or difference between the positive and negative grams in the text currently being scored is closer to the ratio, density, or difference associated with the positive documents, the text currently being scored may be assigned a positive score. Conversely, if the ratio, density, or difference between the positive and negative grams in the text currently being scored is closer to the ratio, density, or difference associated with the negative documents, the text currently being scored may be assigned a negative score.

Referring now to FIG. 12, a flowchart of a process 1200 for defining drivers is shown, according to an exemplary embodiment. Process 1200 may be performed by one or more components of the systems described with reference to FIGS. 1-8R. A driver may be a general category such as "positive sentiment" or "recommendations." Various features or grams may belong to one or more drivers. For example, the feature "I love it" may be a member of the "positive sentiment" driver, whereas the feature "I recommend it" may be a member of the "recommendations" driver.

The drivers (also sometimes referred to as attributes or moves) may be sub-divisions of the categories that better identify the motivation of groups of themes. For example, the following grams all indicate future intent to purchase: "will keep purchasing," "continue to buy," "I would buy," "I will buy," "would definitely buy." Categories (e.g., Excellent, Bad, Questionable) may sub-divided into driver frames according to identified drivers (e.g., future purchase intent, direct recommendation, cognitive-surprise, etc.). Process 1200 is a process for identifying drivers and assigning grams/features to a driver group.

Still referring to FIG. 12, process 1200 is shown to include estimating one or more driver groups present in a set of documents (step 1202). Step 1202 may include estimating general driver groups that are likely to be present in the document set. For example, if the documents are consumer reviews of retail products, step 1202 may include estimating driver groups for recommendations, emotive responses, past experiences, etc.

Process 1200 is shown to include assigning grams to a driver group (step 1204). If a gram does not correspond to any driver group, a new driver group may be added (step 1206). In some embodiments, if the number of grams in a driver group exceeds a threshold value, the driver group is split into multiple driver groups (step 1208). In some embodiments, multiple driver groups may be combined into a single driver group in response to a determination that the number of grams in the driver groups are less than a threshold value (step 1210).

Process 1200 may be performed multiple times as the latent driver taxonomy is derived from the data. In some embodiments, process 1200 may produce a three-level taxonomy having a temporal level, an entity level, and a terminal level.

At the highest level, drivers may have a temporal aspect. The temporal aspect may indicate whether the driver is past, present, or future. For example, consumer reviews may include (1) a discussion of product or personal experiences prior to the testing (e.g., "I used to hate showering but . . . "), (2) a discussion of product or personal experiences that occur contemporaneously with the testing (e.g., "I liked it very much," "it is easy to use," "I was pleasantly surprised"), or (3) a discussion or insight as to future product or personal experiences (e.g., "I recommend it," "I will be buying it again," "this is a winner").

At the intermediate level, drivers may have an entity aspect. The entity aspect may indicate whether the driver is personal or product-based. Consumer reviews may be focused more relatively to the product or more relatively to the personal experience. For example, the consumer review "I used to hate showering but . . . " is related to a personal experience. However, the consumer review "I liked it very much" is obviously from the person but is indicative that that the product is good/useful/positive. The consumer review "I was pleasantly surprised informs" indicates a cognitive reaction; "I recommend it" is a personal appraisal; "I will be buying it again" is a personal intent; and "easy to use" describes a functional aspect of the product.

At the terminal level is the actual driver. The actual driver may be a category of sentiment expressed in the text. For example, "pleasantly surprised" is a "current>personal>cognitive-surprise" driver, whereas "will be buying it again" is a "future>personal>purchase-intent" driver, and "easy to use" is a "current>product>efficacy" driver.

Referring now to FIG. 13, a flowchart of a process 1300 for scoring documents using rule-based criteria is shown, according to an exemplary embodiment. Process 1300 may be performed by one or more components of the systems described with reference to FIGS. 1-8R. Process 1300 may be performed to assign a numerical score to a document based on the text of the document. In brief overview, a document is parsed to identify grams in the document. The grams are extracted from the document. The categories of the grams (e.g., Excellent, Good, Fair, Questionable, Bad, Terrible, etc.) in the document are identified and the quantity of grams in each category is compiled. A rule-based procedure assigns a construct score to the document based on the number of grams (extracted from the document) in each category.

Still referring to FIG. 13, process 1300 is shown to include analyzing textual data in a document to identify one or more grams present in the textual data (step 1302). The grams may be generated, expanded, and/or validated using process 1000. Grams may be tested for accuracy using process 1100 and assigned to driver groups using process 1200. The grams used in step 1302 may be the result of processes 1000-1200. Step 1302 may include parsing the textual data of a document for occurrences of grams (i.e., text strings) in the document.

Still referring to FIG. 13, process 1300 is shown to include identifying a category associated with each identified gram (step 1304). Categories may include Excellent, Good, Fair, Questionable, Bad, and Terrible. Grams in the Excellent and Good categories indicate a positive view towards what is being discussed. The difference between Excellent and Good is the degree of confidence that the feature indicates the text's positivity. For example, the gram "I totally recommend this product" may be a member of the Excellent category, whereas the gram "works effectively" may be a member of the Good category. The categories of Terrible and Bad may be the opposite of Excellent and Good in that their presence indicates a "negative view" in the text. For example, the gram "definitely won't purchase" may be a member of the Terrible category, whereas the gram "would not advise" may be a member of the Bad category.

Grams in the Questionable category may be positive or negative, depending on context. The presence of questionable grams in a text therefore adds a degree of ambiguity in classification. For example, the gram "I am not quite sure" may be a Questionable gram. Grams in the Fair category, although they are not actually negative, have the potential to indicate either a positive or negative view, depending on the context. An example of a Fair gram is "it's ok." If the text includes multiple Bad or Terrible grams along with "it's ok," then this Fair gram may indicate a negative view. However, if the same gram "it's ok" is used along with multiple Good or Excellent grams, then the Fair gram may indicate a positive view. Fair grams may supplement the group of grams that best categorizes the text prior to their inclusion.

Grams may be pre-assigned to categories prior to performing process 1300 (e.g., in step 1008 of process 1000). In some embodiments, step 1304 includes identifying the category to which each of the identified grams was previously assigned. The category to which a gram is assigned may be associated with the gram and identified in step 1304.

Still referring to FIG. 13, process 1300 is shown to include calculating a quantity of grams in the textual data associated with each identified category (step 1306). Step 1306 may include determining the total number of grams in each general category (i.e., Excellent, Good, Fair, Questionable, Bad, and Terrible) that are present in the textual data. For example, if the textual data includes four grams which are members of the Good category (G) and one gram that is a member of the Excellent category (E), step 1306 may include summing the total number of grams in each identified category to calculate E=1 and G=2.

In some embodiments, step 1306 includes combining one or more categories of grams and calculating a total number of grams in the textual data that are members of the combined category. For example, step 1306 may include defining a new category "Less than Good" (LG) which includes all of the categories Questionable, Bad, and Terrible (i.e., all the categories which are less than the Good category in terms of providing evidence of the corresponding construct). In other words, LG grams may include all of the Questionable grams, all of the Bad grams, and all of the Terrible grams that are identified in the document. The number of LG grams in a text may be relevant because the presence of LG grams can offset the presence of highly positive components of the text.

Categories may be referred to by the first letter of their names. Thus, Excellent is E, Good is G, Fair is F, Bad is B, Terrible is T, Less than Good is LG, etc. As used herein, the variable CX refers to an arbitrary construct "Construct X." Construct X may be any construct for which the score is currently being calculated in process 1300. Some exemplary constructs include happiness, confusion, frustration, bitterness, cheerfulness, thoughtfulness, impactfulness, excitement, enthusiasm, gratitude, trust, contempt, remorse, irritation, disappointment, anger, outrage, embarrassment, behavior shift, dynamic themes, boo, not happy, not grateful, surprise, shock, crave, desire, unmet needs, met needs, value, and/or other sentiments or mental states that can be expressed in a document.

Still referring to FIG. 13, process 1300 is shown to include applying scoring rules to the calculated quantities of grams to determine a construct score for the document (step 1308). In some embodiments, process 1300 uses a scoring scale from 0-10 where a score of 10 indicates clear positive evidence of CX and a score of 0 indicates clear negative evidence of CX. In some embodiments, the document is checked to assess whether it is characteristic of a prototypical CX text or a non-prototypical CX text. If the document is not characteristic of either category then the document is may be given a preliminary score of neutral (e.g., 5 on a scale from 0-10) to indicate initial neutrality or unknown.

High-scoring CX texts (e.g., 10's, 9's, and 8's) have both clear positive evidence of CX and no non-positive evidence. The following equation demonstrates an exemplary rule-based scoring method for such documents:

$$W = \begin{cases} 10 & \text{if } E > 0, \ LG = 0 \\ 9 & \text{if } G > 2, \ LG = 0 \\ 8 & \text{if } G > 1, \ LG = 0 \end{cases}$$

The preceding equation describes the process for allocating initial scores of W=10, W=9, and W=8, where W is the score assigned to CX. Thus, for example, if the identified number of Excellent features (E) is greater than 0 and the identified number of features that are less than good (LG) is equal to zero, then an initial CX score of 10 is given. The rationale for this scoring is that a text would be given an initial maximum CX score of 10 if it contains a lot of positive evidence and no counter-evidence. As shown in the scoring equation, a maximum score of 10 cannot be attained without at least one piece of clear Excellent evidence of CX (e.g., E>0) and any contrary evidence (e.g., LG>0 or E=0) renders a full score non-possible. In this way, high confidence can be maintained that scores of 10 are assigned to only the most clearly positive documents.

The above equation applies only to documents that have only positive evidence (e.g., LG=0). However, many documents will have at least some negative or non-positive evidence. The rules for scoring documents with at least some negative evidence may be more detailed. CX scores of 5 through 8 may be calculated in the event that both positive and non-positive evidence are identified. The process for calculating scores of 5-8 may involve calculating a temporary CX score ($CX_1$) in step 1308 and then calculating a second CX score in step 1310. The temporary $CX_1$ score calculated in step 1308 may consider the importance of the non-positive evidence, whereas the second CX score calculated in step 1310 may consider the importance of the positive evidence.

For CX scores of 5 through 8, step 1308 considers two primary cases:
  Case A: E>LG>0
  Case B: G>LG>0 AND LG≥E For Case A, the number of Excellent features (E) is greater than the number of identified less than good features (LG), which in turn is greater than zero. Therefore, in Case A, if LG is equal to 1, then E must be greater than 1. For Case B, two criteria must be met. First, the number of identified Good features (G) is greater than the number of identified less than good features (LG), which in turn is greater than zero. Therefore, in Case B, if LG is equal to 1, then G must be greater than 1. Additionally, the second criterion requires that LG≥E. This extra requirement means that the number of identified elements of G is greater than the number of identified elements of E. In other words, the purpose of Case A is to determine if the positive elements of a document are more Excellent features than Good features, and the purpose of Case B is to determine if the positive elements of a document are more Good features than Excellent features. Both rules may ensure that a document is not double-scored.

Given the above two cases, step 1308 may be performed to generate a temporary score of $CX_1$ based on non-positive evidence. The $CX_1$ score may be modified based on the type of positive evidence (either Excellent or Good) in step 1310.

As noted above, the category LG consists of the categories of Questionable, Bad, and Terrible. The negative impact of the number of LG grams on the final CX score may depend largely on what the individual category of LG grams (e.g., Questionable, Bad, and Terrible), and how much evidence is identified for each LG category. The following equation shows how initial $CX_1$ scores of 5 to 8 can be evaluated:

$$CX_1 = \begin{cases} 8 & \text{if } T = 0, B = 0, Q = 1 \\ 7 & \text{if } T = 0, B = 0, Q > 1 \\ 6 & \text{if } T = 0, B > 0 \text{ or } T = 1 \\ 5 & \text{if } T > 1 \end{cases}$$

For example, according to the equation for calculating initial $CX_1$ values of 5-8, $CX_1$ will equal the value of 8 if the number of identified Terrible features is equal to 0, the number of identified Bad features is equal to 0, and the number of identified Questionable features is equal to 1. Note also in this example that since LG>0 (according to the criteria for Case A or Case B), then at least one of the T, B, and Q grams must be present at least once. Additionally, since either E>LG (Case A) or G>LG (Case B) and the Terrible grams are members of LG, if T>1, then E or G (individually or collectively) must be greater than T for the equation to be satisfied.

If none of the aforementioned scoring criteria are met, then step 1308 considers the opposite scenario in order to generate scores from 0 through 5. The rule-based scoring criteria for generating scores from 0 through 5 may be the negative counterparts of the scoring criteria for generating scores from 5 through 10. For example, all of the above equations still apply with E's replaced by T's, G's replaced by B's, and LG's replaced by AB's (where AB means "above bad"). The scores assigned by the negative counterpart equations may be adjusted by a rule of 10−s, where s is the score in the positive counterpart equation. For example, 10 is replaced by (i.e., 10−10), 9 is replaced by 1 (i.e., 10−9), 8 is replaced by 2 (i.e., 10−8), 7 is replaced by 3 (i.e., 10−7), 6 is replaced by 4 (i.e., 10−6) and 5 remains at 5 (i.e., 10−5). The negative counterpart equations are provided as follows:

$$W = \begin{cases} 0 & \text{if } T > 0, \ AB = 0 \\ 1 & \text{if } B > 2, \ AB = 0 \\ 2 & \text{if } B > 1, \ AB = 0 \end{cases}$$

$$CX_2 = \begin{cases} 2 & \text{if } E = 0, G = 0, Q = 1 \\ 3 & \text{if } E = 0, G = 0, Q > 1 \\ 4 & \text{if } E = 0, G > 0 \text{ or } E = 1 \\ 5 & \text{if } E > 1 \end{cases}$$

The negative counterpart equations are used to assign scores between 0 and 5, where 0 is the lowest possible score and $CX_2$ is the temporary score assigned to negative documents. For scores between 0 and 5, the temporary $CX_2$ score calculated in step 1308 may consider the importance of the non-negative evidence, whereas the second CX score calculated in step 1310 may consider the importance of the negative evidence.

Still referring to FIG. 13, process 1300 is shown to include applying additional scoring rules to adjust the construct score (step 1310). As noted above, step 1308 may be performed to calculate a temporary $CX_1$ score (e.g., $CX_1$), which considers the importance of the non-positive evidence. Step 1310 may be performed to adjust the temporary score $CX_1$ based on non-positive evidence.

For temporary $CX_1$ scores of 5-8, step 1310 may adjust the temporary $CX_1$ score based on whether Case A or Case B has been met. For example, the following equation describes the effect of Case A (i.e., E>LG>0):

$$\text{if } E > LG > 0, \text{ then } CX = \begin{cases} CX_1 & \text{if } G = 0 \\ CX_1 + \alpha_1 & \text{if } G = 1 \\ CX_1 + \alpha_2 & \text{if } G > 1 \end{cases}$$

In some embodiments, the parameters $\alpha_1$ and $\alpha_2$ have the values $\alpha_1=1$ and $\alpha_2=1.5$. In other embodiments, $\alpha_1$ and $\alpha_2$ have different (e.g., greater or lesser) values. In some embodiments, $\alpha_1$ and $\alpha_2$ can be automatically or manually adjusted (e.g., tuned, updated, dynamically or adaptively adjusted, etc.) to tune the scoring algorithm. For example, step 1104 of process 1100 may include adjusting parameters $\alpha_1$ and $\alpha_2$ in response to a determination that the number of texts assigned an inaccurate score exceeds a threshold value.

For Case A to apply, the number of Excellent grams is greater than the number of LG grams. As shown in the above equation, if the value of G is greater than 1, then the temporary $CX_1$ score may be increased by $\alpha_2$. If the value of G is equal to 1, then the temporary $CX_1$ score may be increased by $\alpha_1$. If the value of G is equal to 0, then the temporary $CX_1$ score may not be increased or decreased.

The following equation describes the effect of Case B (i.e., G>LG>0 and LG≥E):

$$\text{if } G > LG > 0 \text{ and } LG \geq E, \text{ then } CX = \begin{cases} CX_1 + \alpha_3 & \text{if } E = 0 \\ CX_1 & \text{if } E > 0 \end{cases}$$

In some embodiments, the parameter a 3 has the value a 3=−1. In some embodiments, a 3 can be automatically or manually adjusted (e.g., tuned, updated, dynamically or adaptively adjusted, etc.) to tune the scoring algorithm. For example, step 1104 of process 1100 may include adjusting parameters $\alpha_3$ in response to a determination that the number of texts assigned an inaccurate score exceeds a threshold value.

For Case B to apply, the number of Good grams is greater than the number of Excellent grams. Also, G must be greater than LG. Given that G evidence is primarily providing the positive score, the value of E may affect whether the temporary $CX_1$ score is adjusted or not adjusted. For example, if E is equal to zero then the positive evidence is not strong and the value of CX is calculated by adding $\alpha_3$ to the temporary $CX_1$ score. Since $\alpha_3$ is a negative number (e.g., $\alpha_3=-1$), the lack of strong positive evidence (e.g., E=0) functions to decrease the CX score.

For $CX_2$ scores from 0 to 5, step 1310 may use the negative counterparts of the adjustment equations provided above. The negative counterpart equations are provided as follows:

$$CX = \begin{cases} CX_2 & \text{if } B = 0 \\ CX_2 - \alpha_1 & \text{if } B = 1 \\ CX_2 - \alpha_2 & \text{if } B > 1 \end{cases}$$

-continued $$CX = \begin{cases} CX_2 - \alpha_3 & \text{if } T = 0 \\ CX_2 & \text{if } T > 0 \end{cases}$$

In some embodiments, step 1310 includes applying rightedness criteria to the CX scores. Rightedness considers the location at which the final instance of an identified gram occurs. For example, the final instance of an Excellent gram is to the right of the final instance of any LG gram, then step 1310 may include increasing the CX score by 1 point. If the final instance of a Terrible gram is to the right of the final instance of any AB gram, then step 1310 may include decreasing the CX score by 1 point.

Referring now to FIG. 14, a flowchart of a process 1400 for assigning a "thoughtfulness" score to a document is shown, according to an exemplary embodiment. Processes 1400 may be performed by one or more components of the systems described with reference to FIGS. 1-8R. Thoughtfulness is a construct defined by the characteristics of being detailed, considered, reflective, organized, crafted, reasoned, contemplative, or demonstrative of deeper levels of cognitive processing. As such, texts having a high thoughtfulness score are counter-characterized by the degree to which they are spontaneous, extemporaneous, visceral, impactful, immediate, intensive, and/or emotive. A text with a high thoughtfulness metric score is not merely good, it is better than good.

Texts with a high thoughtfulness score often include considered (hence cognitive) responses more frequently than overt positive claims. For example, high-scoring thoughtfulness metric texts may include some detail or mention of how the product benefited, changed, or impacted a participant's personal experience. Additionally, texts with a high thoughtfulness score may include a recommendation (direct or indirect) of the product and/or an intent for personal future use/purchase of the product. Texts with a high thoughtfulness score may include a prior experience with a similar product. In either case, this temporal perspective demonstrates that the text is more "thought out" and consequently that the writer's mental model of the product type may have been influenced.

Still referring to FIG. 14, process 1400 is shown to include identifying a construct score for a document (step 1402). Process 1400 may accept the construct score CX determined in process 1300 as an input, or may accept a general indication of whether the document is generally positive or generally negative as an alternative to the construct score CX. The construct score may be a numerical score from 0 through 10 as described with reference to FIG. 13.

Still referring to FIG. 14, process 1400 is shown to include calculating a "thoughtfulness starting score" $WM_0$ based on the construct score (step 1404). Step 1404 may include assigning a maximum score (e.g., 10) to documents with a positive construct score (e.g., a score from 6-10) and assigning a minimum score (e.g., 0) to documents with a negative construct score (e.g., a score from 0-4). Documents with a neutral construct score (e.g., 5) may be assigned the same thoughtfulness starting score (e.g., 5). An equation describing the calculation performed in step 1404 is provided as follows:

$$WM_0 = \begin{cases} 10 & \text{if } 10 \geq CX > 5 \\ 0 & \text{if } 0 \leq CX < 5 \\ 5 & \text{otherwise} \end{cases}$$

where $WM_0$ is the thoughtfulness metric starting score and CX is the construct score.

Still referring to FIG. 14, process 1400 is shown to include determining a quantile score for the document (step 1406). The quantile score may represent a proportion of the document text that consists of unknown themes (i.e., text strings that do not match any identified gram or feature). Prior to step 1406, a variety of drivers and their associated themes that are present in the document may be detected. This detection allows the system to know how much of the text is identified and, therefore, how much of the text is made up of unknown themes. The parts of the text that are unknown may be relatively unique language that evidentially supports those elements of the texts that the system has been able to identify. Thus, if a text is generally positive based on the known themes (e.g., assigned a CX score of 6-10), the unknown themes may support the known themes in expressing a generally positive sentiment.

In some embodiments, step 1406 includes calculating a proportion of the document text that consists of unknown themes. The proportion of unknown themes may be calculated by first forming a baseline estimate for the proportion of the text that is estimated to contain known themes (e.g., a ratio of the number of words that are part of known themes to the total length of the document). Once the known-themes proportion of the text is identified, the number of unknown themes can be estimated from the length and the proportion of known themes (e.g., the length of the remaining text multiplied by the ratio of known themes).

In some embodiments, step 1406 includes assigning documents with the fewest number of unknown themes a low quantile score. For example, the documents with the shortest 5% of unknown themes may be assigned a score of 0. Quantile scores may be assigned to the remaining documents based on the length and/or number of unknown themes. For example, documents with the next shortest 15% of unknown themes may be assigned a quantile score of 1, documents with the middle 50% of unknown themes (based on known theme length and/or number) may be assigned a quantile score of 2, documents with the next 15% of unknown themes may be assigned a quantile score of 3, and documents with the longest 5% of unknown themes may be assigned a quantile score of 4. In various embodiments, the quantile scores and/or scoring criteria may be adjusted or more finely tuned. For example, dividing the texts into more quantiles may allow quantile scores to be defined with more precision.

Still referring to FIG. 14, process 1400 is shown to include using the thoughtfulness starting score $WM_0$ and the quantile score $q_n$ to calculate a thoughtfulness score for the document (step 1408). In some embodiments, step 1408 includes using the following equation to calculate the thoughtfulness score $M_t$:

$$M_t = \begin{cases} 6 + q_n & \text{if } WM_0 = 10 \\ 4 - q_n & \text{if } WM_0 = 0 \\ 5 & \text{otherwise} \end{cases}$$

where $q_n$ is the quantile score for the text and $WM_0$ is the thoughtfulness starting score calculated in step 1404. According to the above equation, if the text has a baseline score of 10, its thoughtfulness score $M_t$ is $6+q_n$. If the text has a baseline score of 0, then its thoughtfulness score $M_t$ is $4-q_n$.

Note that in these calculations, the starting thoughtfulness score is either 10 or 0. Texts which scored 5 are not affected at this stage. The calculations include subtracting (for positives) or adding (for negatives) the quantity $4-q_n$ to the starting thoughtfulness score. The significance of this quantity is that it represents the difference between the quantile score of the longest texts ($q_n=4$) and the quantile score $q_n$ for the text at issue. Step 1408 effectively penalizes the text's thoughtfulness score for brevity.

Still referring to FIG. 14, process 1400 is shown to include applying scoring rules to adjust the thoughtfulness score (step 1410). Prior to step 1410, the number and type of Excellent and Terrible features have not been considered. The rightedness of the identified features has also not been considered. To account for these features, process 1400 uses the following equation to adjust the thoughtfulness score calculated in step 1408:

$$\text{if } 6 \le M_t \le 10,$$
$$\text{then } M_t' = \begin{cases} M_t - 1 & \text{if } E < 2, \text{ or text is not positive righted} \\ M_t & \text{otherwise} \end{cases}$$

The preceding equation applies to $M_t$ scores of 6-10, where $M_t$ is the thoughtfulness score calculated in step 1408. According to this equation, a text's corrected thoughtfulness score $M_t'$ can be adjusted down by a point or any other decrement (e.g., half a point, one and a half points, two points, etc.). This adjustment occurs if the text does not contain at least 2 pieces of positive evidence from the Excellent category and the text's rightedness is not positive (e.g., the last gram is not positive). The lower bound score may be fixed at 6 so that a text remains as positive with the lowest possible score positive.

Negative scores (0 to 4) are calculated in the same way as positive scores with two exceptions. First, the Excellent category is replaced by the Terrible category. Second, all adjustments require just one piece of evidence for Terrible because of the relative lack of unknown themes that is a characteristic of negative texts. The following equation is used to calculate adjusted thoughtfulness scores for M t scores from 0-4:

$$\text{if } 0 \le M_t \le 4,$$
$$\text{then } M_t' = \begin{cases} M_t - 1 & \text{if } T < 1, \text{ or text is not positive righted} \\ M_t & \text{otherwise} \end{cases}$$

Referring now to FIG. 15, a flowchart of a process 1500 for calculating an "impactfulness" score for a document is shown, according to an exemplary embodiment. Process 1500 may be performed by one or more components of the systems described with reference to FIGS. 1-8R. Impactfulness is a construct defined by the characteristics of being spontaneous, extemporaneous, visceral, impactful, immediate, intensive, and/or emotive (especially in terms of happiness and positive surprise). As such, texts with a high impactfulness score are counter-characterized by the degree to which they are detailed, considered, reflective, organized, crafted, reasoned, contemplative, or demonstrative of deeper levels of cognitive processing.

Texts with a high impactfulness score can be described as being emotionally driven, even while emotion words themselves may sometimes be absent. The more a text appears to be thought out or demonstrates supporting evidence for the claims made within the text, the less the text is deemed to be characteristic of a high impactfulness text (even though it will remain positive in terms of Construct X and thoughtfulness). Texts with a high impactfulness score are not merely good, they are better than good: The product/service is better than most comparable alternatives on the market (especially the user's current/previous product/service). The impactfulness score for a text may be correlated with purchase intent.

Texts with a high impactfulness score can be quantitatively identified by reversing the logic of unknown themes that was applied in process 1400. For example, if a text is overwhelmingly composed of known themes, then its personalized unique contribution is negligible. Such documents may have been written relatively quickly and may be weakly supported by life-experience evidence. Texts with a high impactfulness score texts, although overwhelmingly positive, may not provide clear evidence that such an experience has transitioned into a significant life change or mental model change.

Still referring to FIG. 15, process 1500 is shown to include identifying a construct score for a document (step 1502). Process 1500 may accept the construct score CX determined in process 1300 as an input, or may accept a general indication of whether the document is generally positive or generally negative as an alternative to the construct score CX. The construct score may be a numerical score from 0 through 10 as described with reference to FIG. 13.

Still referring to FIG. 15, process 1500 is shown to include calculating an impactfulness starting score based on the construct score (step 1504). Step 1504 may include assigning a maximum score (e.g., 10) to documents with a positive construct score (e.g., a score from 6-10) and assigning a minimum score (e.g., 0) to documents with a negative construct score (e.g., a score from 0-4). Documents with a neutral construct score (e.g., 5) may be assigned the same impactfulness starting score (e.g., 5). An equation describing the calculation performed in step 1504 is provided as follows:

$$WM_0 = \begin{cases} 10 & \text{if } 10 \geq CX > 5 \\ 0 & \text{if } 0 \leq CX < 5 \\ 5 & \text{otherwise} \end{cases}$$

where $WM_0$ is the impactfulness starting score and CX is the construct score.

Still referring to FIG. 15, process 1500 is shown to include determining a quantile score for the document (step 1506). The quantile score may represent a proportion of the document text that consists of unknown themes (i.e., text strings that do not match any identified gram or feature). Prior to step 1506, a variety of drivers and their associated themes that are present in the document may be detected. This detection allows the system to know how much of the text is identified and, therefore, how much of the text is made up of unknown themes. The parts of the text that are unknown may be relatively unique language that evidentially supports those elements of the texts that the system has been able to identify. Thus, if a text is generally positive based on the known themes (e.g., assigned a CX score of 6-10), the unknown themes may support the known themes in expressing a generally positive sentiment.

In some embodiments, step 1506 includes calculating a proportion of the document text that consists of unknown themes. The proportion of unknown themes may be calculated by first forming a baseline estimate for the proportion of the text that is estimated to contain known themes (e.g., a ratio of the number of words that are part of known themes to the total length of the document). Once the known-themes proportion of the text is identified, the number of unknown themes can be estimated from the length and the proportion of known themes (e.g., the length of the remaining text multiplied by the ratio of known themes).

In some embodiments, step 1506 includes assigning documents with the fewest number of unknown themes a low quantile score. For example, the documents with the shortest 5% of unknown themes may be assigned a score of 0. Quantile scores may be assigned to the remaining documents based on the length and/or number of unknown themes. For example, documents with the next shortest 15% of unknown themes may be assigned a quantile score of 1, documents with the middle 50% of unknown themes (based on known theme length and/or number) may be assigned a quantile score of 2, documents with the next 15% of unknown themes may be assigned a quantile score of 3, and documents with the longest 5% of unknown themes may be assigned a quantile score of 4. In various embodiments, the quantile scores and/or scoring criteria may be adjusted or more finely tuned. For example, dividing the texts into more quantiles may allow quantile scores to be defined with more precision.

Still referring to FIG. 15, process 1500 is shown to include using the impactfulness starting score and the quantile score to calculate an impactfulness score $M_i$ for the document (step 1508). In some embodiments, step 1508 includes using the following equation to calculate the impactfulness score:

$$M_i = \begin{cases} 10 - q_n & \text{if } WM_0 = 10 \\ q_n & \text{if } WM_0 = 0 \\ 5 & \text{otherwise} \end{cases}$$

where $q_n$ is the quantile score for the text and $WM_0$ is the impactfulness starting score calculated in step 1504. According to the above equation, if the text has a baseline score of 10, its impactfulness score is $10-q_n$. If the text has a baseline score of 0, then its impactfulness score is $q_n$.

Note that in these calculations, we start with an impactfulness starting score of either 10 or 0 (texts which scored 5 are not a affected at this stage). Then we subtract (for positives) or add (for negatives) the quantity $q_n$ to the starting impactfulness score. Step 1508 effectively penalizes the text's impactfulness score for its presence of potentially cognitively reasoned evidence.

Still referring to FIG. 15, process 1500 is shown to include applying scoring rules to adjust the impactfulness score (step 1510). Prior to step 1510, the number and type of Excellent and Terrible features have not been considered. The rightedness of the identified features has also not been considered. To account for these features, process 1500 uses the following equation to adjust the impactfulness score calculated in step 1508:

if $6 \leq M_i \leq 10$, then $M_i' = \begin{cases} M_i - 1 & \text{if } E < 1, \text{ or text is not positive righted} \\ M_i & \text{otherwise} \end{cases}$ The preceding equation applies to $M_i$ scores of 6-10, where $M_i$ is the impactfulness score calculated in step 1508. According to this equation a text's corrected impactfulness score $M_i'$ can be adjusted down by a point or any other decrement (e.g., half a point, one and a half points, two points, etc.). This adjustment occurs if the text does not contain at least 1 piece of positive evidence from the Excellent category and the text's rightedness is not positive (e.g., the last gram is not positive). The lower bound score may be fixed at 6 so that a text remains as positive with the lowest possible score. The impactfulness score requires only one piece of Excellent evidence (as opposed to 2 for the thoughtfulness score) to avoid being decremented due to the relative brevity of typical texts with a high impactfulness score.

Negative scores (0 to 4) are calculated in the same way as positive scores with two exceptions. First, the Excellent category is replaced by the Terrible category. Second, all adjustments require just one piece of evidence for Terrible because of the relative lack of unknown themes that is a characteristic of negative texts. The following equation is used to calculate adjusted impactfulness scores for $M_i$ scores from 0-4:

$$\text{if } 0 \le M_i \le 4,$$
$$\text{then } M_i' = \begin{cases} M_i - 1 & \text{if } T < 1, \text{ or text is not positive righted} \\ M_i & \text{otherwise} \end{cases}$$

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data, which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for conducting parallelization of tasks, comprising:
   an interface for receiving (i) messages indicative of at least two tasks to be executed in parallel, and (ii) a content payload to be processed by conducting the tasks; and
   a processor comprising a processing manager unit and at least two processing units, wherein the processing manager unit is configured to parse the received messages and to distribute each task to a corresponding processing unit for parallel processing relative to the content payload, wherein each of the at least two tasks is associated with a function to be executed by the processing units,
   wherein the processing units are configured to identify the function associated with each corresponding task and to utilize resources for executing the functions from a data store, wherein the functions comprise an emotional scoring function that (i) is a task in parallel with a context determination task, (ii) analyzes textual data, and (iii) classifies grams in the textual data into categories.

2. The system of claim 1, further comprising:
   a messaging source having a website crawler, the website crawler configured to generate (i) the messages indicative of at least two tasks to be executed in parallel and (ii) the content payload for use in the parallel tasks.

3. The system of claim 1, further comprising:
   a messaging source having a streaming data interface for receiving streaming data, wherein the messaging source is configured to process the streaming data and to generate the messages using the streaming data.

4. The system of claim 3, wherein the messaging source is configured to use the streaming data to create the content payload and wherein identification of the function associated with the tasks is not a part of the streaming data.

5. The system of claim 1, further comprising:
   a messaging source comprising a query engine for querying a data source and for generating a series of the messages using query results, wherein identification of the function associated with the tasks is not a part of the query results.

6. The system of claim 1, wherein the interface comprises a framework manager configured to queue the messages, and wherein each processing manager unit is configured to request new messages from a queue when resources permit.

7. The system of claim 1, wherein the messages are not compiled and do not include source code for the tasks, and wherein the messages utilize a mark-up language to identify the parallel tasks and the content payload.

8. The system of claim 7, wherein the content payload comprises a reference to data not embedded within the messages.

9. The system of claim 8, wherein the function comprises a first emotional scoring function for a first emotion and another task includes a second emotional scoring function for a second emotion, wherein both of the first and second emotional scoring functions are executed as parallel tasks and represented as parallel tasks in the messages.

10. The system of claim 1, wherein the function comprises a first emotional scoring function for a first emotion and another task includes a second emotional scoring function for a second emotion, wherein both of the first and second emotional scoring functions are executed as parallel tasks and represented as parallel tasks in the messages.

11. The system of claim 1, wherein the messages associated with at least two tasks comprises a plurality of messages and each message of the plurality of messages is individually associated with at least one task.

12. A computerized method for scoring documents using rule-based criteria, comprising:
identifying one or more grams in a document;
performing in parallel a first task with a first processing unit and a second task with a second processing unit, the first task comprising categorizing the one or more grams into categories and the second task being different from the first task, each category representing a different level of emotion;
quantifying a number of grams in the categories; and
using a rule-based engine to determine a construct score for the document based at least in part on the number of grams in each category for emotional scoring, wherein determining the construct score comprises applying scoring rules to the numbers of grams to determine the construct score for the document,
wherein the construct score is calculated according to:
W=10 if E>0, LG=0 9 if G>2, LG=0 8 if G>1, LG=0
where W is the construct score, and E is a number of grams in a first category, G is a number of grams in a second category, and LG is a number of grams in a third category.

13. The method of claim 12, wherein:
the first category is an excellent category,
the second category is a good category, and
the third category is a less than good category.

14. The method of claim 13, further comprising combining two or more of the categories and summing the grams in a combination of categories, wherein the less than good category is a combined category.

15. The method of claim 12, further comprising:
analyzing textual data in a document to identify one or more grams present in the textual data.

16. The method of claim 12, wherein the categories comprise at least three of: Excellent, Good, Fair, Questionable, Bad, or Terrible.

17. The method of claim 12, wherein the construct score is on a scoring scale of 0-10 where a score of 10 indicates clear positive evidence of the construct and a score of 0 indicates clear negative evidence of the construct.

18. The method of claim 12, further comprising calculating an impactfulness starting score based at least in part on the construct score.

19. The method of claim 18 wherein the impactfulness starting score is calculated according to:

$$WM_0 = \begin{cases} 10 & \text{if } 10 \geq CX > 5 \\ 0 & \text{if } 0 \leq CX < 5 \\ 5 & \text{otherwise} \end{cases}$$

where $WM_0$ is the impactfulness starting score and $CX$ is the construct score.

20. A computerized method for scoring documents using rule-based criteria, the method comprising:
identifying one or more grams in a document;
performing in parallel a first task with a first processing unit and a second task with a second processing unit, the first task comprising categorizing the one or more grams into categories and the second task being different from the first task;
quantifying a number of grams in the categories;
using a rule-based engine to determine a construct score based at least in part on the number of grams in each category for emotional scoring, wherein determining the construct score comprises applying scoring rules to the numbers of grams to determine the construct score; and
calculating an impactfulness starting score based at least in part on the construct score, wherein calculating the impactfulness starting score comprises assigning a maximum score to each document with a positive construct score and assigning a minimum score to each document with a negative construct score.

21. The method of claim 20, wherein the construct score is calculated according to the following equation $$W = \begin{cases} 10 & \text{if } E > 0, \ LG = 0 \\ 9 & \text{if } G > 2, \ LG = 0 \\ 8 & \text{if } G > 1, \ LG = 0 \end{cases}$$

where W is the construct score, and E is a number of grams in an excellent category, G is a number of grams in a good category, and LG is a number of grams in a less than good category, wherein the less than good category is a combined category.

22. The method of claim 20, wherein the impactfulness starting score is calculated according to:

$$WM_0 = \begin{cases} 10 & \text{if } 10 \geq CX > 5 \\ 0 & \text{if } 0 \leq CX < 5 \\ 5 & \text{otherwise} \end{cases}$$

where $WM_0$ is the impactfulness starting score and $CX$ is the construct score.

23. The method of claim 20, further comprising analyzing textual data of a document to identify one or more grams present in the textual data.

24. The method of claim 20, wherein the categories comprise at least two of: Excellent, Good, Fair, Questionable, Bad, and Terrible.

25. The method of claim 20, further comprising combining two or more of the categories and summing the grams in a combination of categories.

26. The method of claim 20, wherein the construct score is on a scoring scale from 0-10 where a score of 10 indicates clear positive evidence of the construct and a score of 0 indicates clear negative evidence of the construct.

\* \* \* \* \*